United States Patent [19]

Loustau

[11] Patent Number: 4,833,778

[45] Date of Patent: May 30, 1989

[54] WIRE PROCESSING APPARATUS AND METHOD

[75] Inventor: Desire Loustau, Aracadia, Calif.

[73] Assignee: Eubanks Engineering Co., Monrovia, Calif.

[21] Appl. No.: 219,328

[22] Filed: Jul. 15, 1988

Related U.S. Application Data

[63] Continuation-in-part of Ser. No. 944,923, Dec. 22, 1986, abandoned.

[51] Int. Cl.⁴ ........................ H01R 43/00; B21D 7/00; B65G 47/26

[52] U.S. Cl. ...................................... 29/857; 29/33 F; 29/33 M; 29/564.4; 29/564.6; 29/863; 198/457

[58] Field of Search ................ 29/564.4, 564.6, 33 M, 29/33 F, 861, 857, 863; 198/457

[56] References Cited

U.S. PATENT DOCUMENTS 3,604,291 9/1971 Weidner .
3,701,301 10/1972 Gudmestad .
3,872,584 3/1975 Chick et al. .................. 29/564.4 X
3,881,374 5/1975 Gudmestad .
3,918,330 11/1975 Blaha .
3,921,472 11/1975 Gudmestad et al. .
3,996,826 12/1976 McKeever .
4,145,807 3/1979 Beetz et al. .................... 29/564.4 X
4,156,961 6/1979 Agoh .
4,164,808 8/1979 Gudmestad et al. .
4,165,768 8/1979 Gudmestad .
4,166,315 9/1979 Gudmestad et al. .
4,175,316 11/1979 Gudmestad .
4,194,281 3/1980 Gudmestad .
4,275,619 6/1981 Shimizu .
4,283,973 8/1981 Spencer .
4,370,786 2/1983 Butler .
4,428,114 1/1984 Teagno .......................... 29/564.6 X
4,479,376 10/1984 Carlson .
4,581,796 4/1986 Fukuda et al. ...................... 29/33 M
4,631,822 12/1986 Reinertz ............................ 29/863 X
4,638,558 1/1987 Eaton .................................. 29/861

FOREIGN PATENT DOCUMENTS 647189 6/1931 Fed. Rep. of Germany .
3028834 2/1982 Fed. Rep. of Germany .
371300 4/1932 United Kingdom .
1154063 6/1969 United Kingdom .

*Primary Examiner*—Carl J. Arbes
*Attorney, Agent, or Firm*—William W. Haefliger

[57] ABSTRACT

A wire processing system, comprises:

(a) structure to advance a wire of selected cross section generally endwise toward a primary station, the wire having a forward portion, (b) a wire deformer at the primary station to form at least one bend in the advancing wire, (c) a clamp at the primary station to clamp the forward portion of the wire that has passed the deformer, (d) a cutter to sever the wire after a selected length of wire has advanced past the cutter, whereby a wire section of predetermined length is formed, (e) and conveyor apparatus operable to grip the formed wire section and to convey that section along a generally longitudinally extending travel path away from the primary station after the clamp releases the wire, and with at least one end of the formed wire section presented laterally for processing, as for example insulation stripping and attachment of terminals to stripped wire ends. Wire sections of the same or different bend configuration may be controllably spaced on and by the conveyor apparatus.

27 Claims, 42 Drawing Sheets

STEP 1

STEP 2

STEP 3

STEP 4

STEP 5

STEP 6

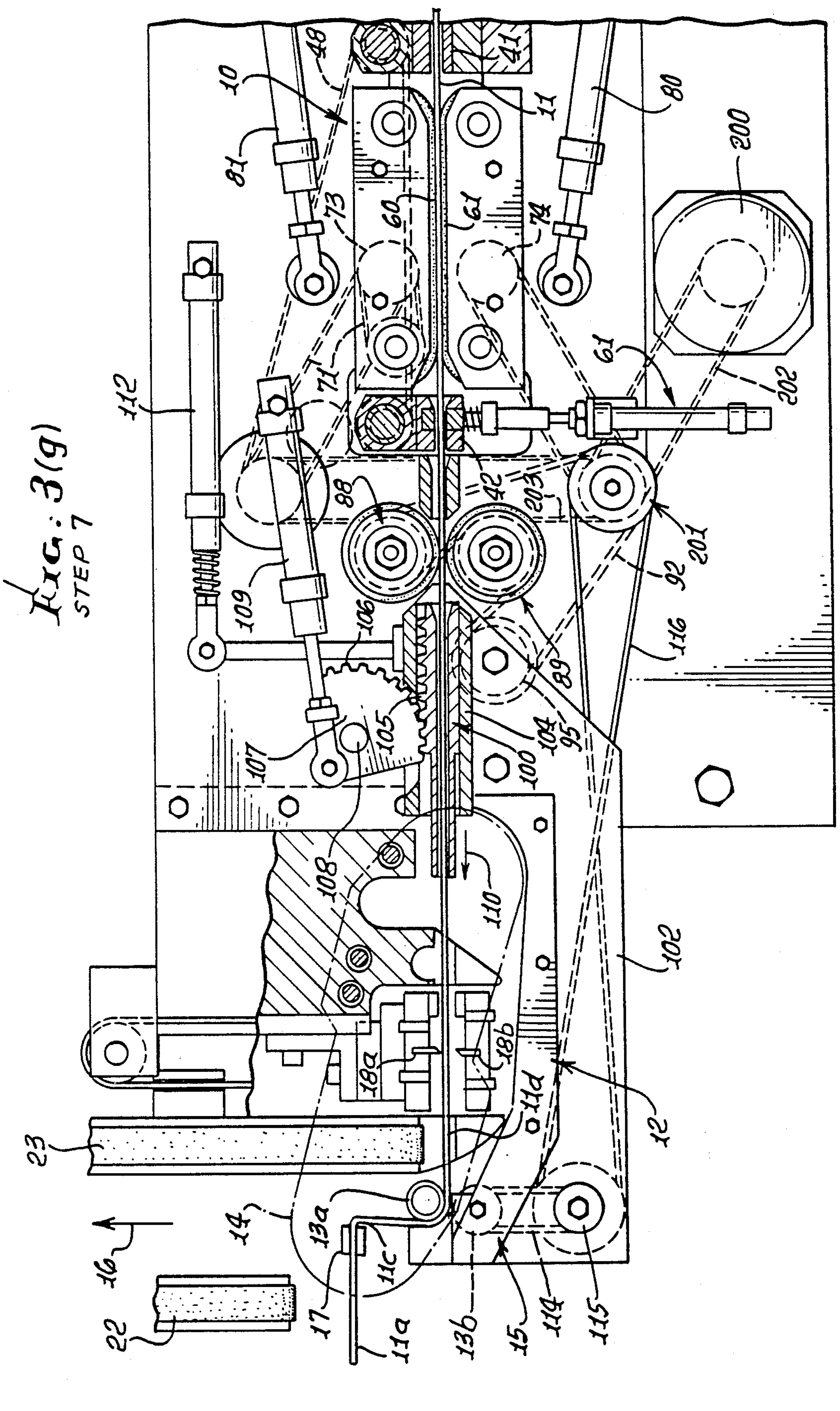
FIG. 3(g) STEP 7

STEP 8

STEP 9

STEP 10

STEP 11

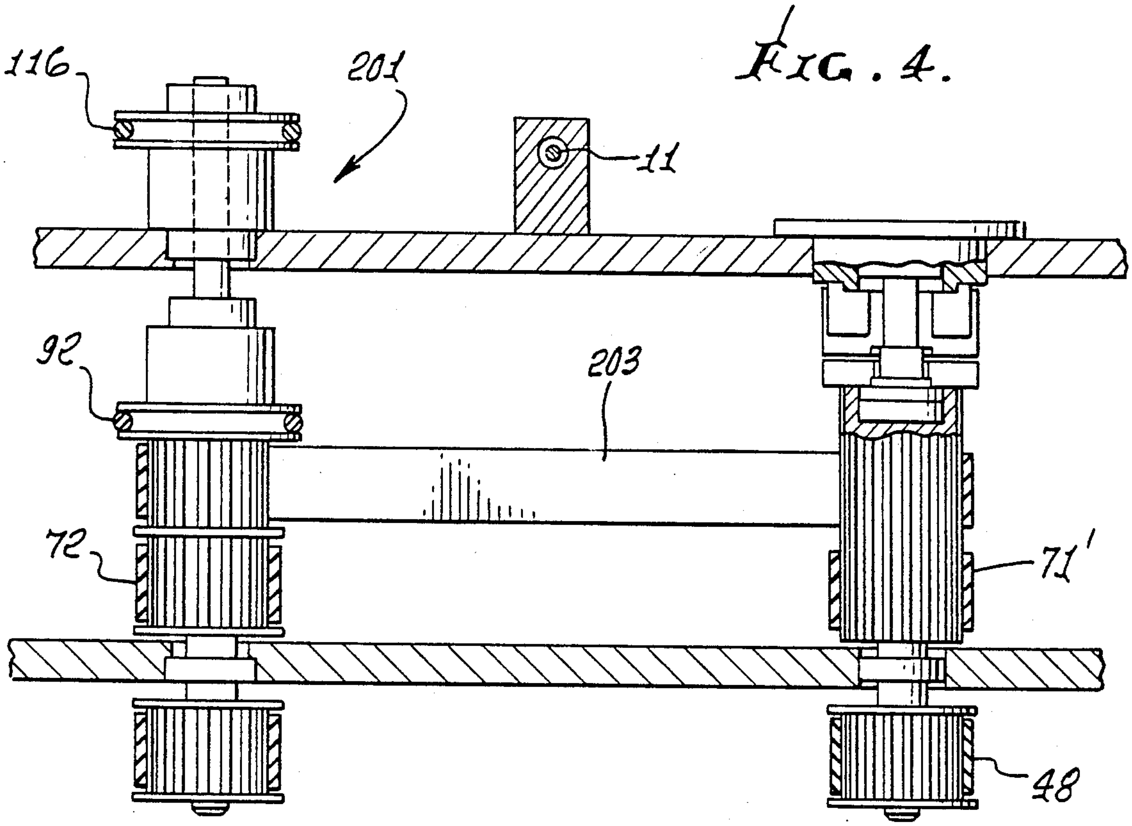
FIG. 4.
FIG. 11.
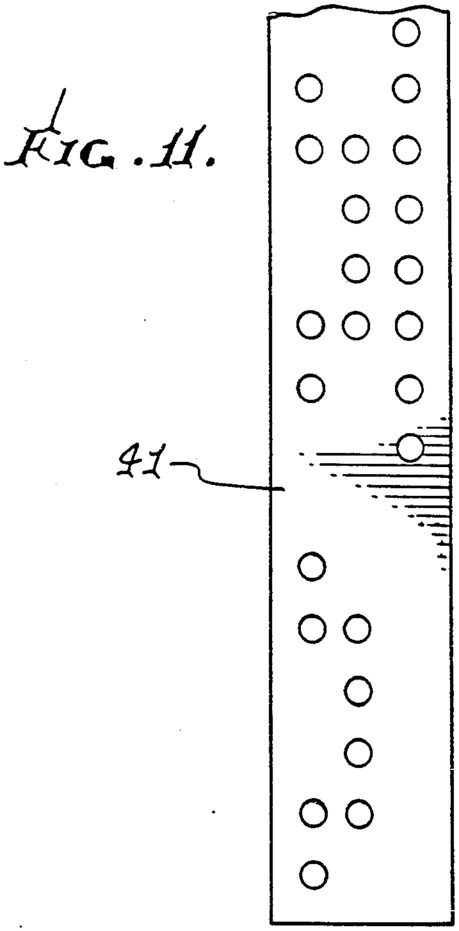
FIG. 12.
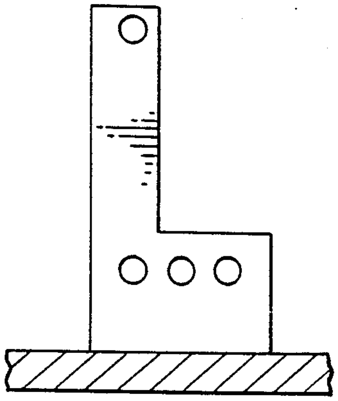

FIG. 7.
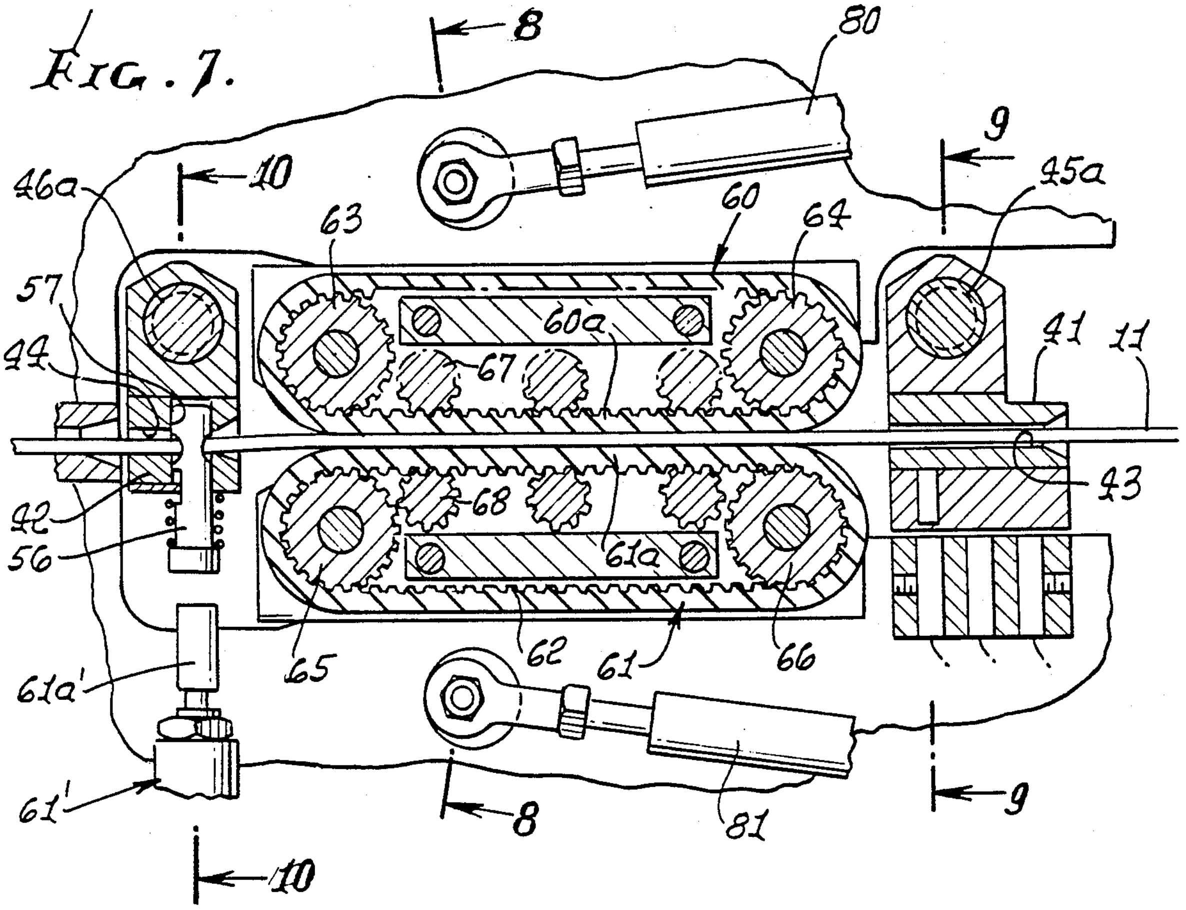
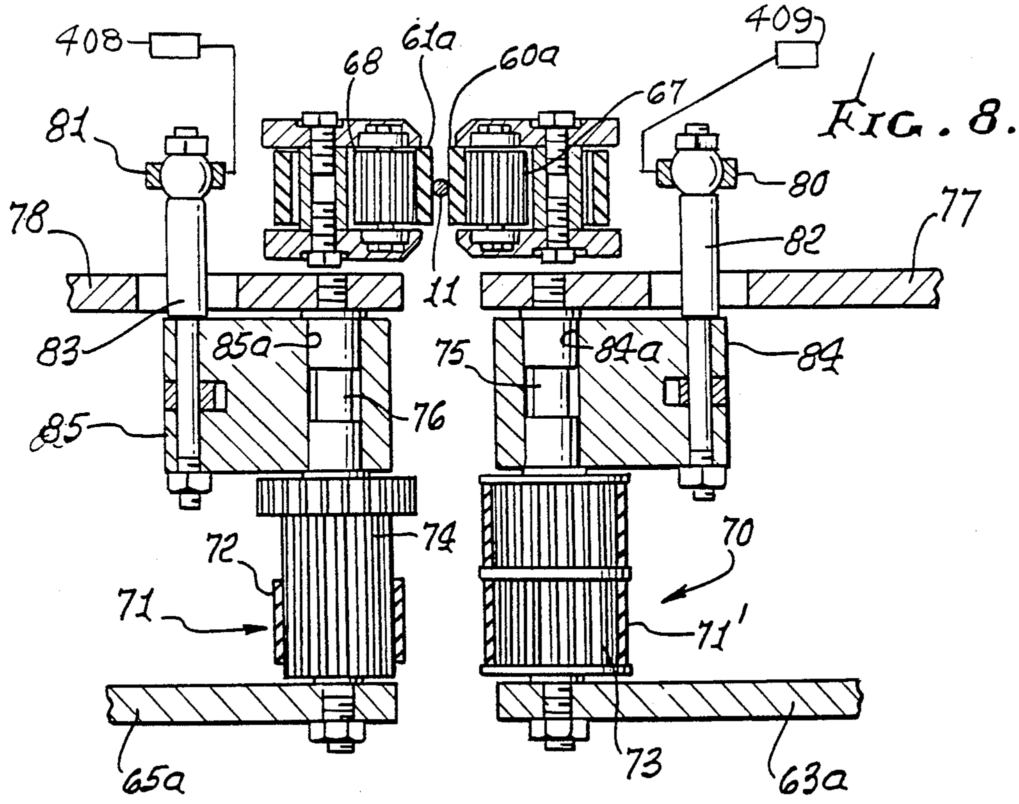
FIG. 8.

WIRE PROCESSING APPARATUS AND METHOD

BACKGROUND OF THE INVENTION

This application is a continuation-in-part of Ser. No. 944,923, filed Dec. 22, 1986 now abandoned.

This invention relates generally to the processing of wire, and more particularly to automated apparatus, and method, to automatically select wires of different diameters, materials, colors, insulation types and thickness, and other characteristics to process same into wire sections of selected lengths, and to process the ends of such wire sections as by stripping of insulations, applying terminals to metallic wire ends, etc.

There is need for fully automated apparatus and processing methods, to selectively process wires of different diameters as by de-reeling same, and then sequentially process sections of such different diameter wires. For example, it is desirable that different diameter wires be sequentially cut into sections of different lengths, so that wire harnesses can be easily assembled, the harnesses made up of different length wires of different diameters of size. Also, different terminations of such different wire sections are desirable. I am not aware of prior apparatus capable of meeting these needs in the manner of the present invention which provides new and unusual combinations of structure, functions and improved results, as will be seen.

SUMMARY OF THE INVENTION

It is a major object of the invention to provide apparatus, method and system meeting the above needs. Basically, the apparatus of the invention comprises:

(a) first means to advance a wire generally endwise toward a primary station, the wire having a forward portion, (b) wire deforming means at the primary station to form at least one bend in the advancing wire, (c) clamp means at the primary station to clamp the forward portion of the wire that has passed the deforming means, (d) cutter means to sever the wire after a selected length of wire has advanced past the cutter means, whereby a wire section of predetermined length is formed, (e) and conveyor means operable to grip the formed wire section and to convey that section along a generally longtudinally extending travel path away from the primary station after the clamp means releases the wire, and with at least one end of the formed wire section presented laterally for processing thereof.

Typically, the wire deforming means includes a first deforming element, and includes apparatus at the primary station mounting the first deforming element for movement out of the path of wire travel by the conveyor means. Such apparatus may comprise a rotor having two of said first deforming elements thereon, the rotor rotatable in 180° increments to bring the first deforming elements alternately into position to bend the advancing wire. Also, the wire deforming means may include a second deforming element, and a carrier for that second element movable to bring the second element into proximity to said first element to effect bending of the advancing wire, and to carry the second element away from the wire during initial conveying of the wire section by the conveyor means.

It is a further object of the invention to provide a de-reeling means in the form of a selection frame having carriers for multiple wires, and means to selectively displace the frame relative to said wire advancing means to bring a selected wire into position for feeding of a selected wire by said wire advancing means.

It is a still further object of the invention to deform the wire into one of several selectable shapes, including S-shape, U-shape, and a succession of U-shapes, with the aid of the rotor and deforming elements as referred to. A yet further object of the invention is to provide the conveyor means with a primary pair of endless conveyors, and means to effect endless travel of the conveyors and also crawl displacement of primary conveyors to grip the wire length and convey it along the longitudinal paths of the conveyors undergoing such endless travel. A secondary pair of endless conveyors may also be provided to receive the wire lenths from said primary pairs of conveyors, for transfer to a tertiary pair of endless conveyors, the conveyors traveling at different rates to controllalby space the received wire lengths.

The invention is also applicable to other flexible cords or cord-like devices such as optical fibers, plastic tubings, etc.

These and other objects and advantages of the invention, as well as the details of an illustrative embodiment will be more fully understood from the following specification and drawings, in which:

DRAWING DESCRIPTION

Figure 2:
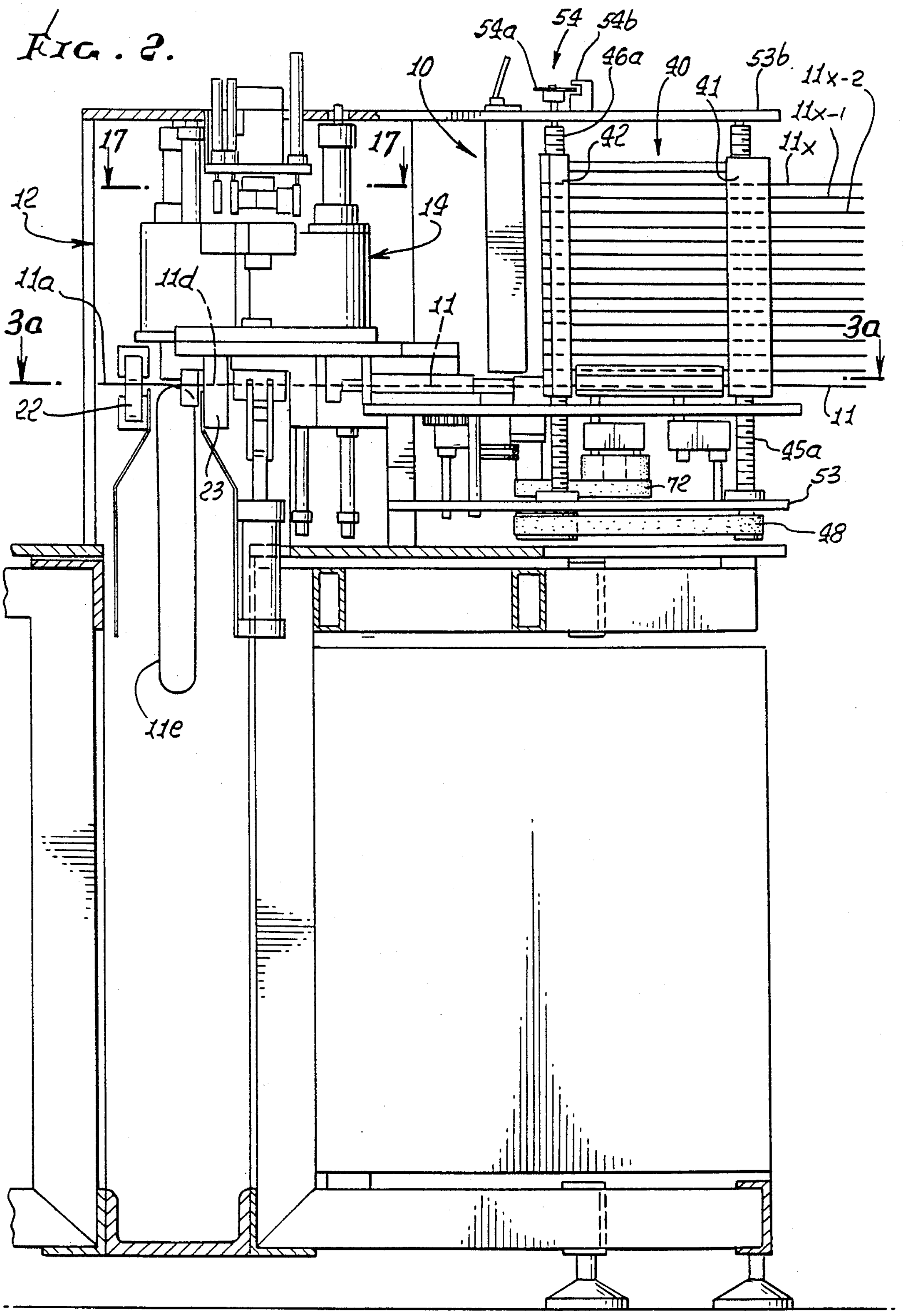
FIG. 2 is a vertical section on lines 2—2 of FIG. 1.
Figure 3A:
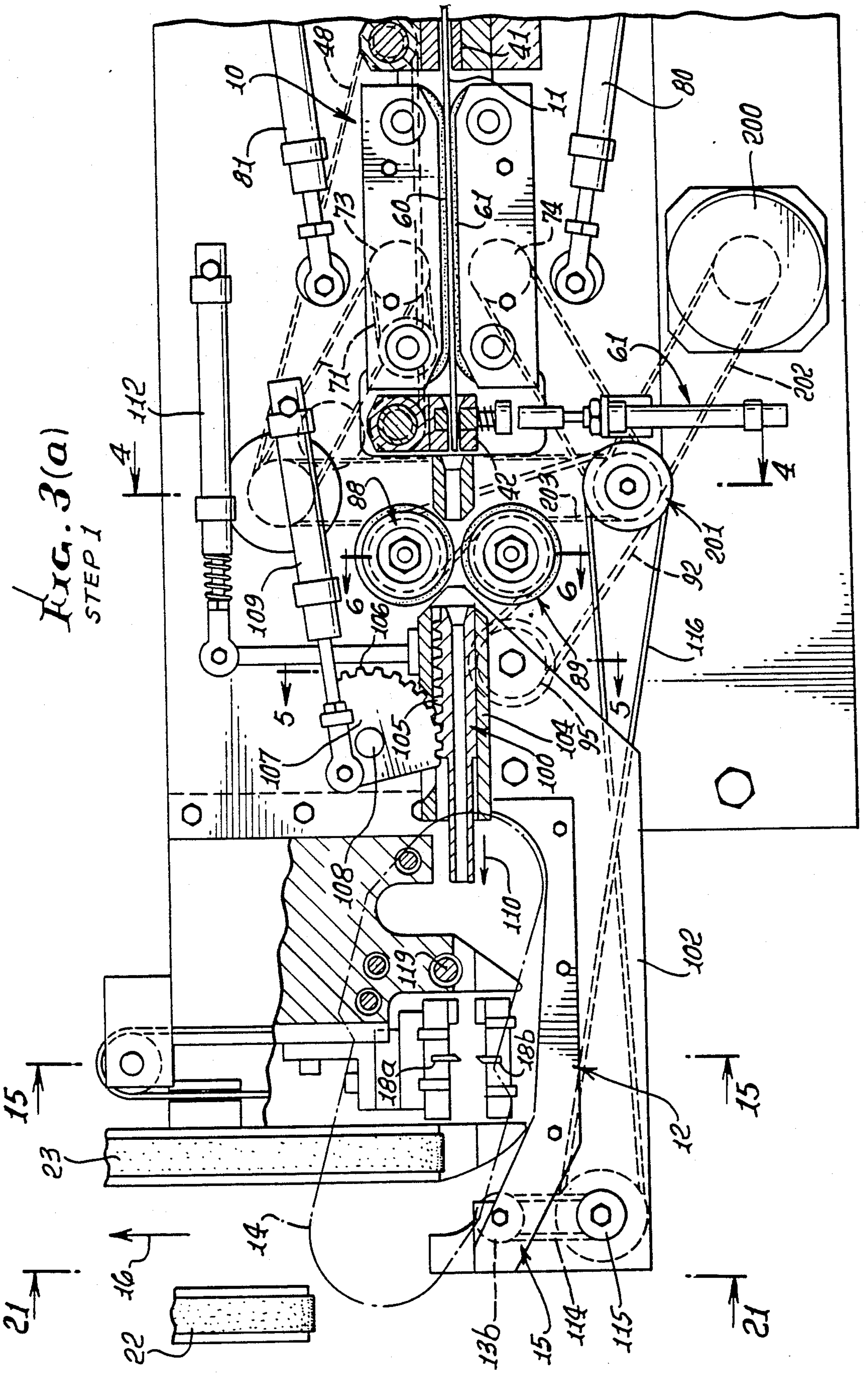
Figure 3B:
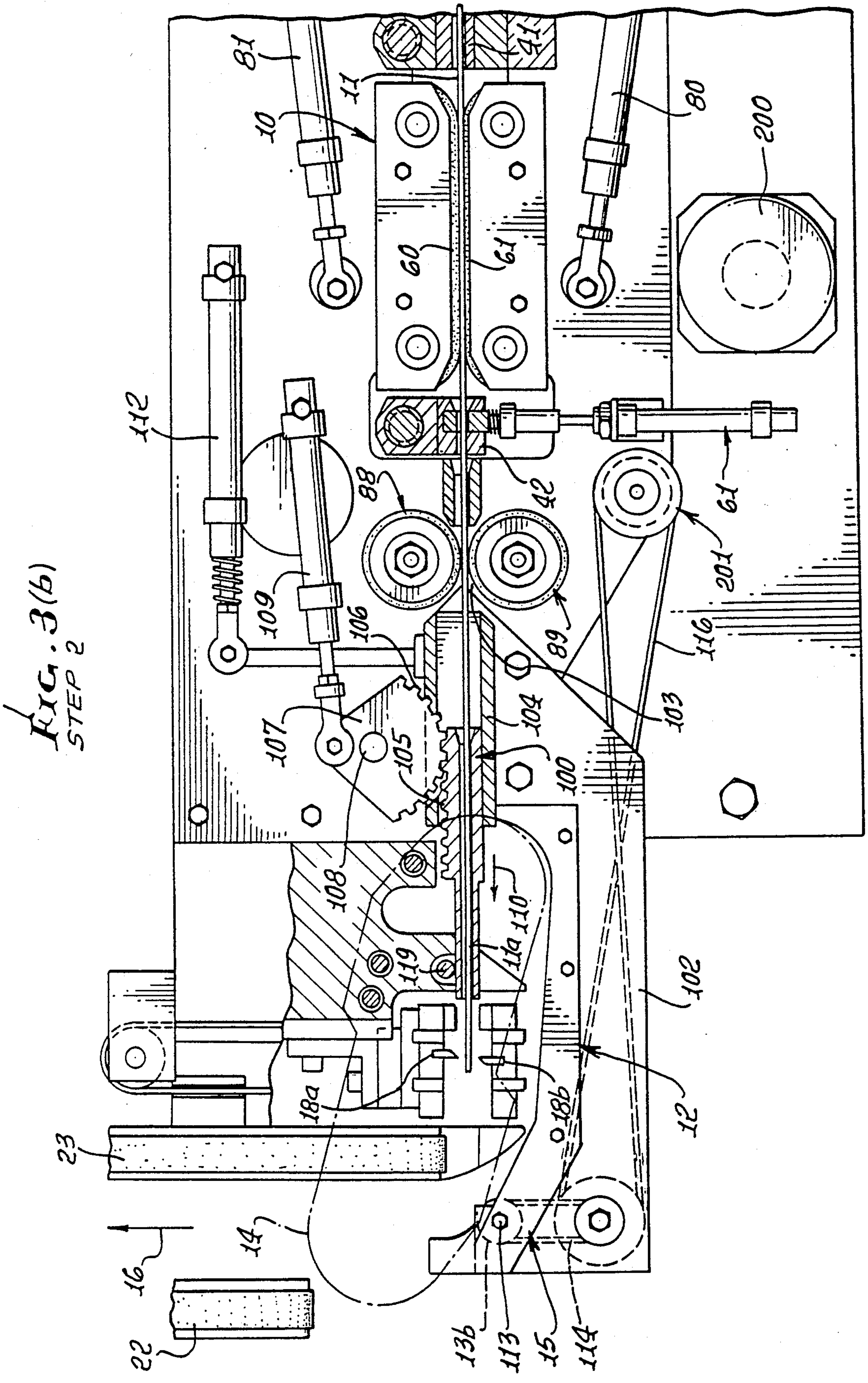
Figure 3C:
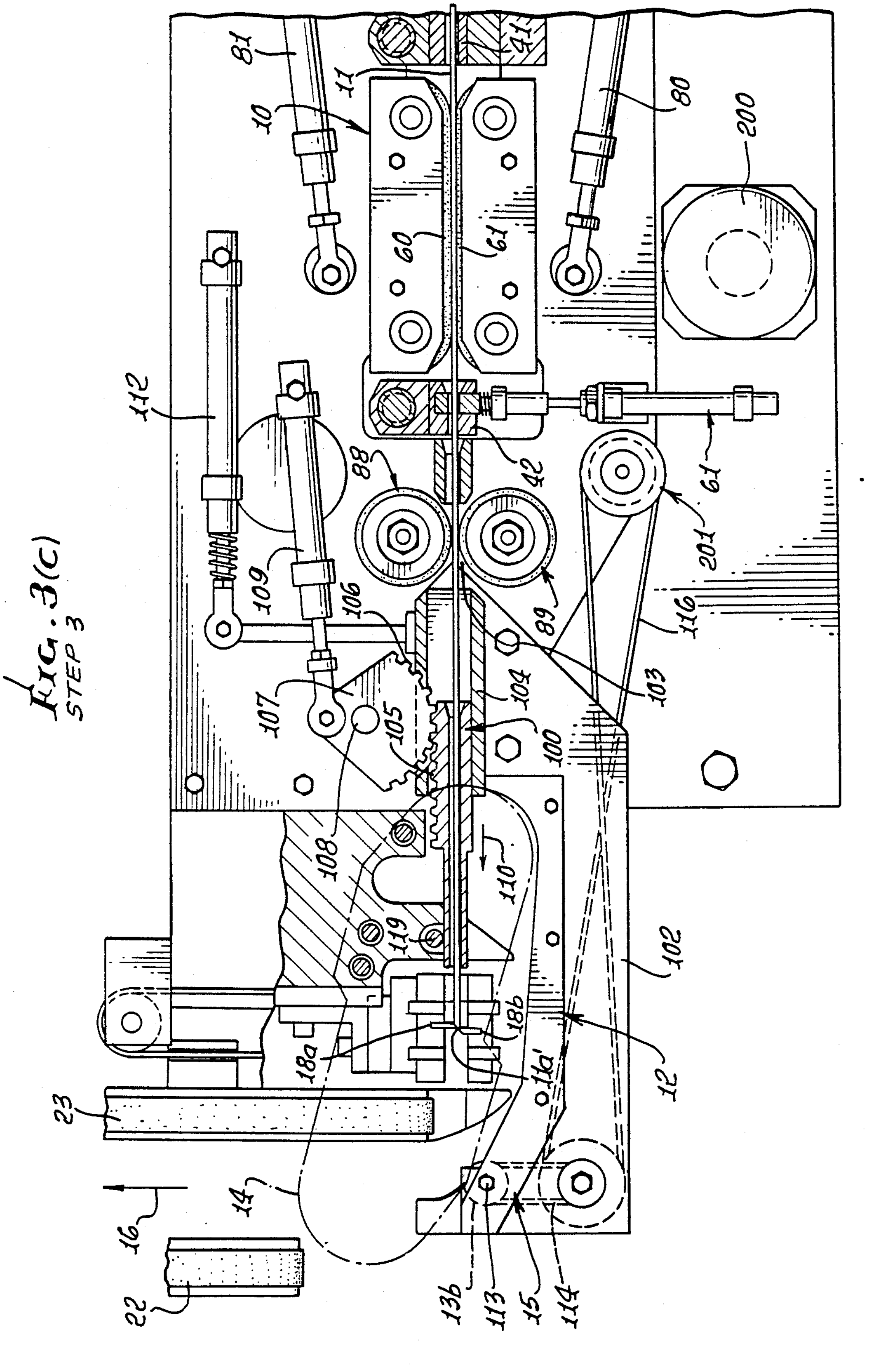
Figure 3D:
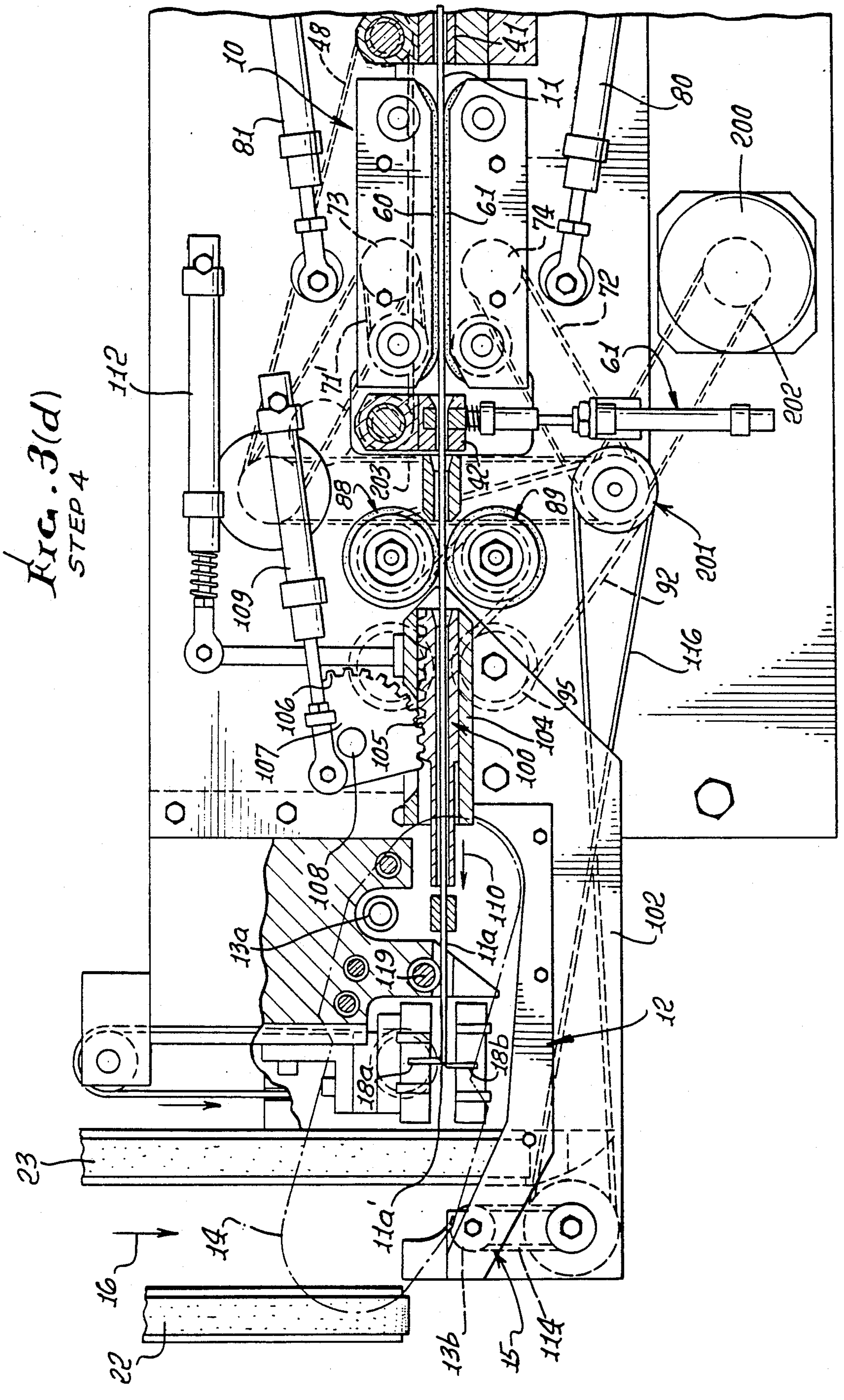
Figure 3E:
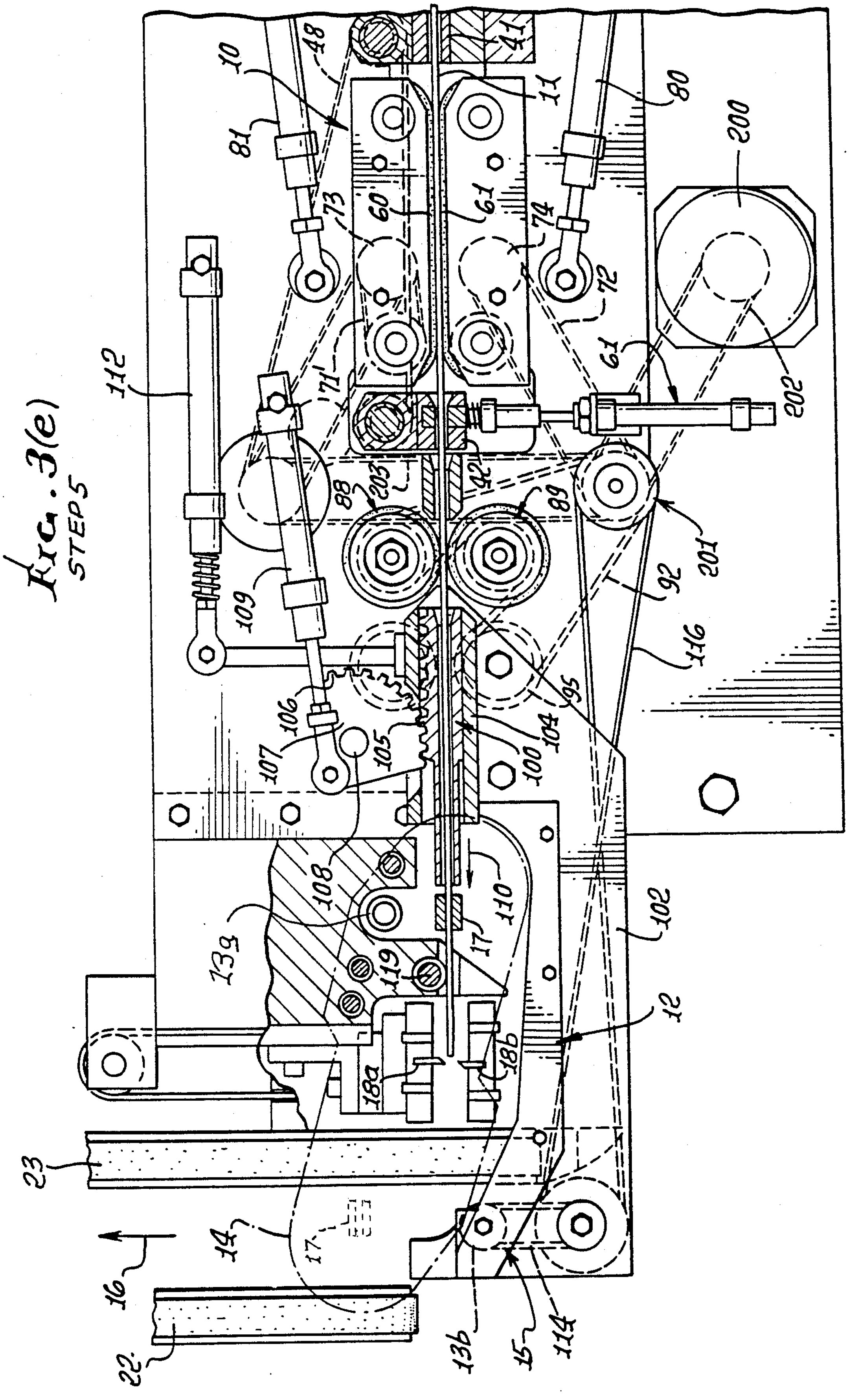
Figure 3F:
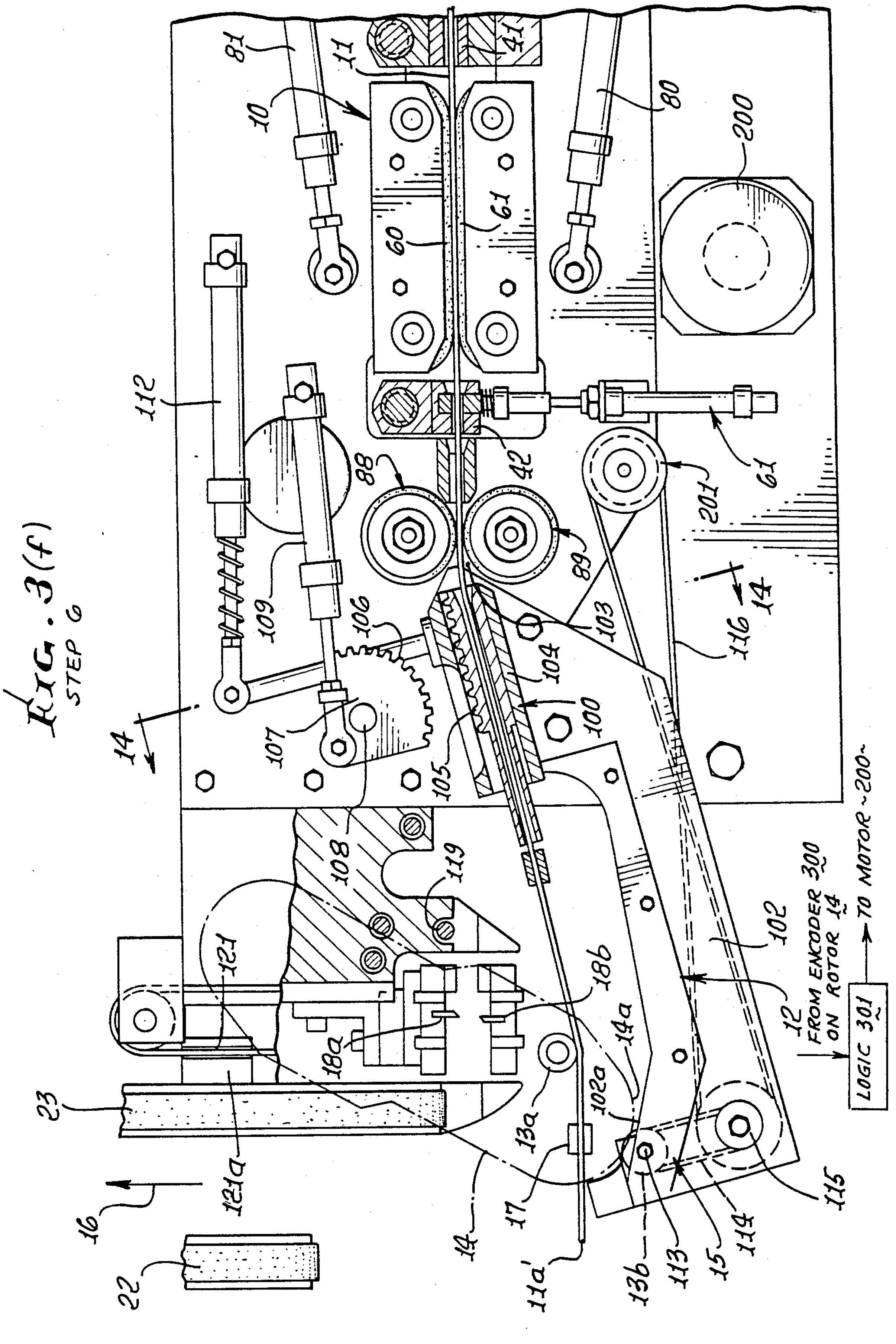
Figure 3H:
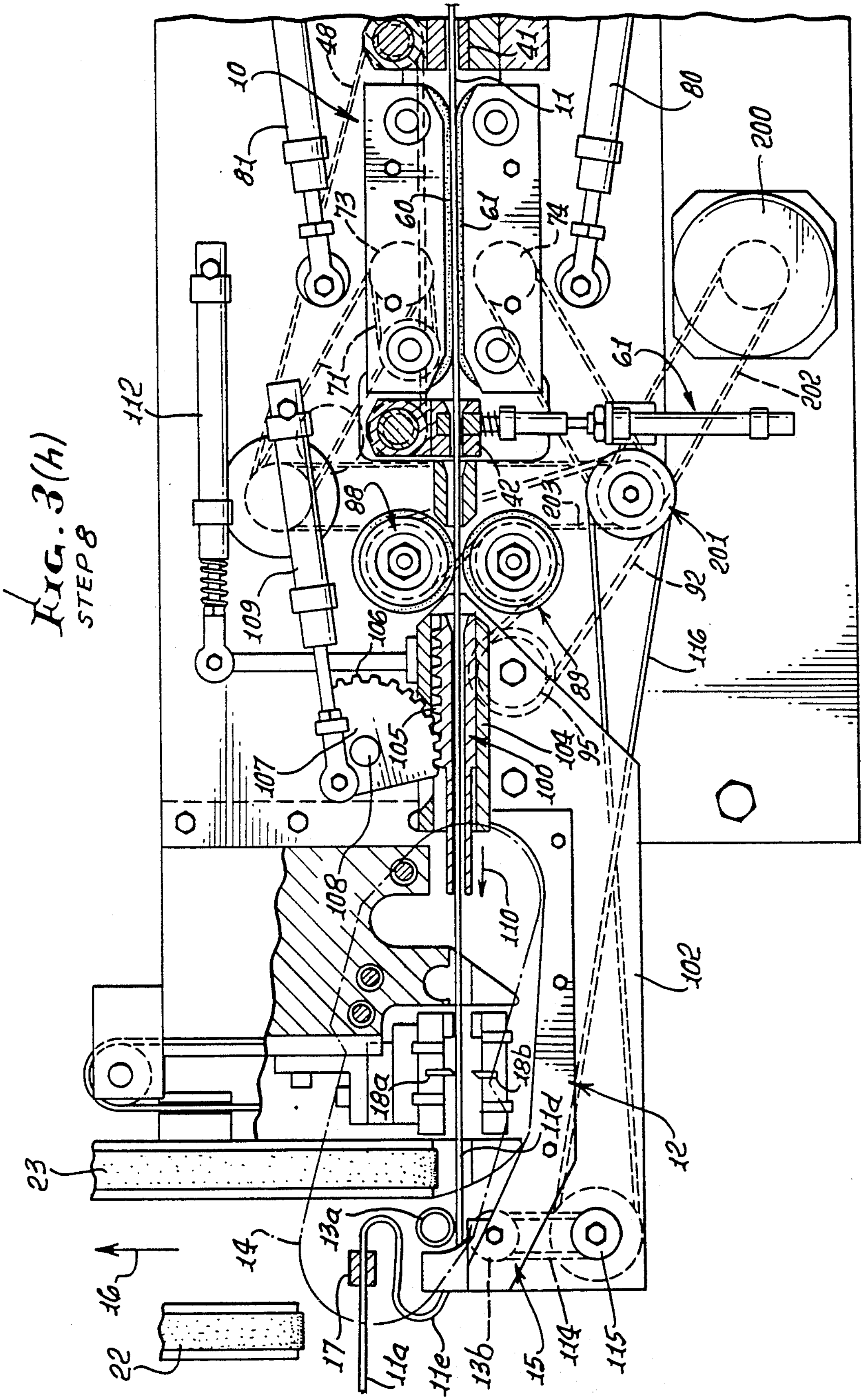
Figure 3I:
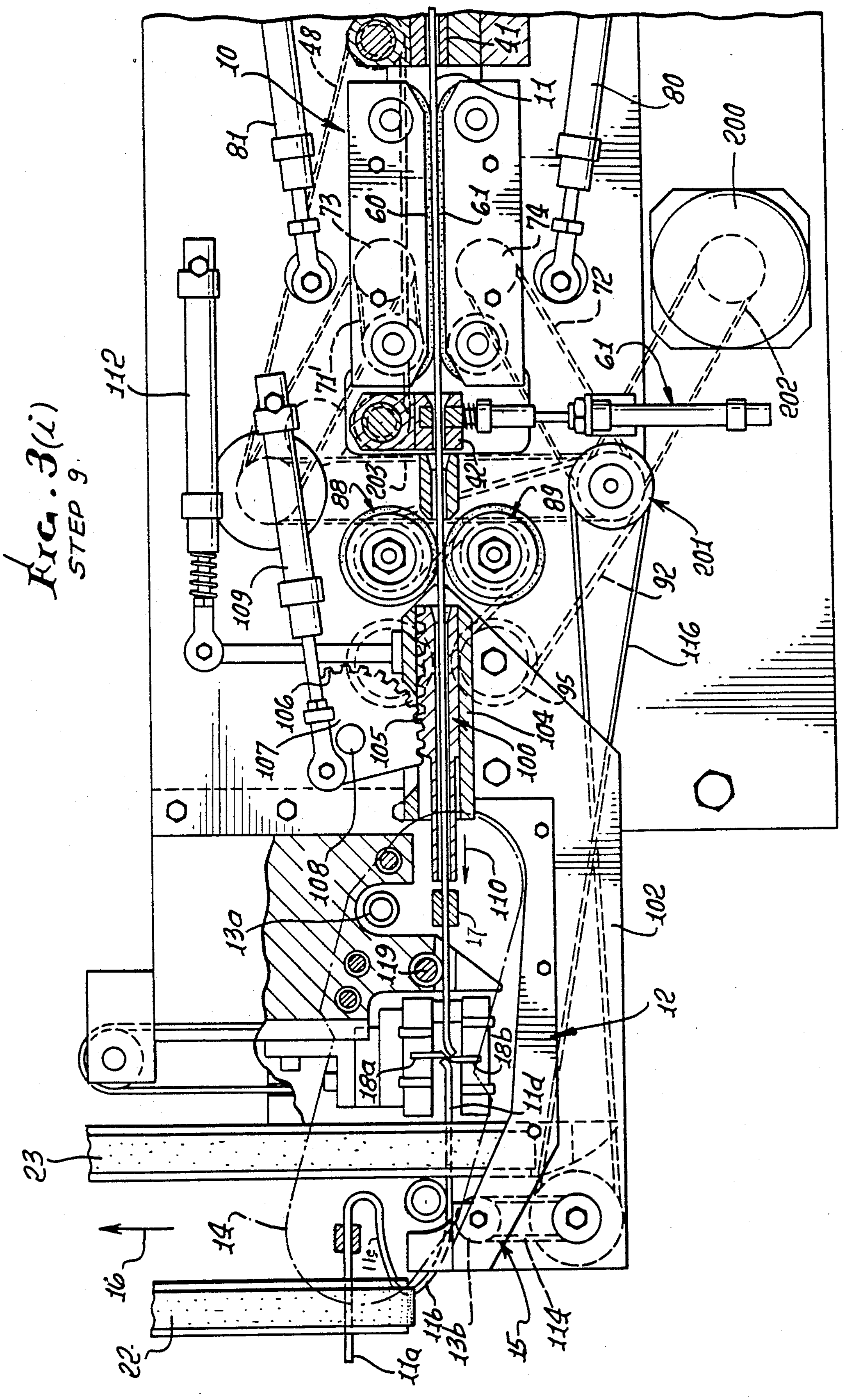
Figure 3J:
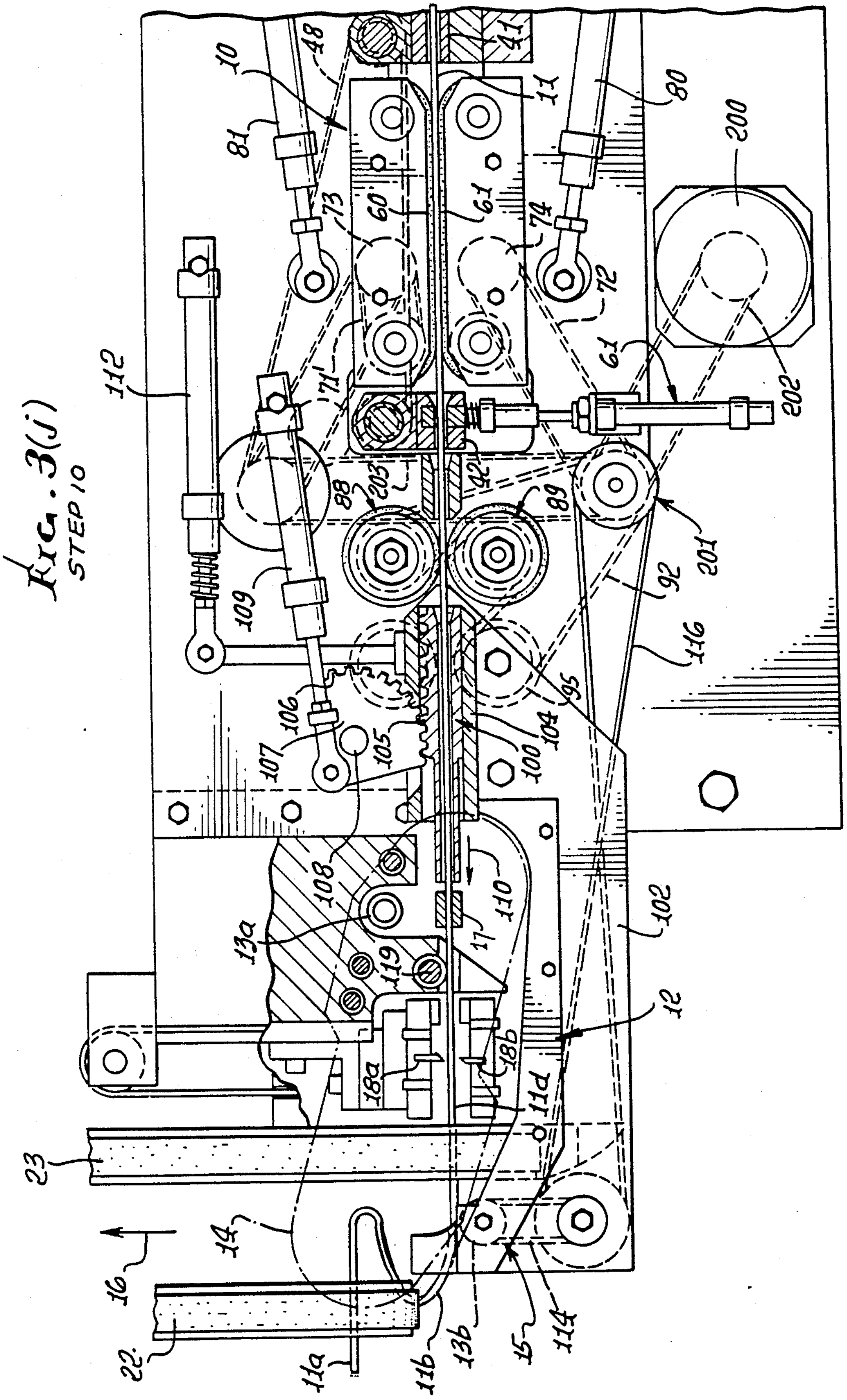
Figure 3K:
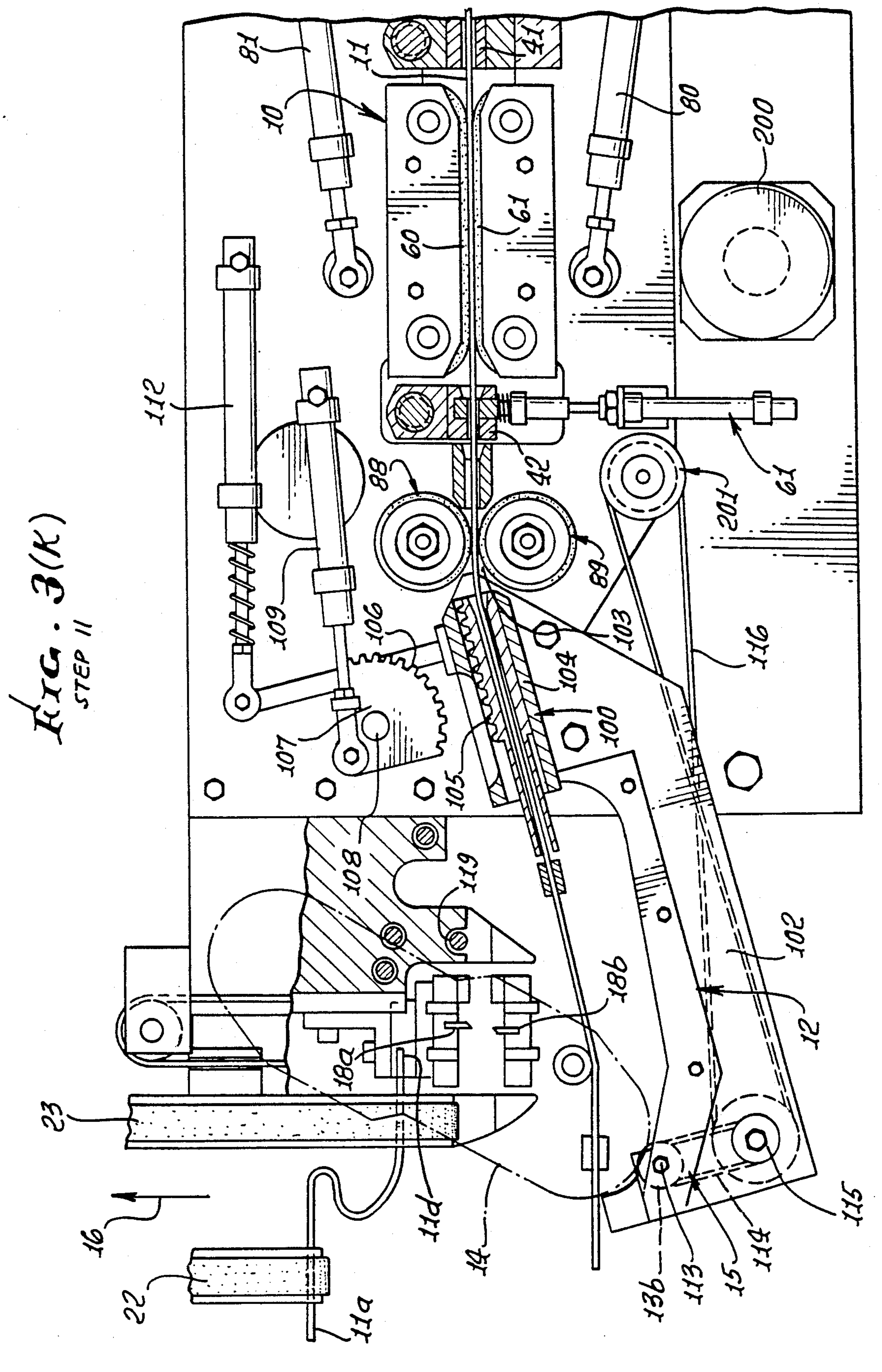
Figure 5:
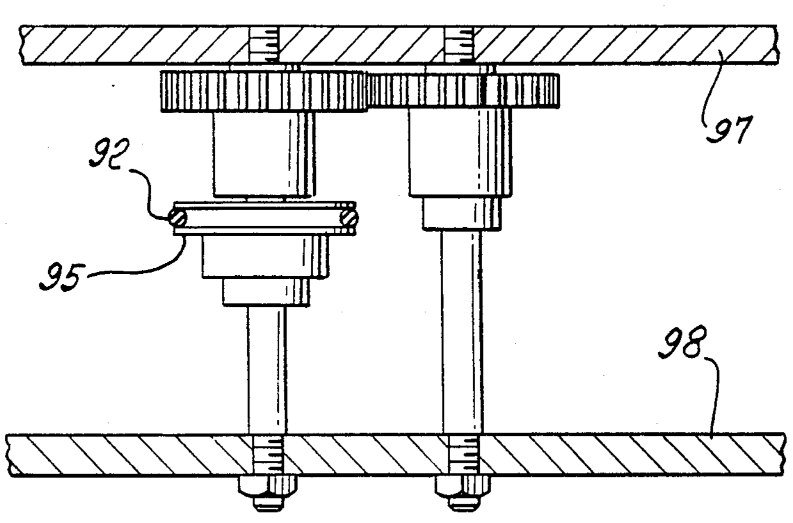
Figure 6:
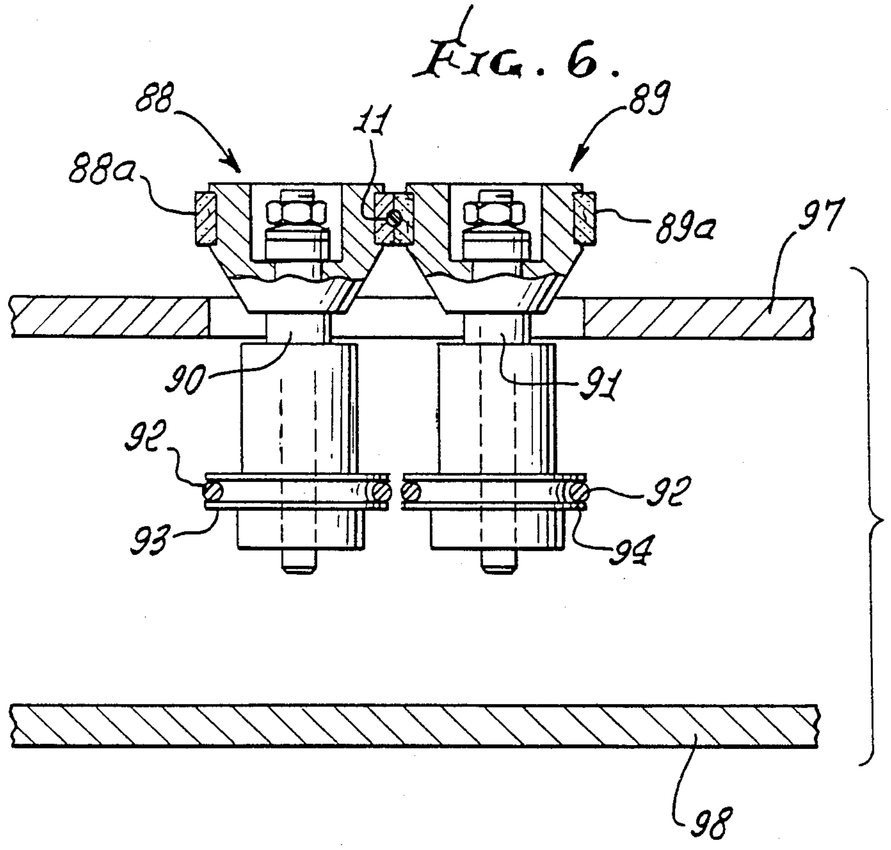
Figure 9:
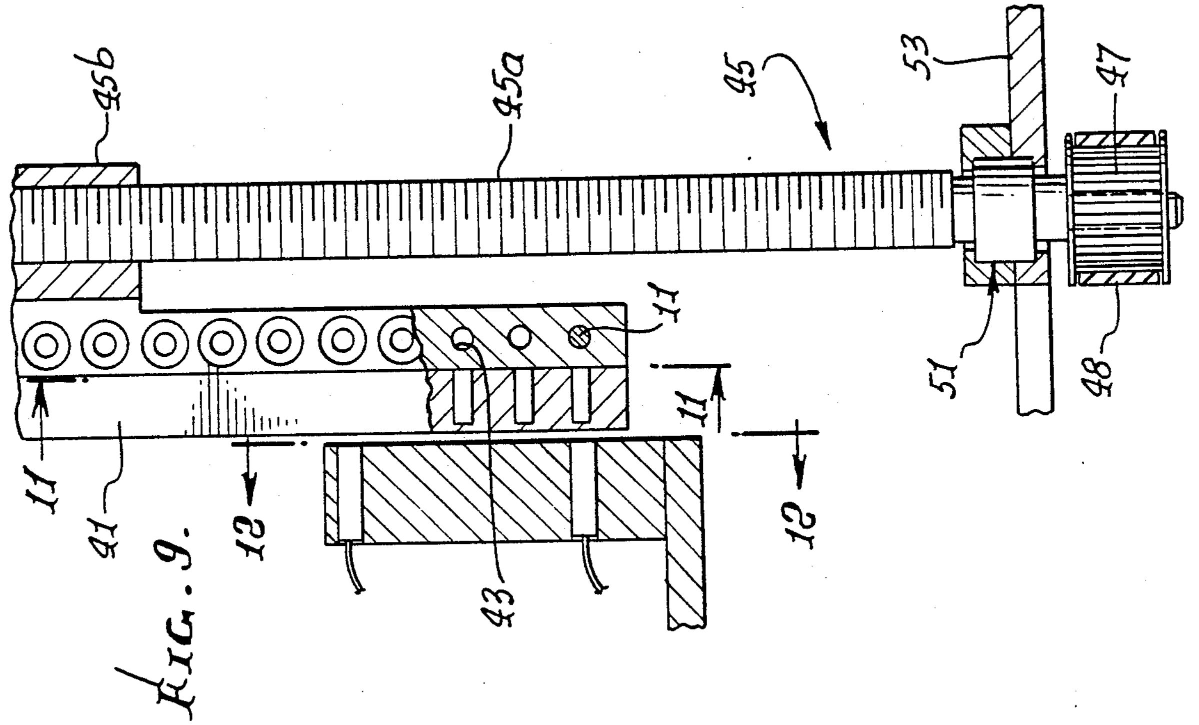
Figure 10:
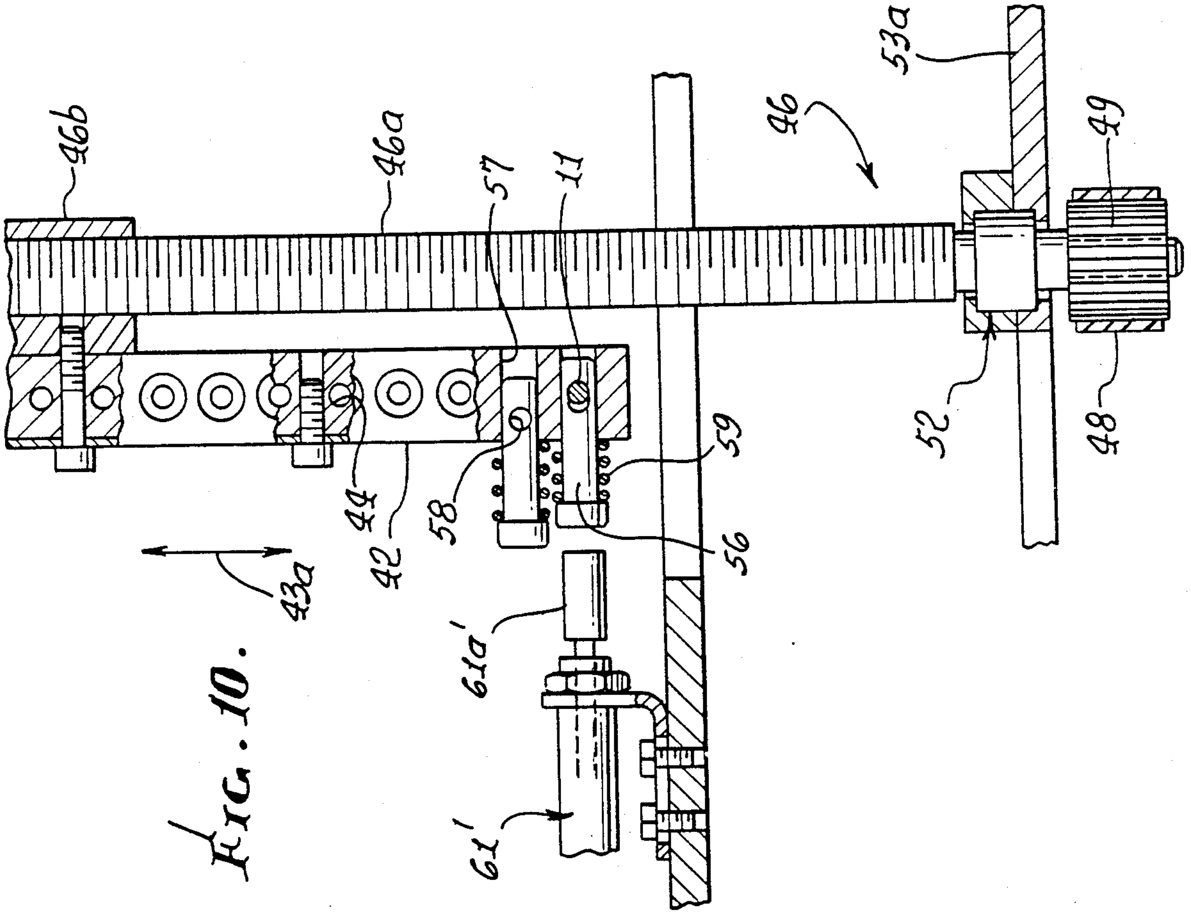
Figure 13A:
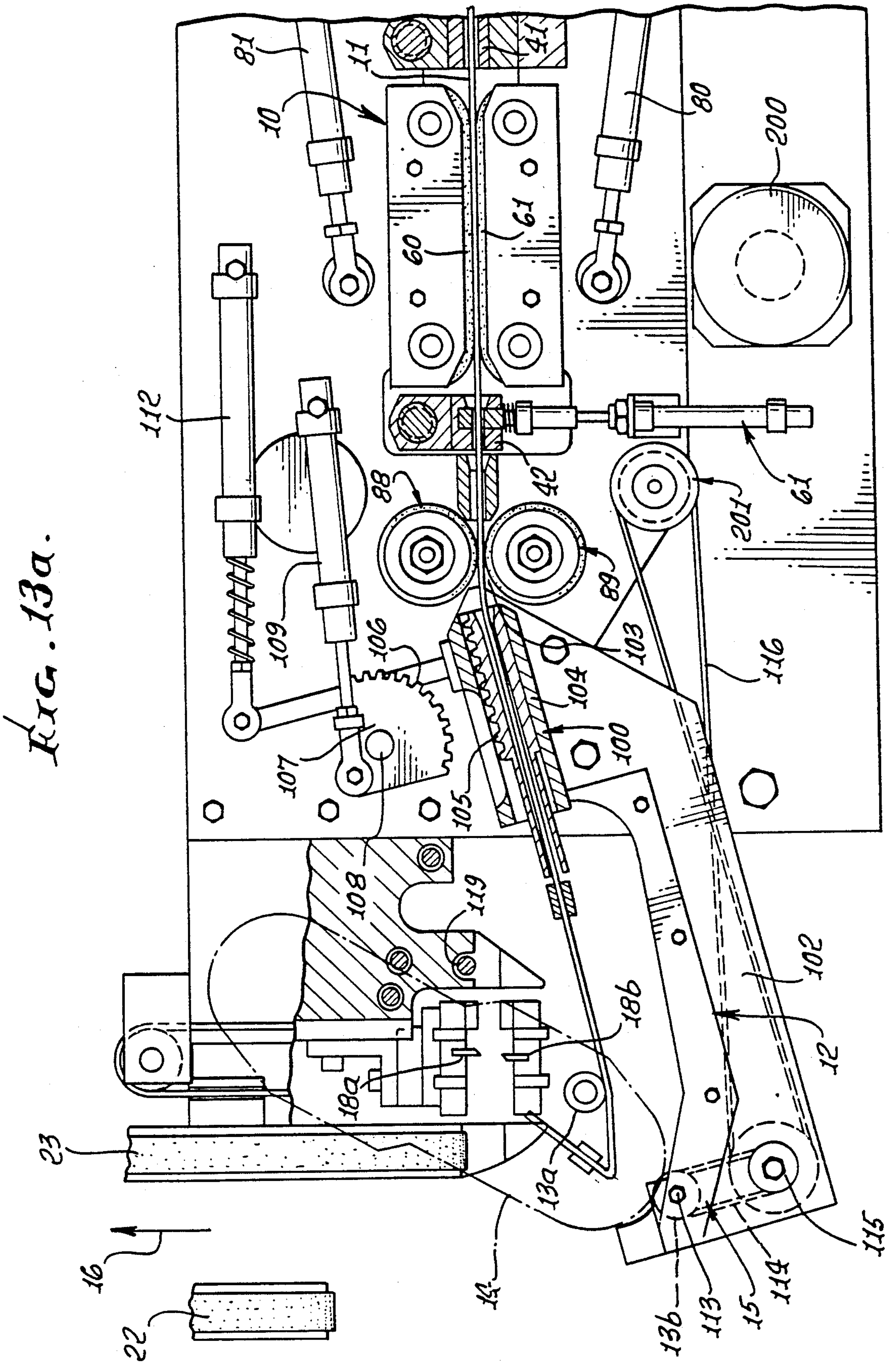
Figure 13B:
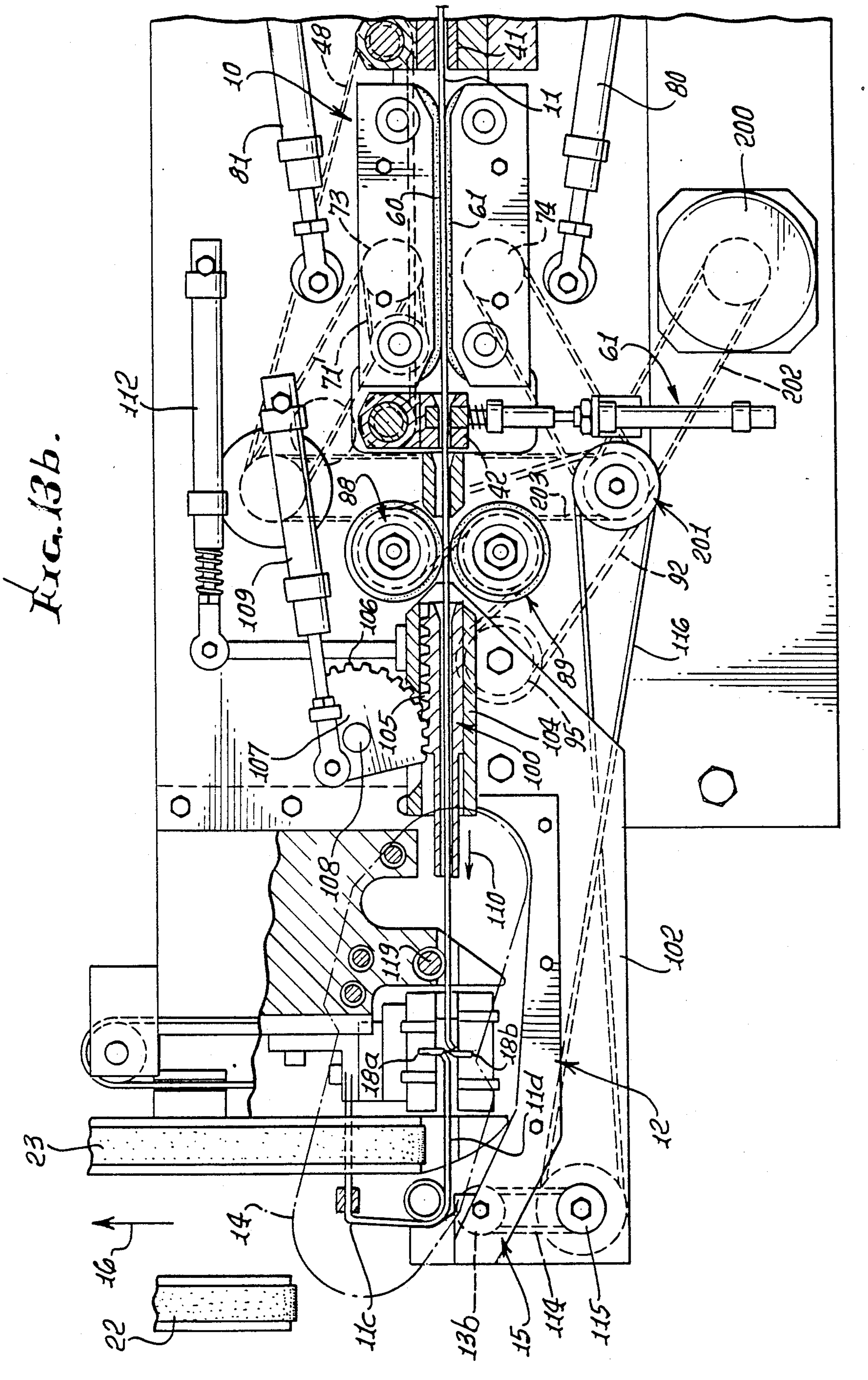
Figure 14:
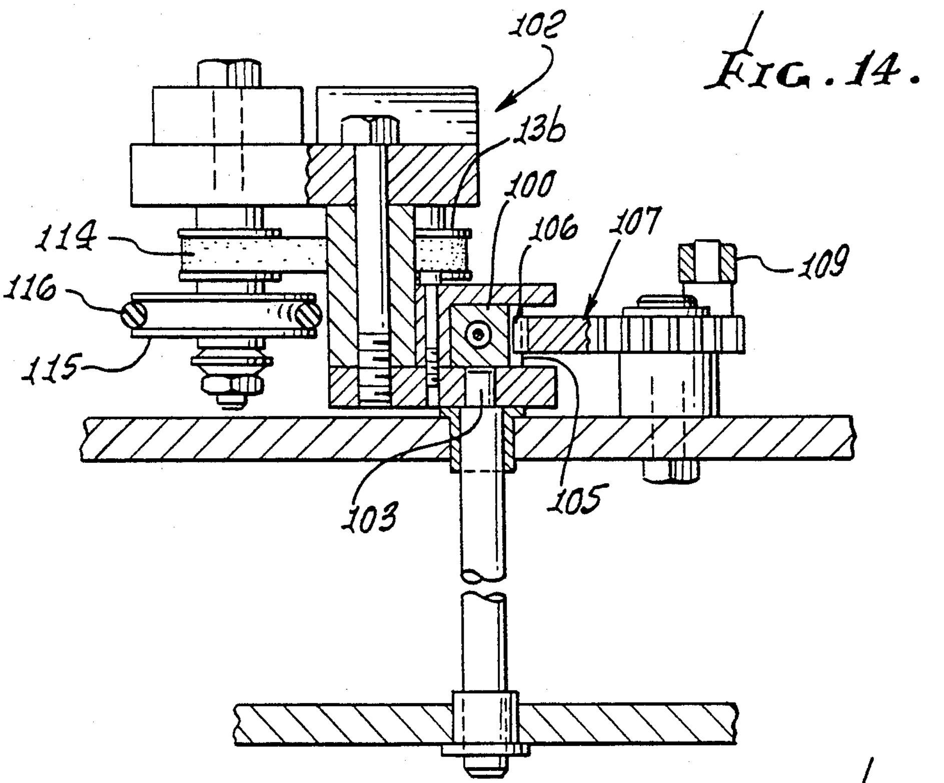
Figure 15:
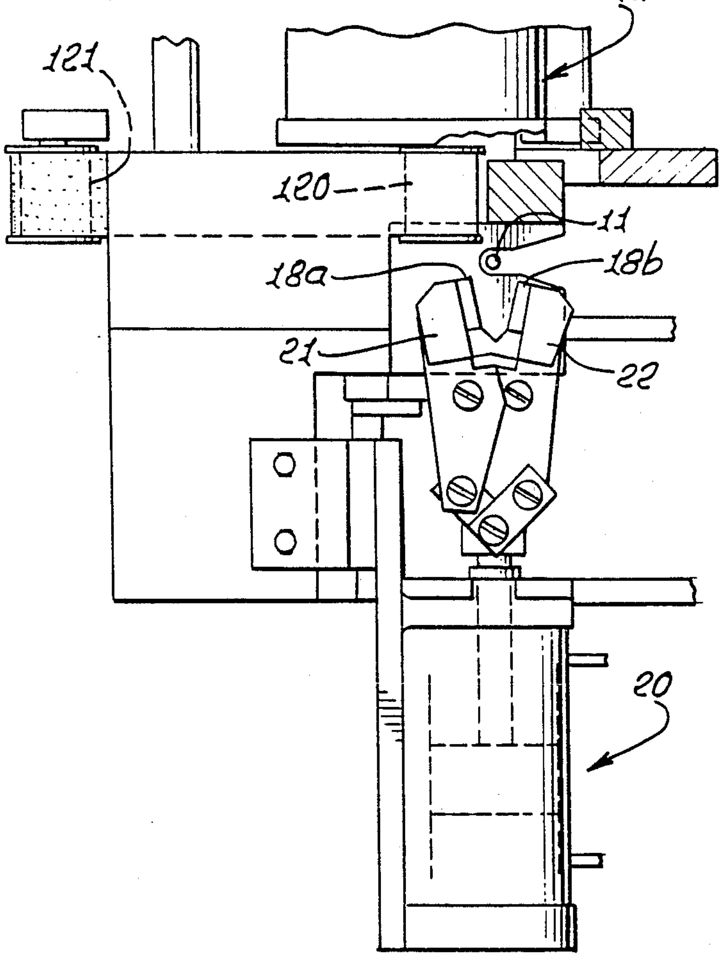
Figure 16:
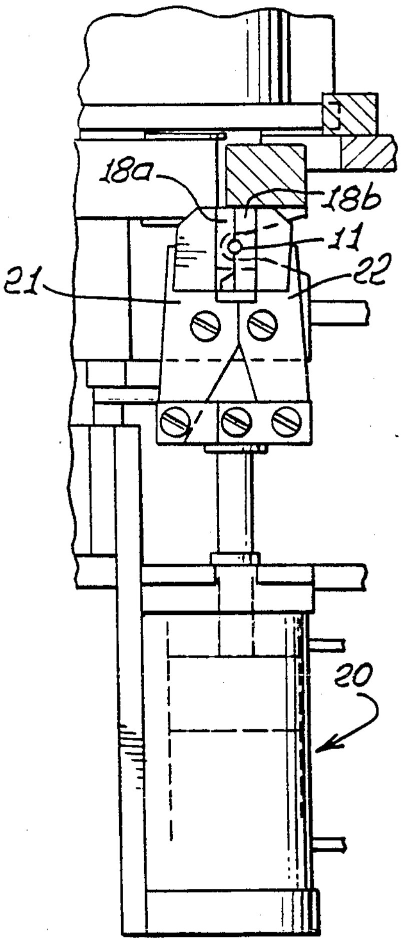
Figure 17:
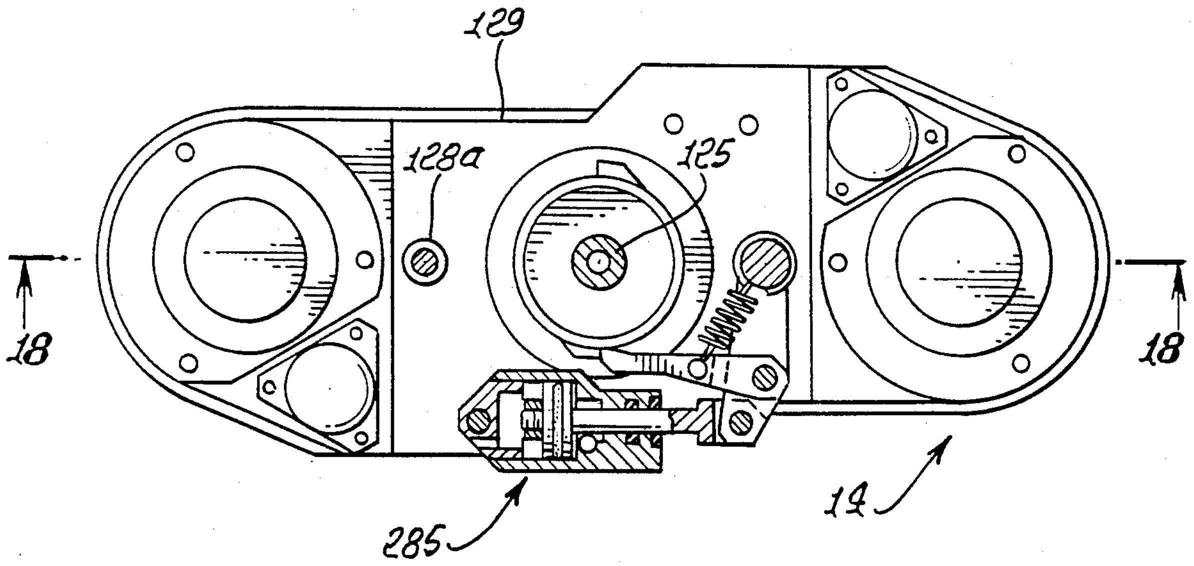
Figure 20:
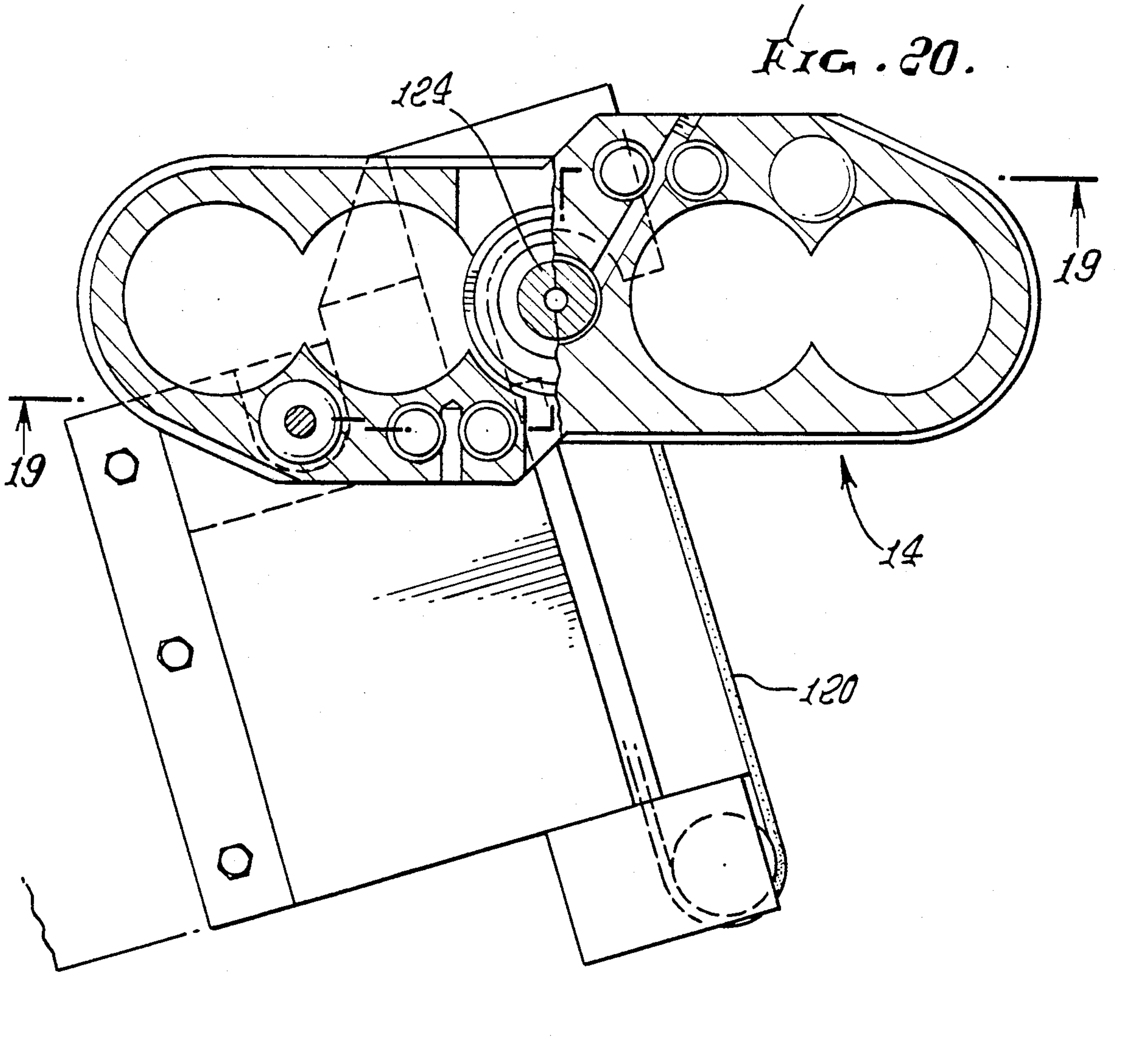
Figure 18:
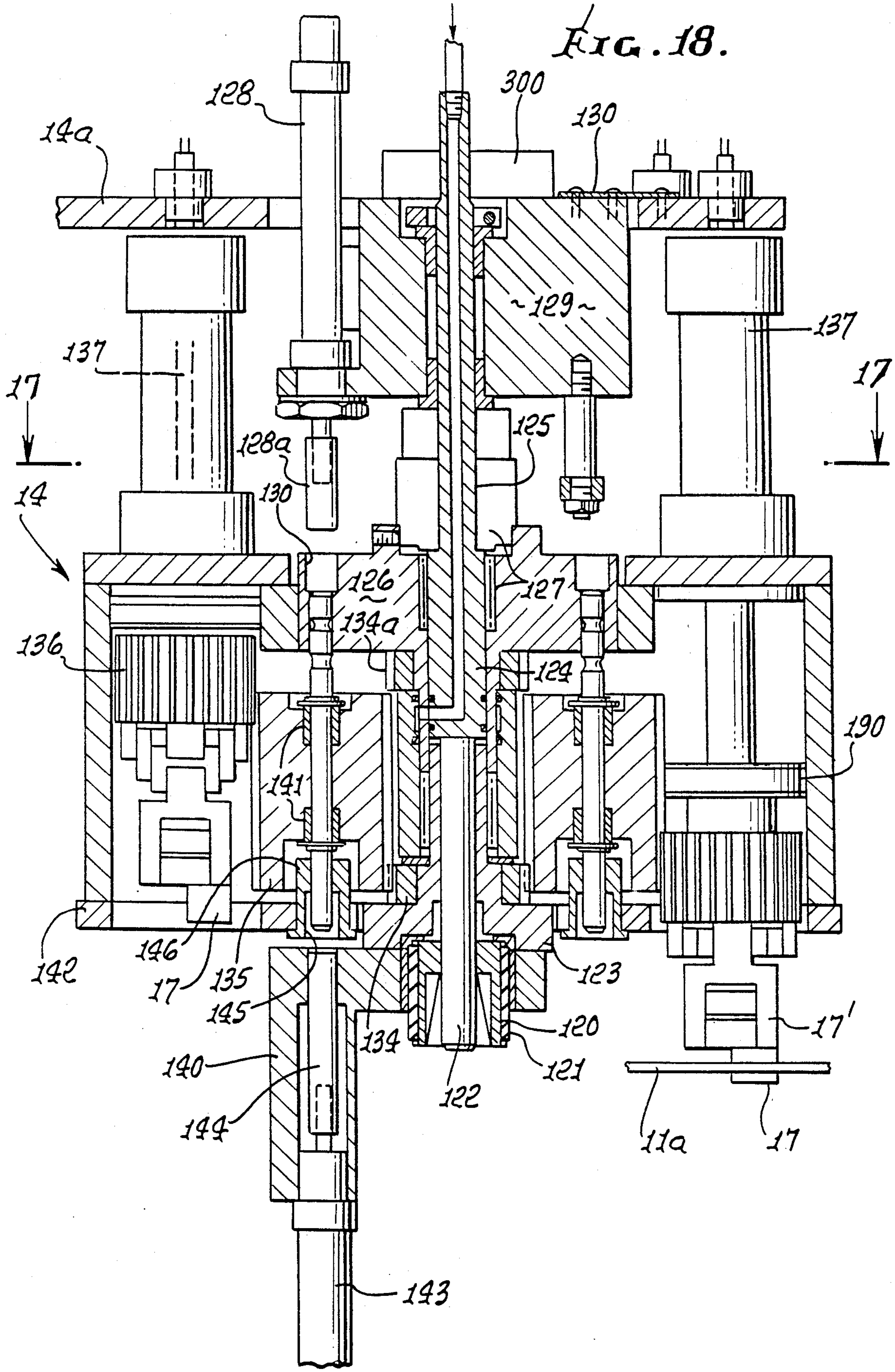
Figure 19:
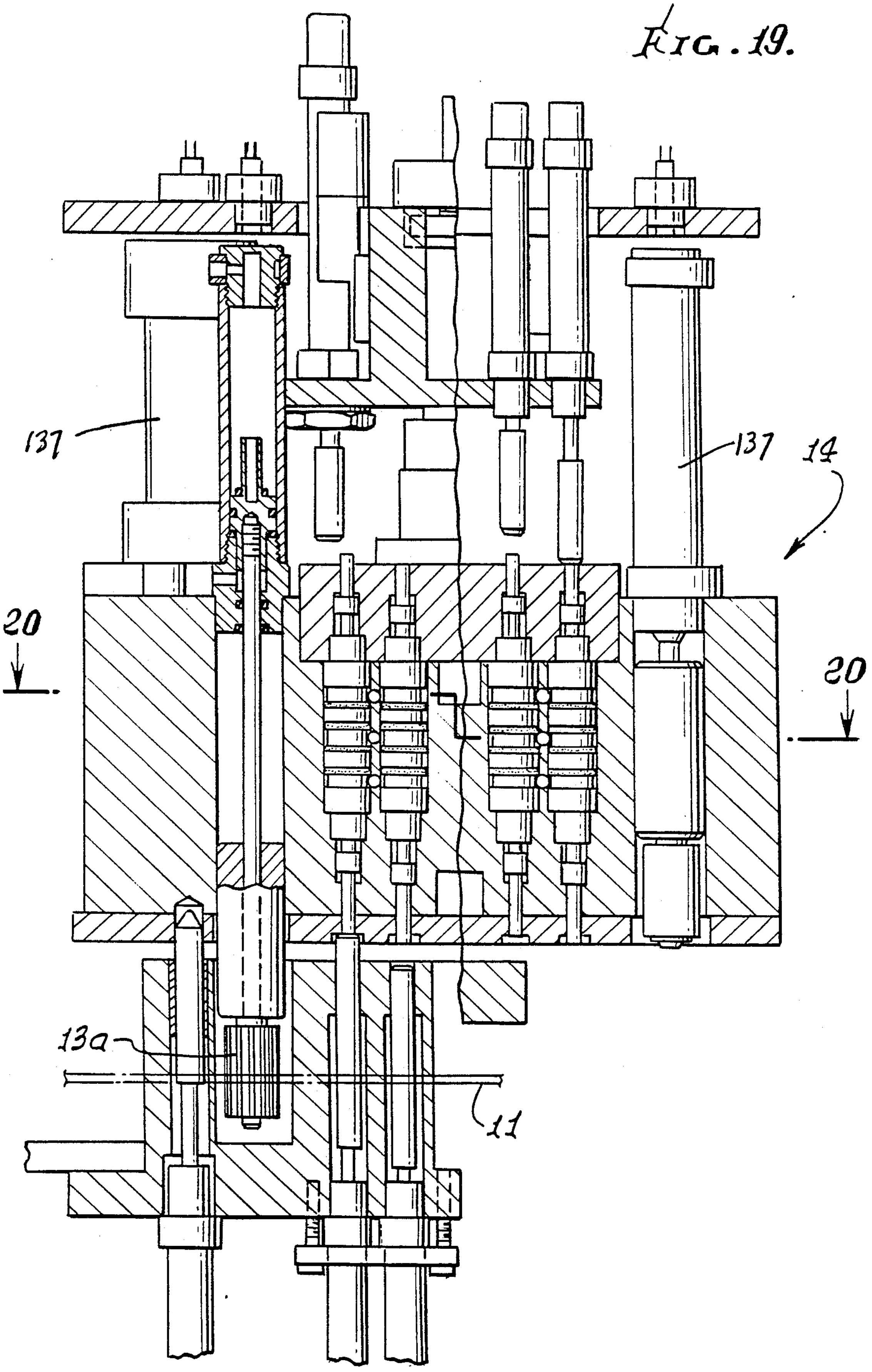
Figure 21A:
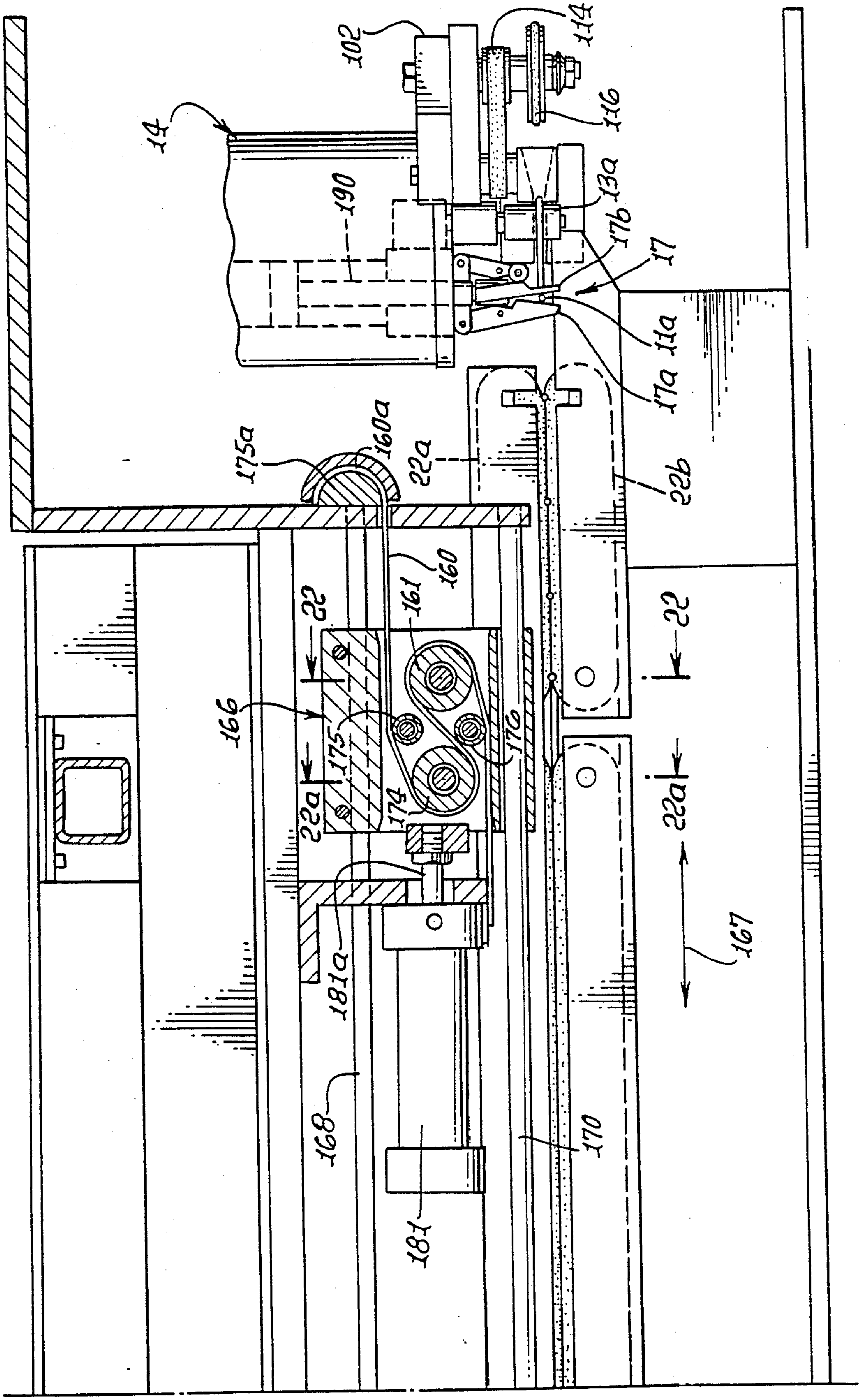
Figure 21B:
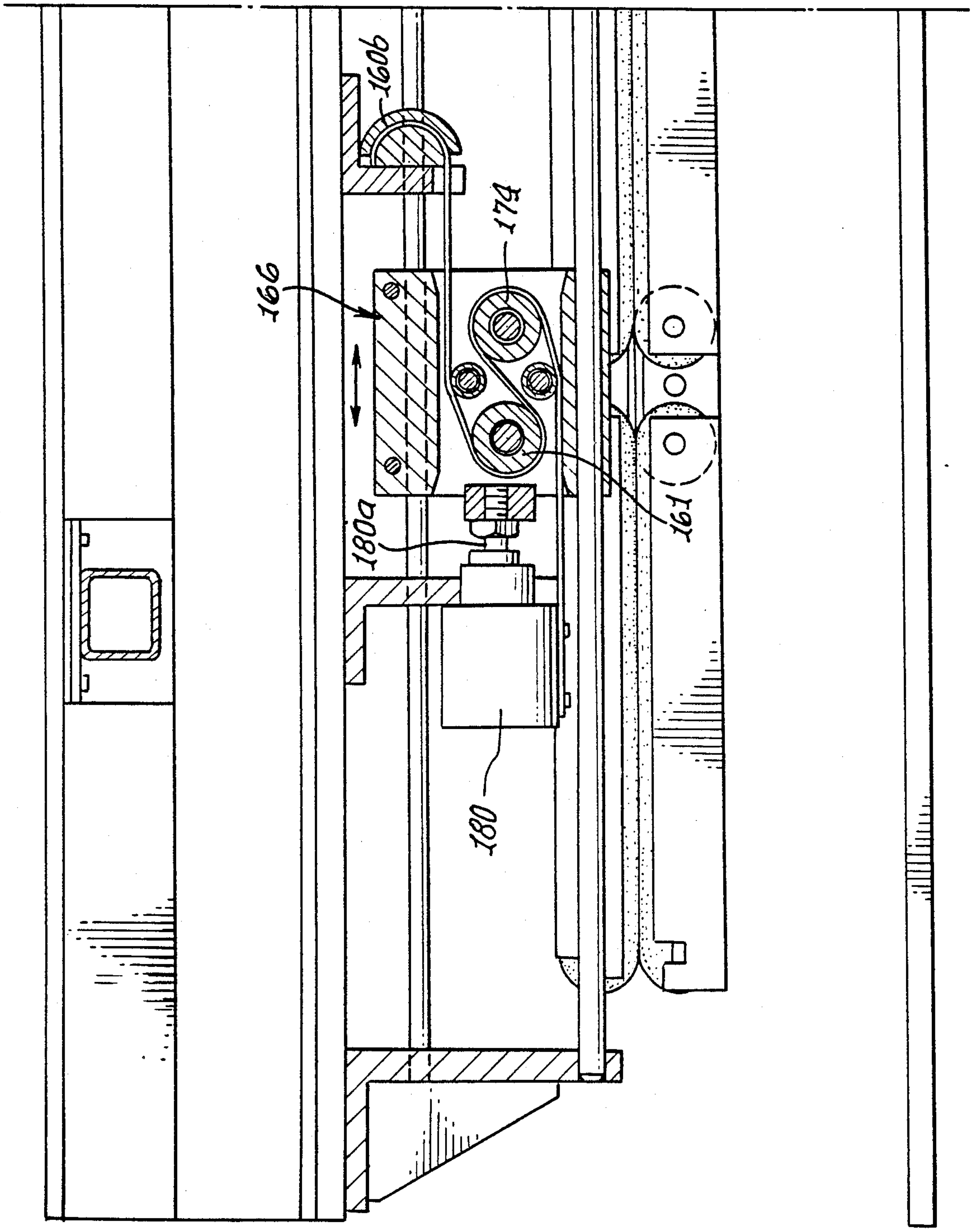
Figure 22:
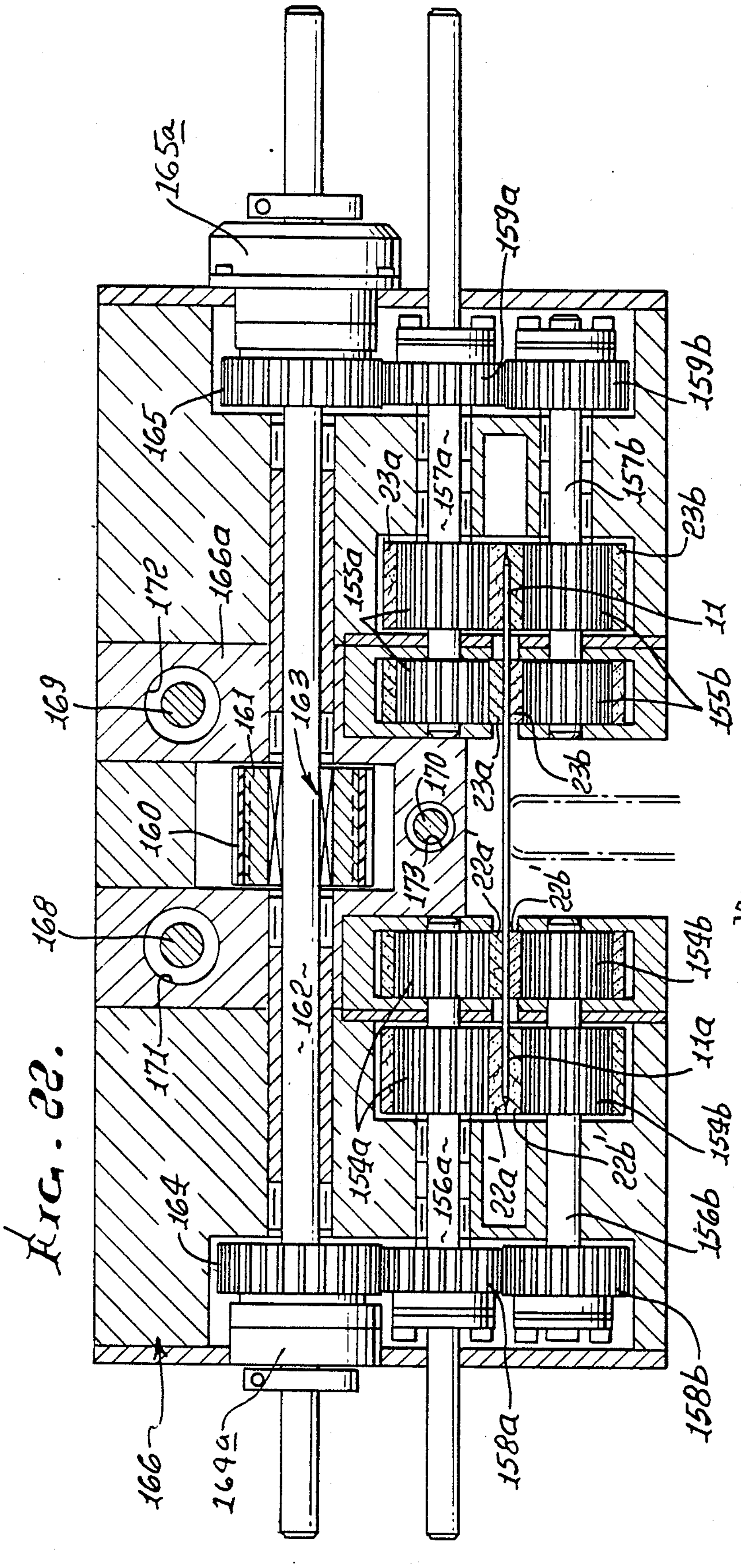

FIG. 2*a* is a cross section through three wires, in a frame;

FIG. 3(*a*) is an enlarged section taken in plan view on lines 3(*a*)—3(*a*) of FIG. 2; and FIGS. 3(*b*)-3(*k*) are views like FIG. 3(*a*) but showing successive steps in wire processing;

FIG. 4 is a vertical section on lines 4—4 of FIG. 3;

FIGS. 5 and 6 are vertical sections taken on lines 5—5 and 6—6 respectively, of FIG. 3(*a*);

FIG. 7 is an enlarged fragmentary plan view sections showing details of a right hand portion of FIG. 3(*a*);

FIG. 8 is a section, in elevation, on lines 8—8 of FIG. 7;

FIG. 9 is a vertical section taken on lines 9—9 of FIG. 7;

FIG. 10 is a vertical section taken on lines 10—10 of FIG. 7;

FIG. 11 is a view taken on lines 11—11 of FIG. 9;

FIG. 12 is a view taken on lines 12—12 of FIG. 9;

FIGS. 13(*a*) and 13(*b*) are enlarged fragmentary plan view sections corresponding to FIGS. 3(*f*) and 3(*g*) and showing a modified form of wire processing;

FIG. 14 is an enlarged section on lines 14—14 of FIG. 3(*f*);

FIG. 15 is an enlarged section on lines 15—15 of FIG. 3(*a*), showing cutter details, prior to cutter closure;

FIG. 16 is a view like FIG. 15, showing actuated cutter details;

FIG. 17 is an enlarged plan view section lines 17—17 of FIG. 18 (see also outline at left hand portion of FIG. 3);

FIG. 18 is a vertical section on lines 18—18 of FIG. 17;

FIG. 19 is a vertical section on lines 19—19 of FIG. 20;

FIG. 20 is a section on lines 20—20 of FIG. 19;

FIG. 21*a* is an elevation, partly in section, showing details of one side of wire section advancement means;

FIG. 21*b* is a view like FIG. 21*a* but showing the opposite side of the apparatus;

FIG. 22 is an enlarged vertical section on lines 13—22 of FIG. 21*a;*

Figure 22A:
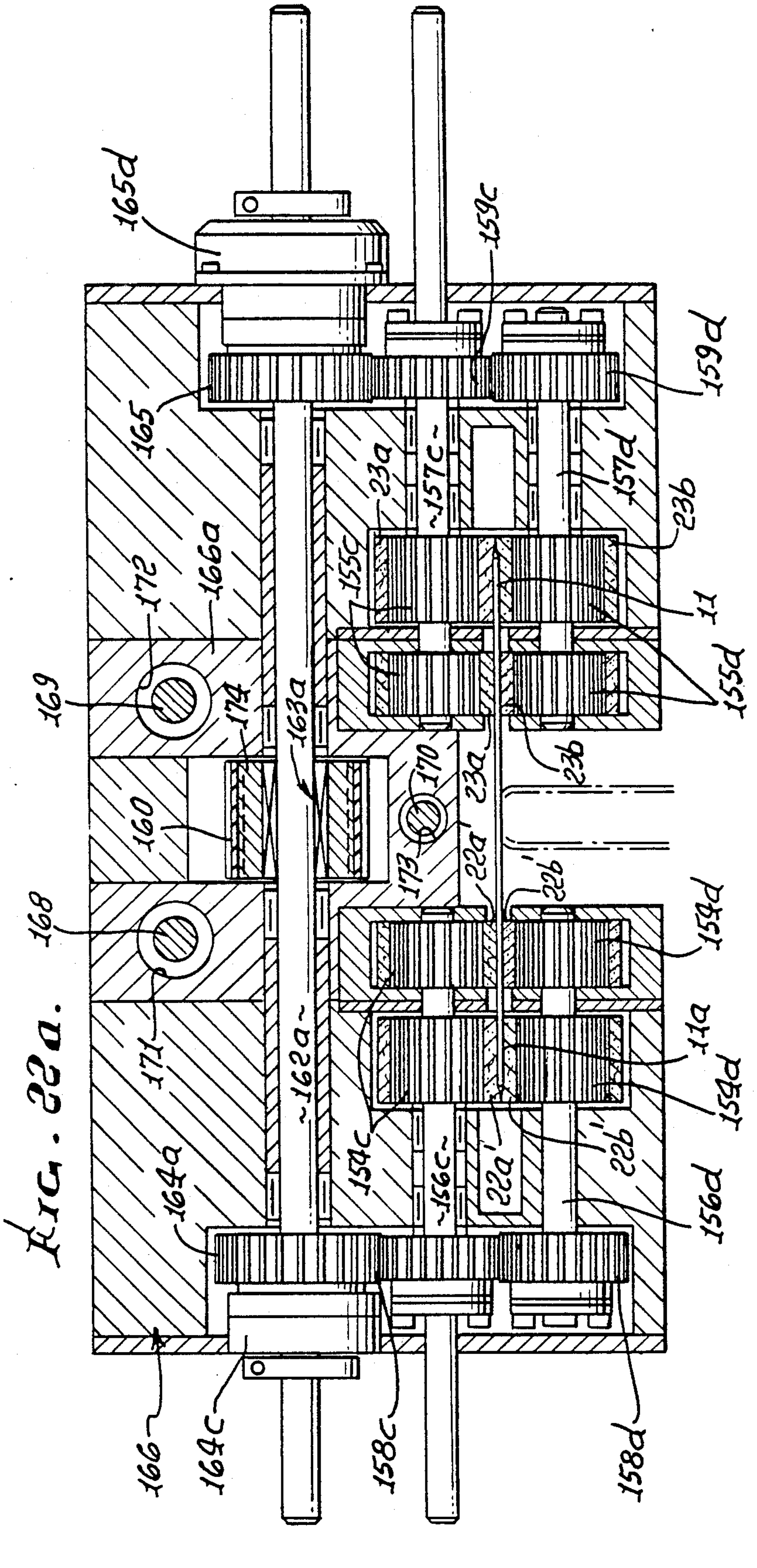

FIG. 22*a* is like FIG. 22, but taken on lines 22*a*—22*a* of FIG. 21*a;*

Figure 23:
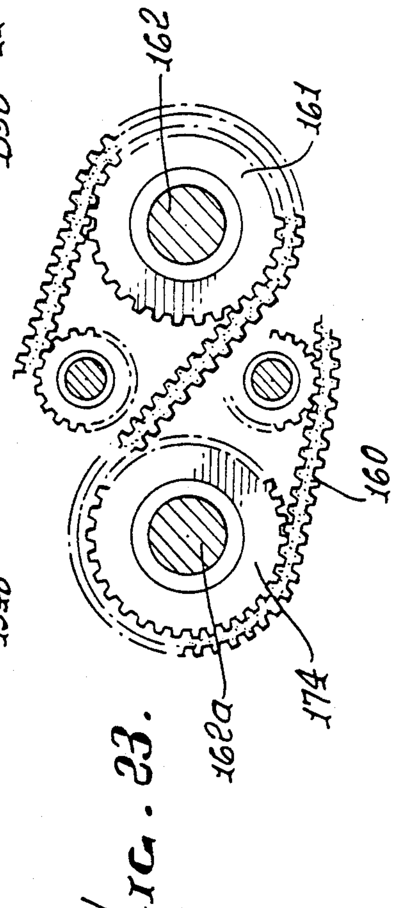
Figure 22B:
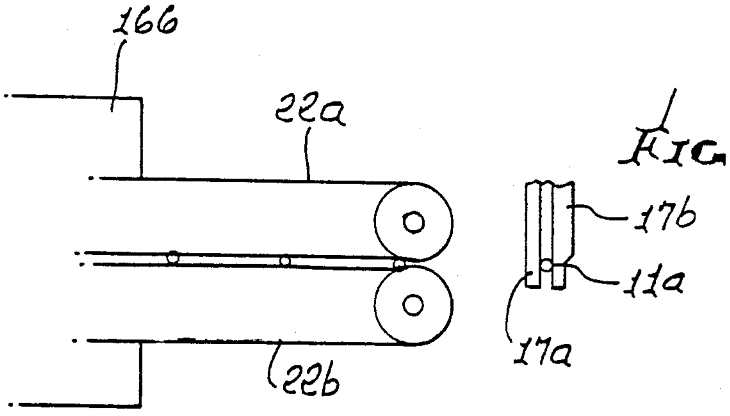
Figure 22B:
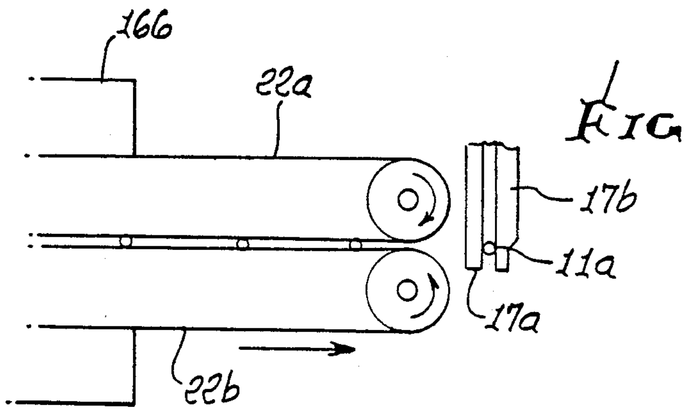
Figure 22B:
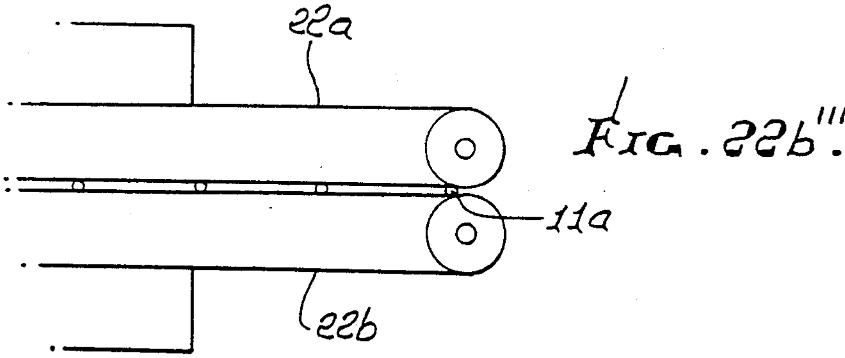

FIGS. 22*b', b'', b''', c', c''*, *d'* and *d''* are diagrams;

FIG. 23 is an enlarged side elevation showing details of a timing belt shown in FIGS. 21*a* and 21*b;*

Figure 24A:
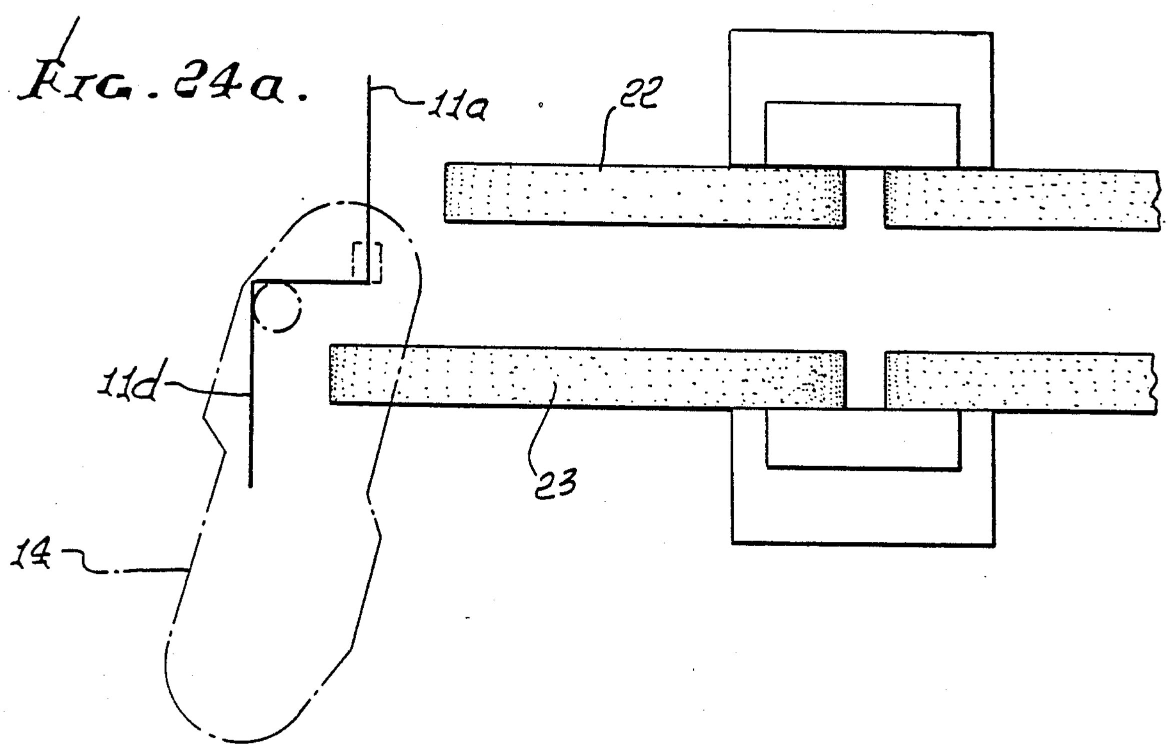
Figure 24B:
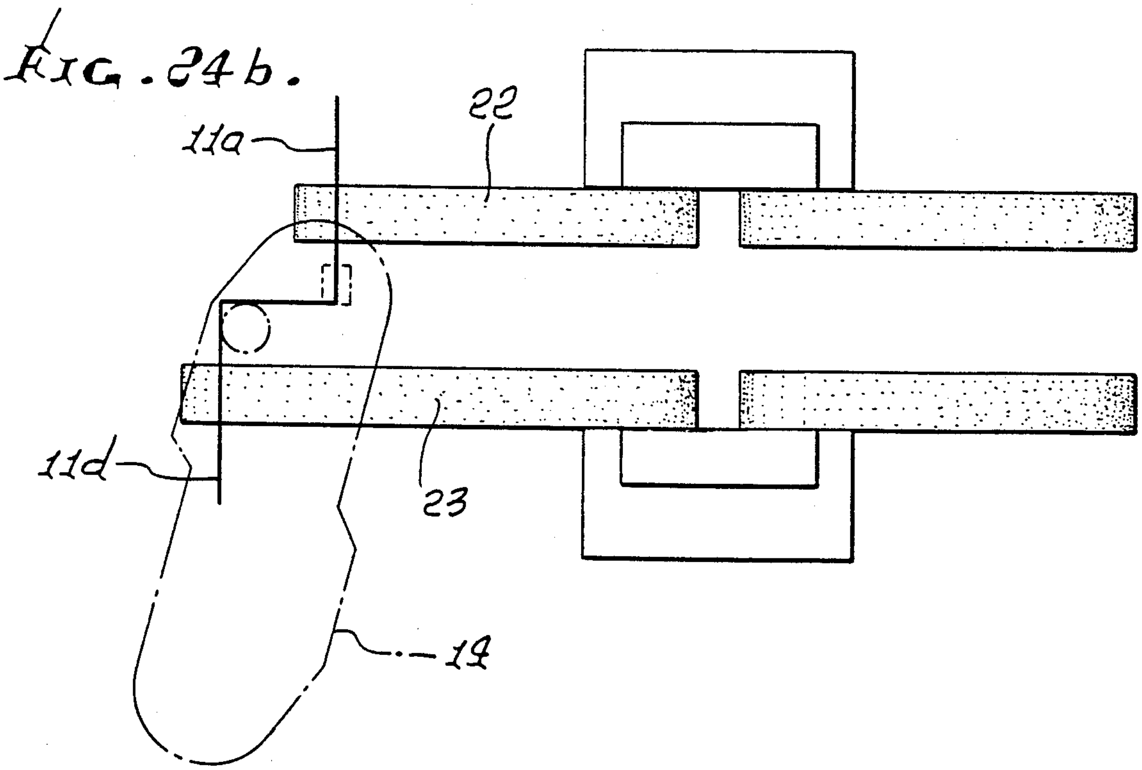
Figure 24C:
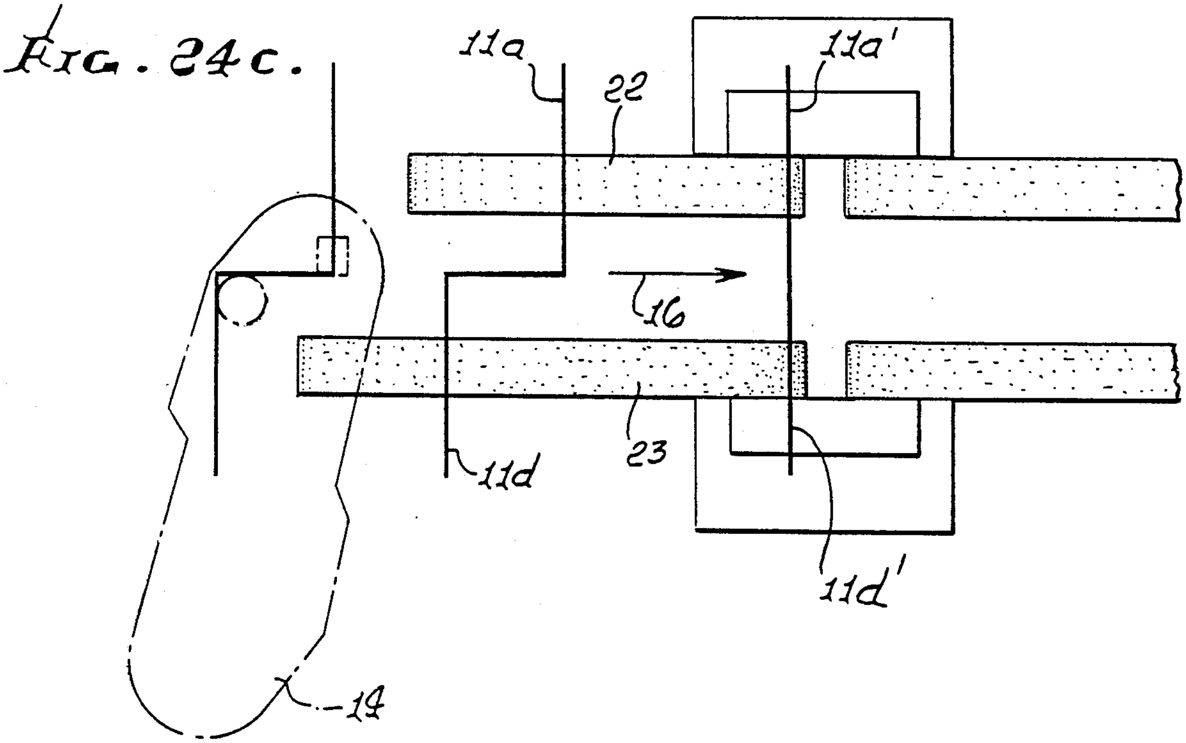
Figure 25:
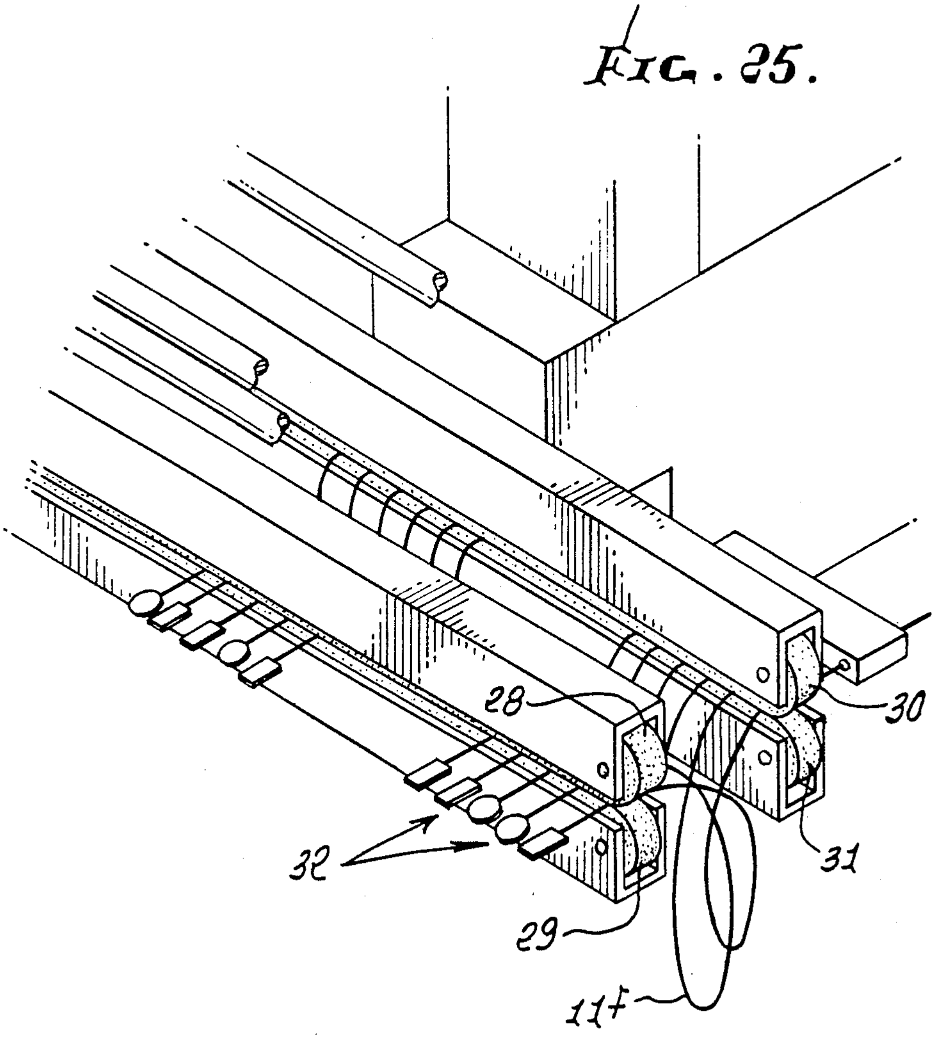
Figure 26:
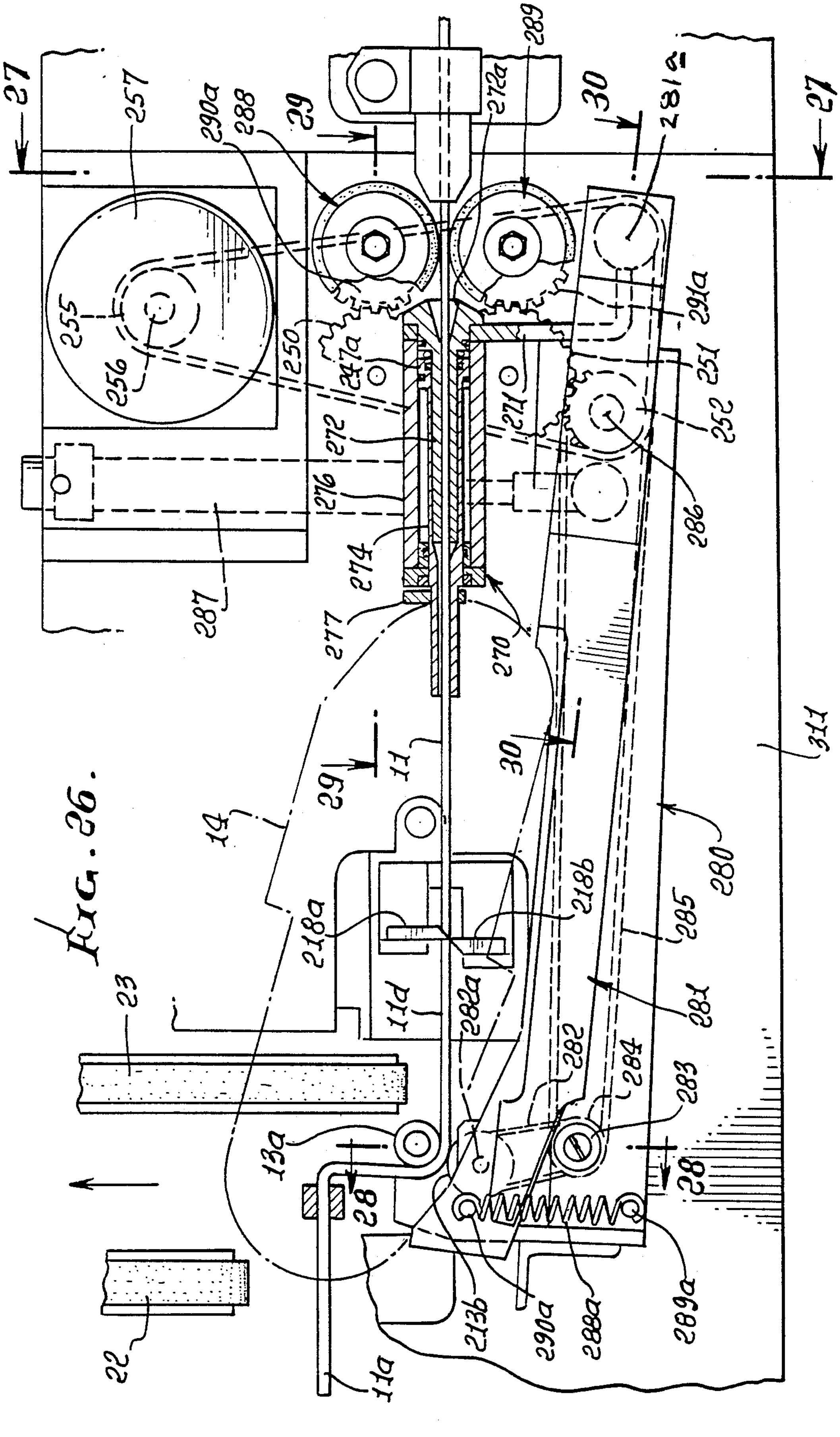
Figure 27:
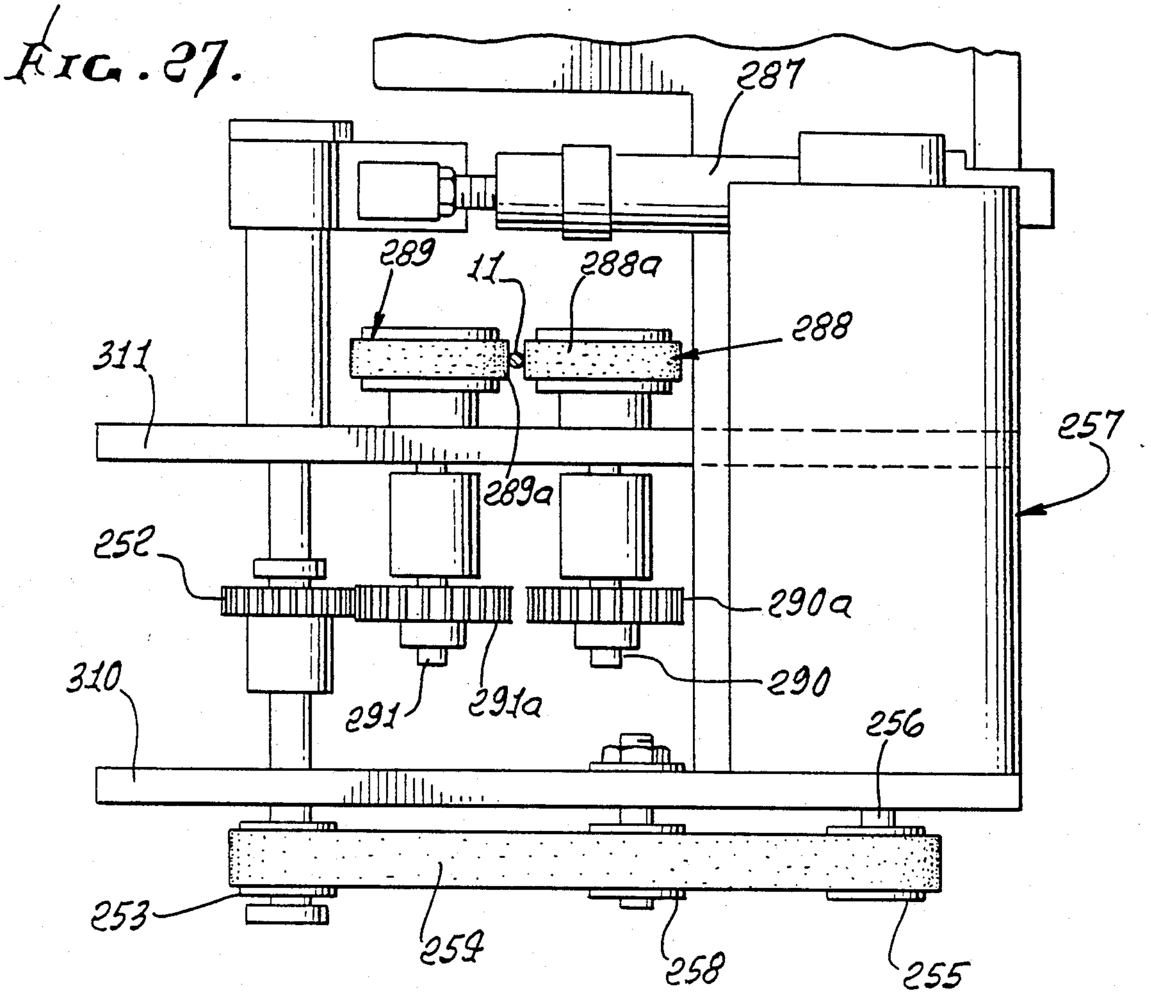
Figure 28:
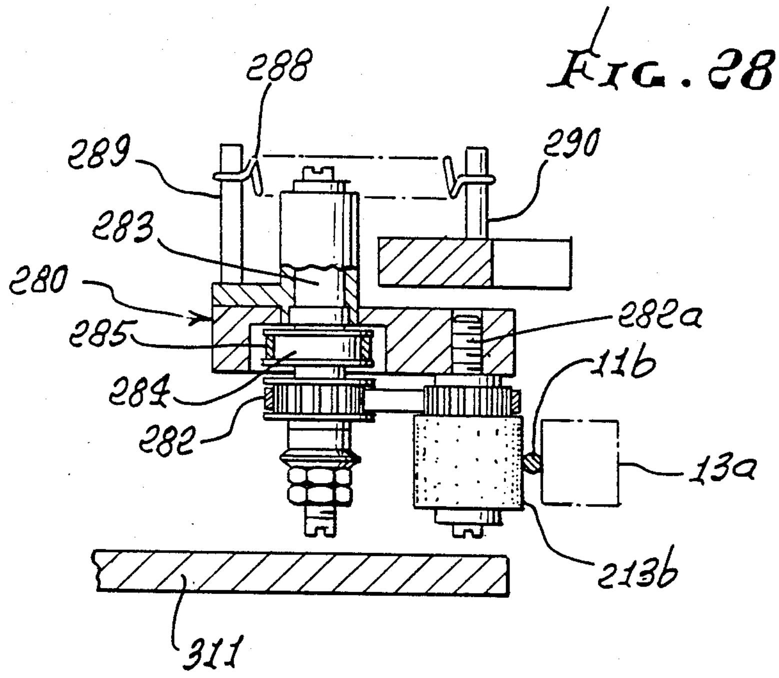

FIGS. 24*a*–24*c* illustrate schematically, the loading of wires onto conveyors;

FIG. 25 shows wires being advanced by conveyor belt, with their ends processed, as by applying terminations;

FIG. 26 is a side elevation view like FIG. 3, and also FIG. 13, but showing modified apparatus;

FIG. 27 is a section on lines 27—27 of FIG. 26;

FIG. 28 is a fragmentary section on lines 28—28 of

Figure 29:
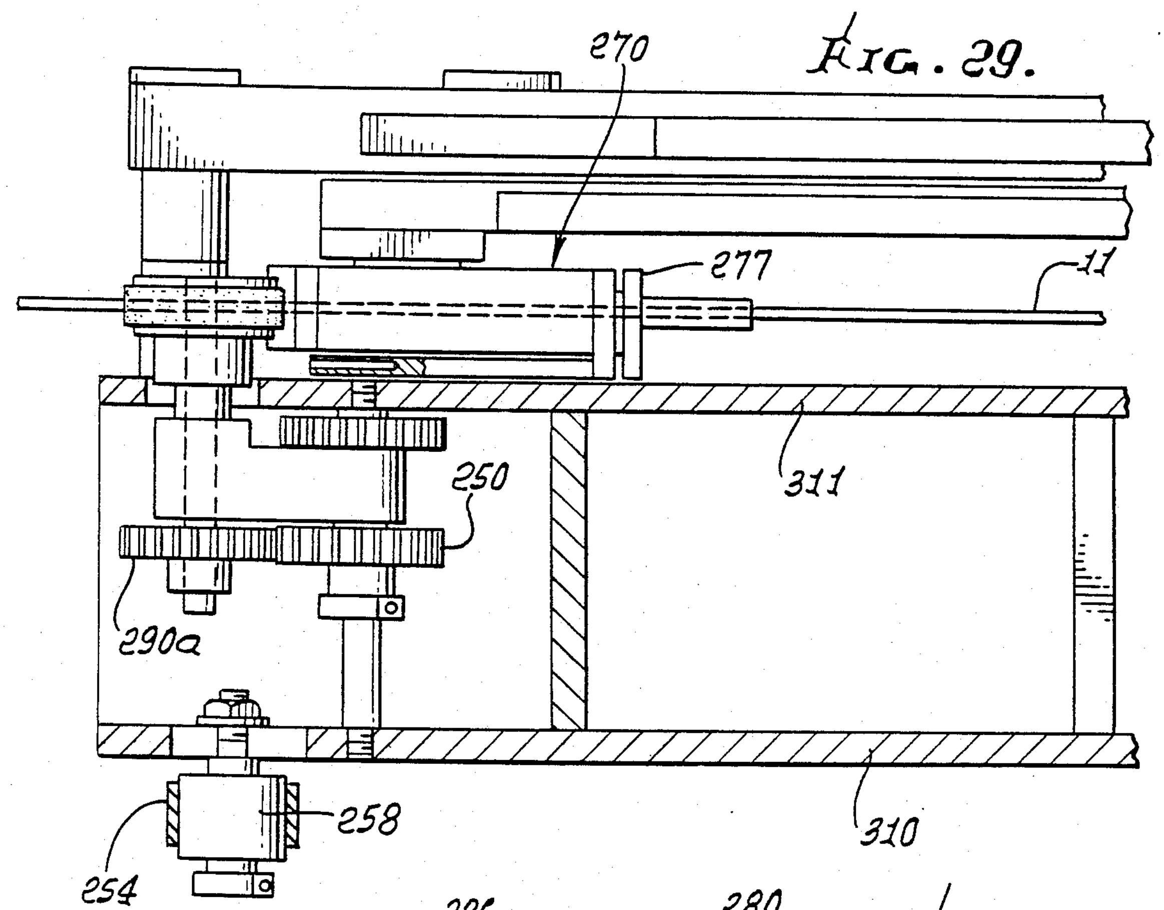
Figure 30:
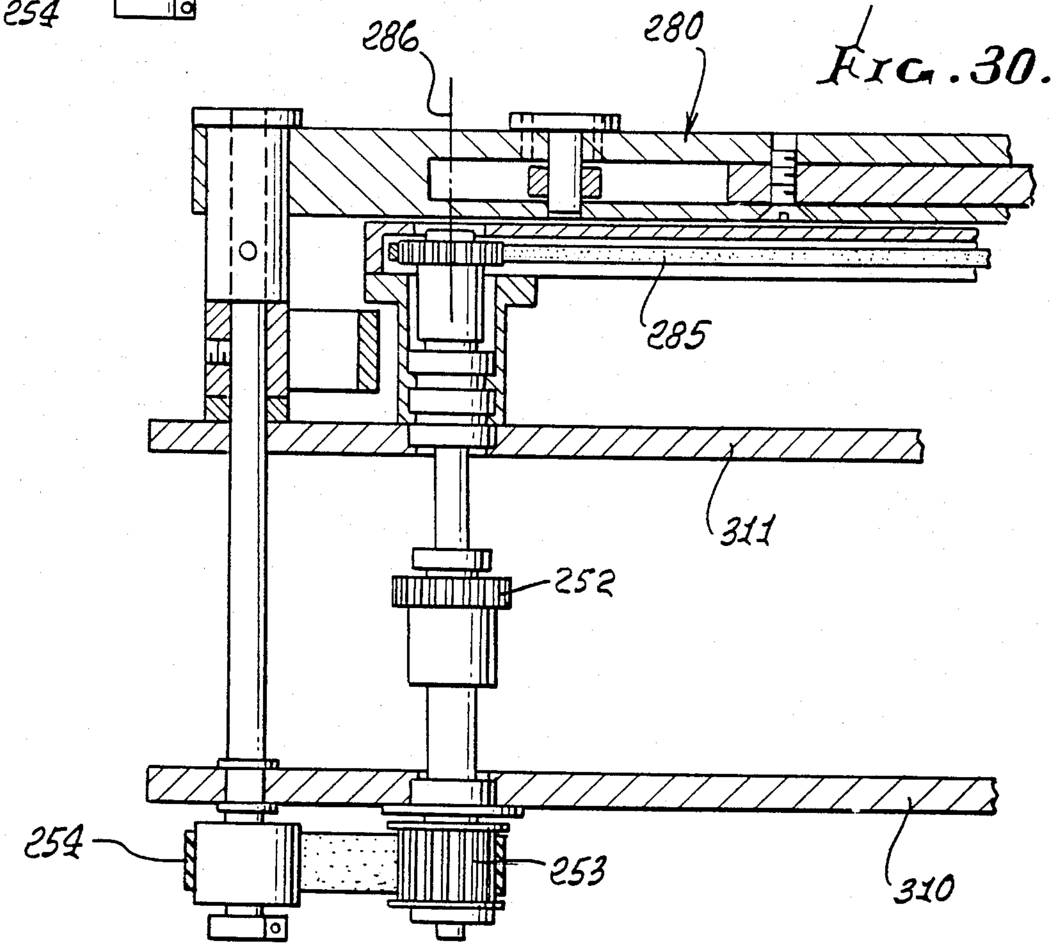
Figure 31A:
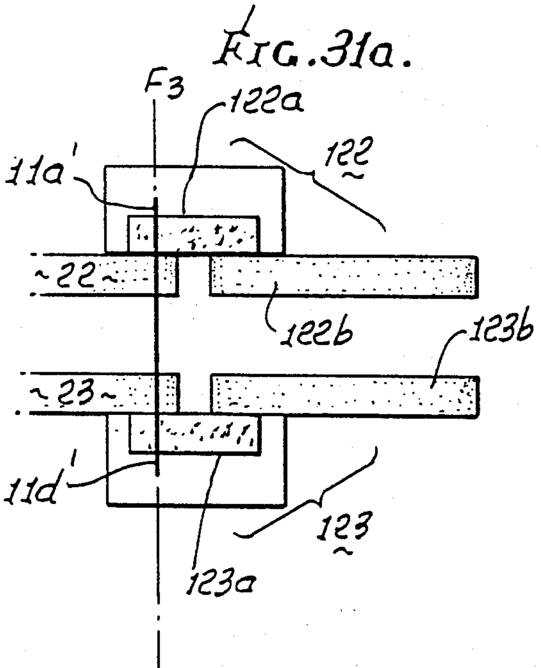
Figure 31D:
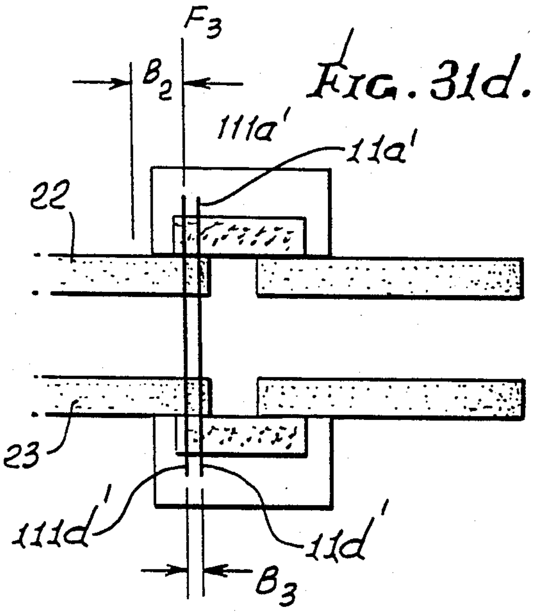
Figure 31B:
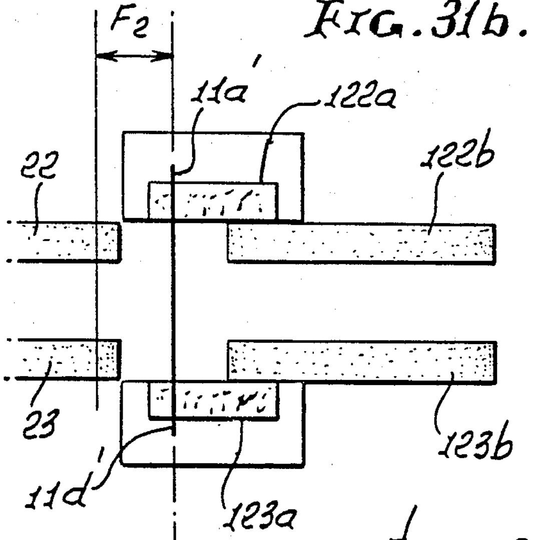
Figure 31E:
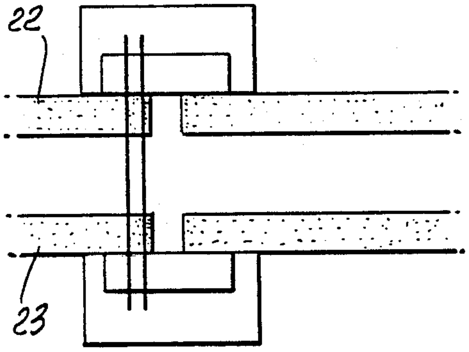
Figure 31C:
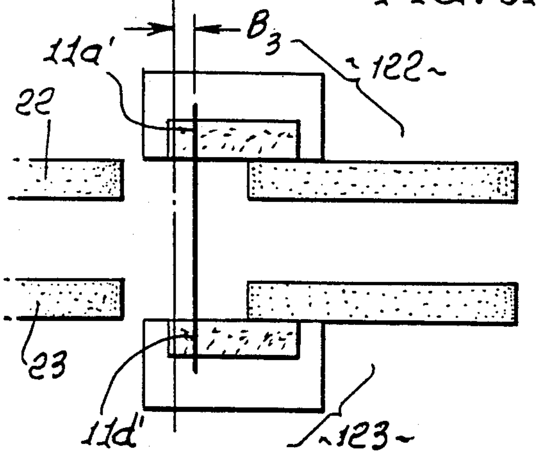
Figure 3F:
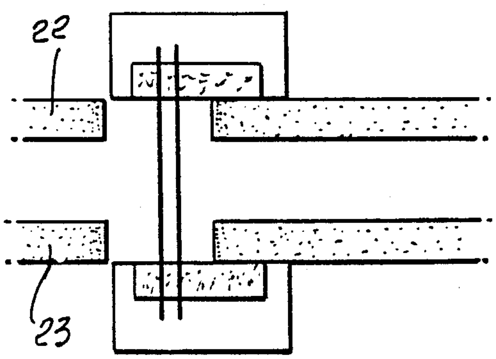
Figure 31G:
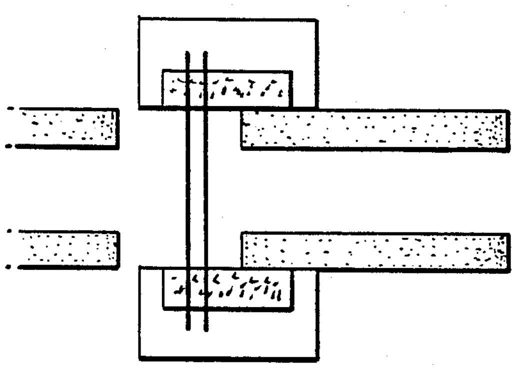
Figure 31I:
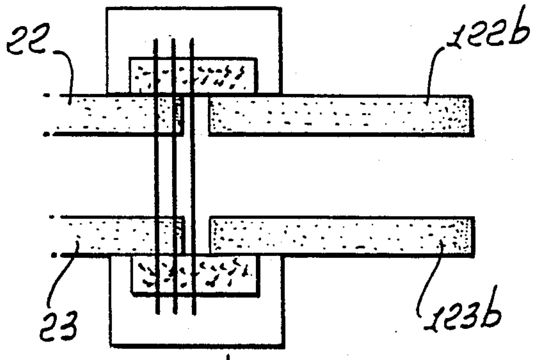
Figure 31H:
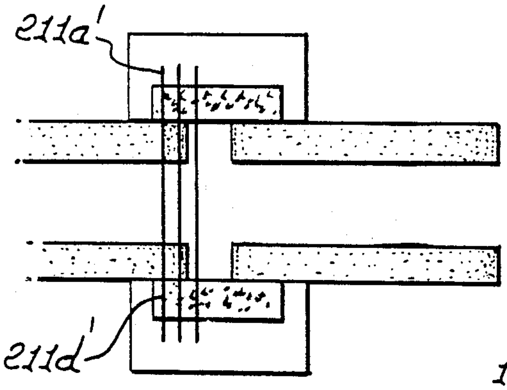
Figure 31N:
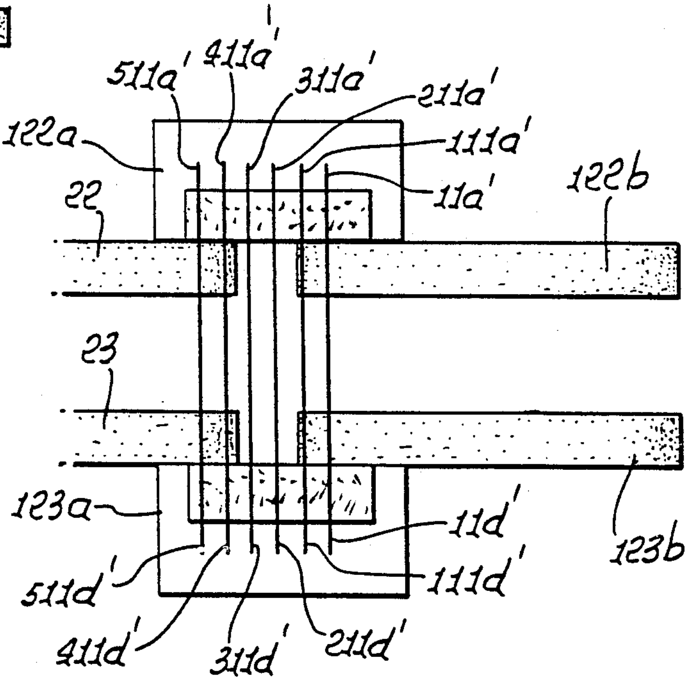
Figure 32:
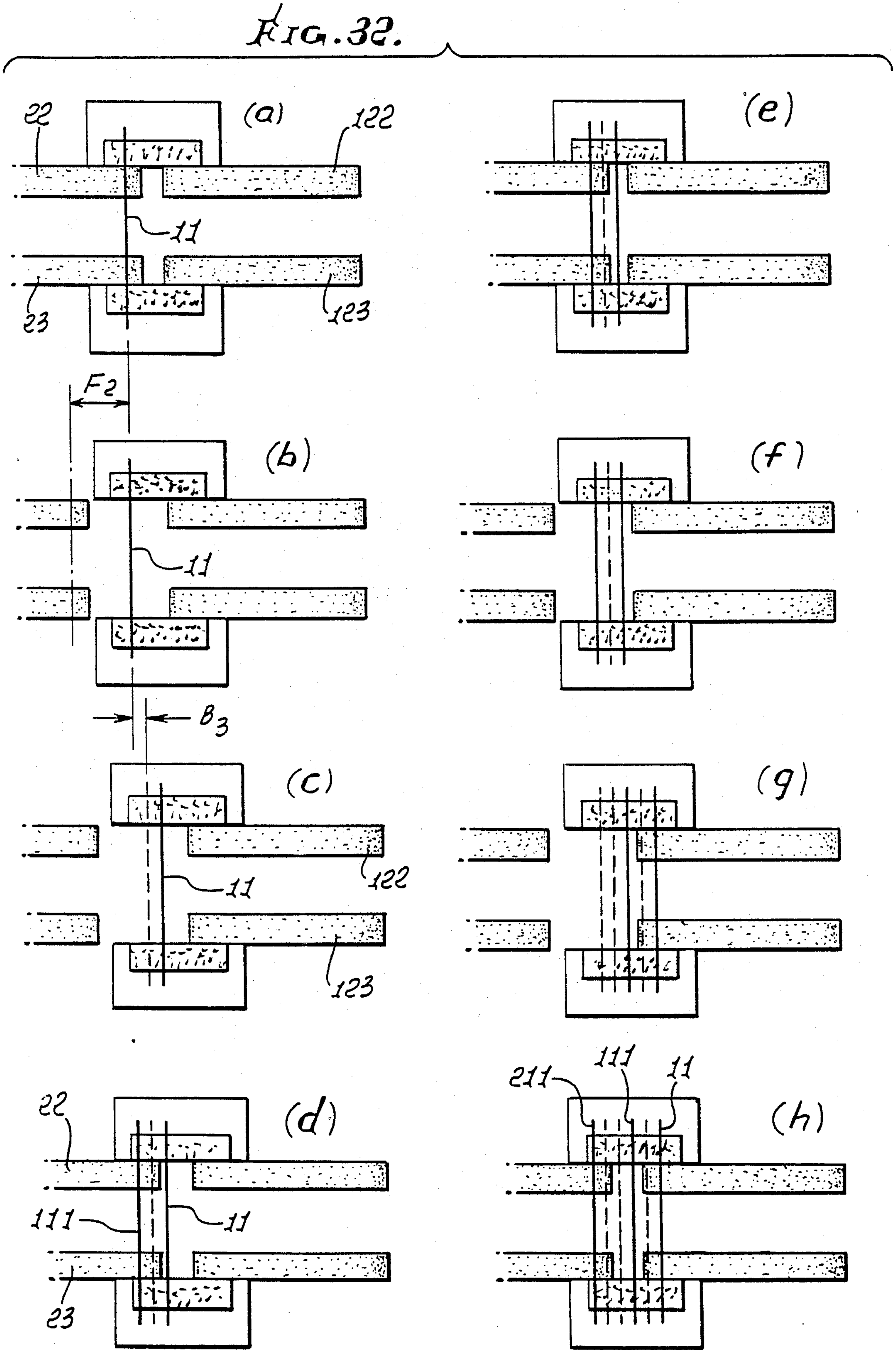
Figure 33:
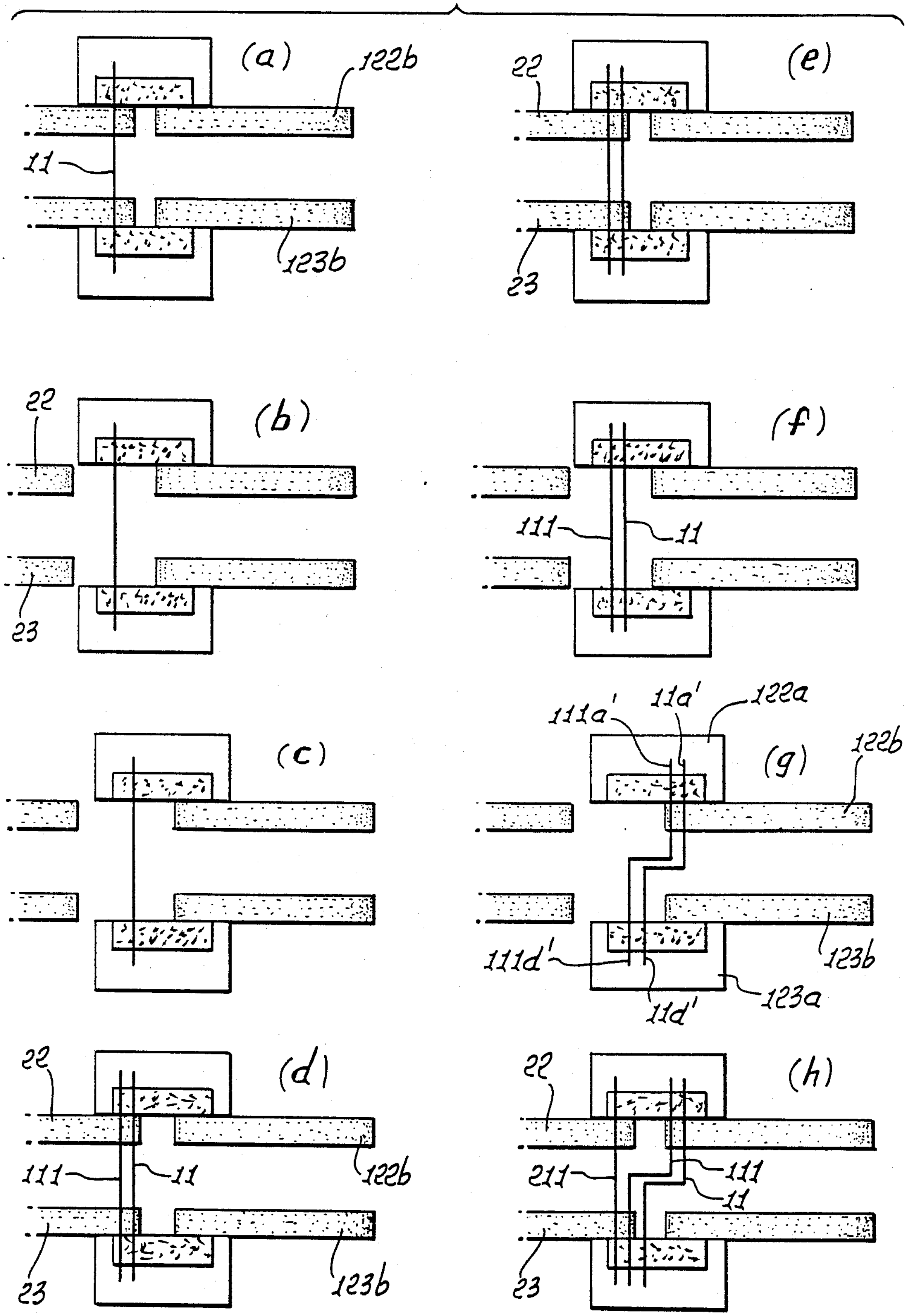
Figure 33I:
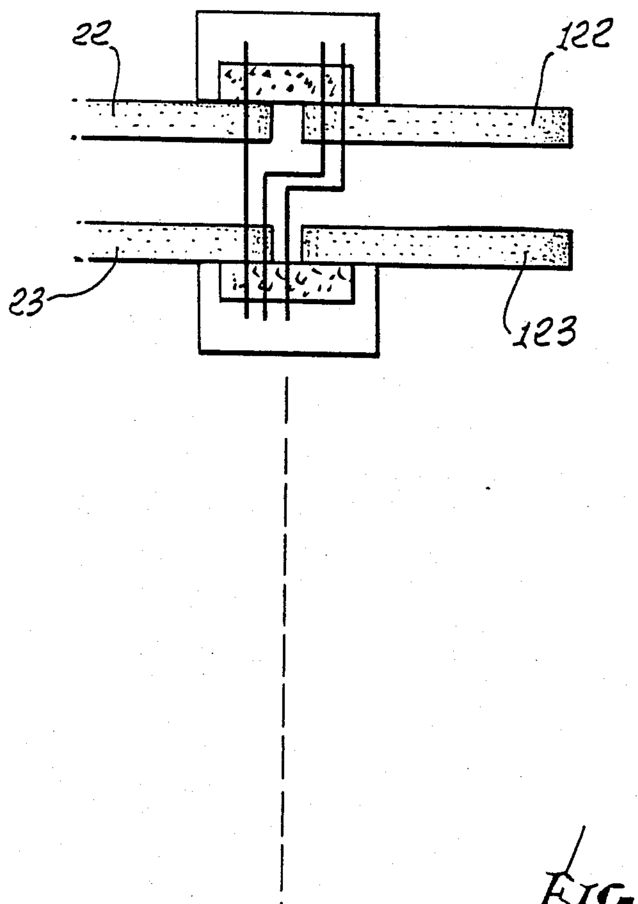
Figure 33N:
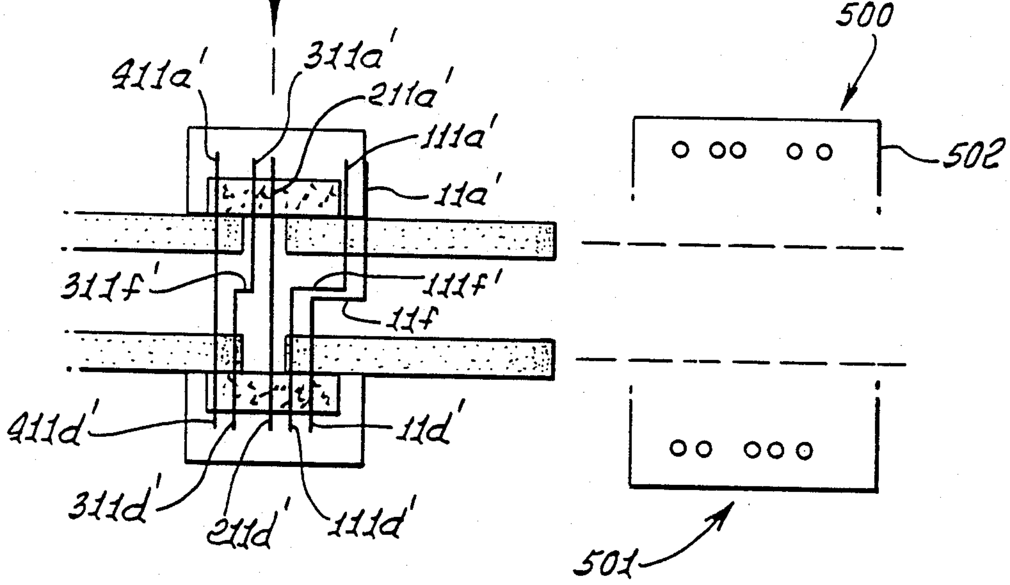
Figure 34:
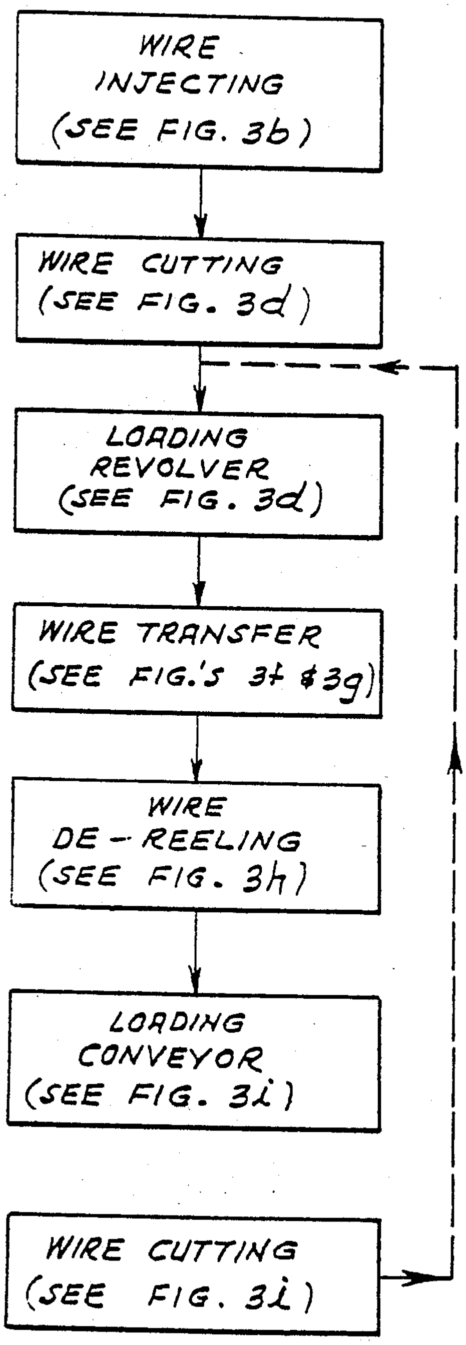
Figure 35:
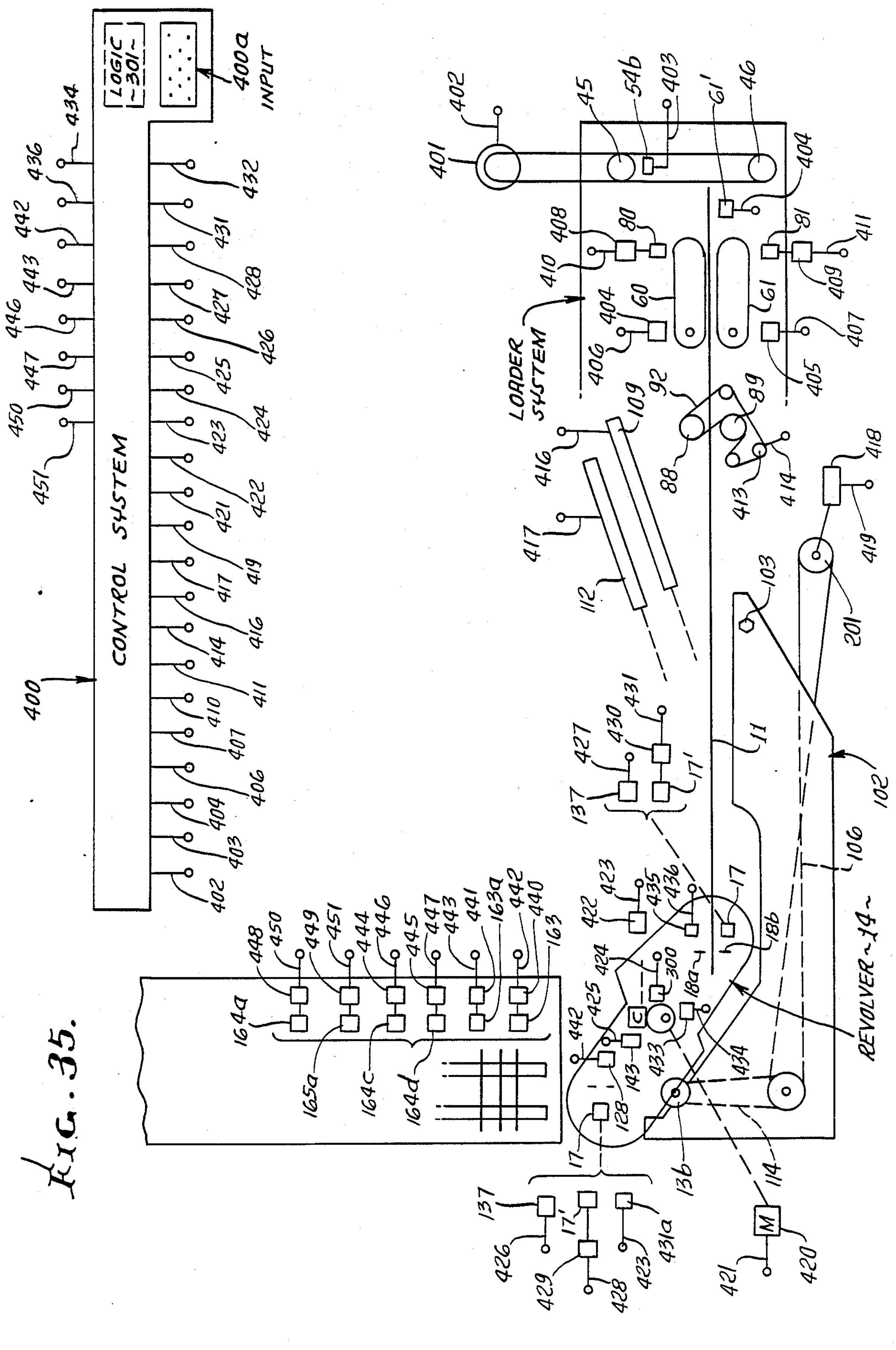

FIG. 29 is a plan view on lines 29—29 of FIG. 26;

FIG. 30 is a sectional plan view on lines 30—30 of FIG. 26;

FIG. 31(*a*)–(*i*) and (*n*) are schematic showings of wire conveyors;

FIG. 32(*a*)–(*h*) are schematic showings of wire conveyors;

FIGS. 33(*a*)–(*i*) and (*n*) are schematic showings of wire conveyors;

FIG. 34 is a block diagram;

FIG. 35 is a schematic control diagram.

GENERAL DESCRIPTION

Figure 1A:
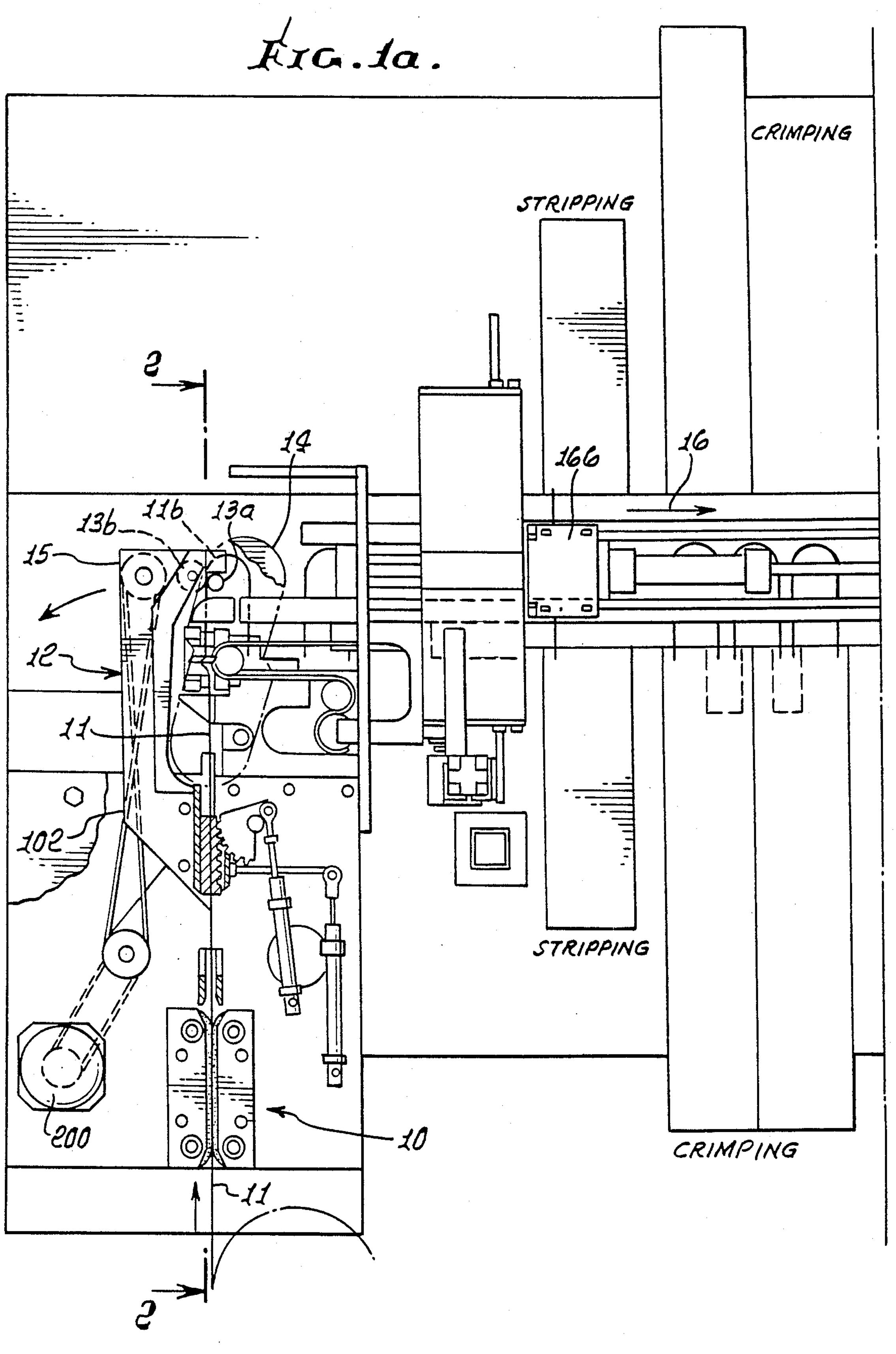
FIG. 1 is a plan view of apparatus incorporating the invention, and depicted in views 1*a* and 1*b;*

Referring first to FIGS. 1-3(*a*), a first means seen at 10 advances a selected wire 11 toward a primary station indicated generally at 12, the wire traveling leftwardly in FIGS. 3(*a*) and 3(*b*). The wire being advanced has a forward end portion indicated at 11*a* in FIG. 3(*b*); also it is typically insulation covered.

Also provided is wire deforming means at the primary station to form at least one bend in the advancing wire, one such a bend indicated at 11*b* , for example in FIG. 3(*g*). In the example, the deforming means includes a first forming element, such as a roller 13*a* (see FIG. 3(*g*) carried by a rotary or revolver apparatus 14, and a secondary roller 13*b* on a carrier 15 separate from apparatus 14. As will appear, the apparatus 14 and carrier 15 will function not only to hold elements 13*a* and 13*b* in wire bend forming position, but also to transport elements 13*a* and 13*b* out of interferring relation with subsequent travel of the formed wire section by conveyor apparatus, in longitudinal direction 16, in FIG. 3(*a*).

Also provided is clamp means at the primary station to clamp the forward portion 11*a* of the wire that has approached endwise toward the wire deforming (bend forming) means, as at 13*a* and 13*b*. One such clamp is indicated generally at 17 in FIG. 3(*d*), and it will be understood as rotatable about an axis normal to the plane of FIG. 3(*d*) so as to bend the wire as at 11*c*, in FIG. 3(*g*) to an extent causing the wire end portion 11(*a*) to be presented laterally for processing, during its subsequent travel longitudinally in direction 16.

Also provided is cutter means to sever the wire after a selected length thereof has advanced past the cutter means, whereby a wire section of predetermined length is formed. The cutter means may include blades 18*a* and 18*b* as seen in FIGS. 3(*a*)-3(*k*) and also appearing in open position in FIG. 15, and in wire cutting closed position in FIG. 16. In those views, the cutter approaches the wire from beneath. The cutter jaws 21 and 22, are operated by the actuator 20.

Finally, conveyor means is provided and is operable to grip the formed wire section, as at portions 11*a* and 11*d* thereof (which project tranversely oppositely in FIGS. 3(*i*)–3(*k*) to convey the sections along a generally longitudinally extending travel path (see arrow 16) away from the primary station 12 after the clamp means releases the wire, and with at least one end (and typically both such ends) of the formed wire section (see portion 11*a* and/or portion 11*d*) presented laterally, for processing thereof. Endless conveyor belts appear at 22 and 23 in FIG. 3, and are subject to bodily displacement, as by crawling, in a direction opposite to arrow 16 so as to overlap the wire portions 11*a* and 11*d*. For example, FIG. 24*a* schematically shows the belts prior to rearwardly crawl displacement; and FIG. 24*b* shows the belts after having bodily advanced rearwardly to envelope the wire portions 11*a* and 11*d* (above and below); and FIG. 24*c* shows the wire being traveled away from the primary station by the belts which have been bodily forwardly advanced, by crawl, in the direction of arrow 16, and also endlessly traveled, to advance the wire longitudinally. See also FIGS. 21*a* and 21*b*. Note also the belt 23 projects rearwardly to greater extent than belt 22, to envelope wire portion 11*a* offset from wire portion 11*a*. Belt 23 is also, temporarily, endlessly traveled to greater extent than belt 22, to bring the wire extents 11*a* and 11*d* into endwise alignment, as will appear at 11*a'* and 11*d'* in FIG. 24*c*.

It will be further noted that wires of different length are easily handled, a longer wire having intermediate portions that dangle downward as at 11*e* in FIG. 2. The extent of such dangling is determined by the metered or controlled advancement of the wire by the means 10, to be described, prior to severing, as referred to. FIG. 25 also shows dangling of wires at 11*f*, and wire ends projecting laterally from between upper and lower conveyor belts 28 and 29, and 30 and 31, and supporting various terminations 32 as applied by selected termination equipment, to be referred to.

DETAILED DESCRIPTION

Referring now to the initial wire selection, and to FIG. 2, a wire selection frame 40 is provided, with carriers for multiple wires indicated at 11, and extending in parallel, spaced apart relation, and in the same plane. The wires typically differ in cross-sectional dimensions, as indicated for example in FIG. 2*a*. Thus, wire $11_x$ is larger in diameter than wire $11_{x-1}$, which is in turn larger in diameter than wire $11_{x-2}$. The wires typically have metal cores $11_y$ and insulations $11_z$, the wires being electrical.

In the embodiment shown, the carriers comprise two upright posts 41 and 42, spaced apart in the direction of selected wire advancement. The posts have holes 43 and 44 to receive and feed the wires endwise, with guidance, and they also position the wires in parallel relation so that a selected wire may immediately be fed by the wire advancement means. Endwise (for example vertical) movement of the posts moves the frame 40 in directions indicated by arrows 43*a*, so as to bring the selected wire into driven position. See wire 11 in FIG. 2.

Turning to FIGS. 7, 9 and 10, endwise drives for the posts appear at 45 and 46. Drive 45 for post 41 includes an upright rotary screw 45*a* that threadably engages a nut 45*b* attached to post 41; a pulley 47 mounted to the lower end of the screw, and a belt 48 engaging the pulley. In similar manner, drive 46 for post 42 includes an upright rotary screw 46*a* that threadably engages a nut 46*b* attached to post 42; a pulley 49 mounted to the lower end of the screw, and the belt 48 engaging the pulley. See also screw bearings 51 and 52, and frames 53 and 53*a* carrying those bearings. A suitable motor drives belt 48, whereby the carrier posts 41 and 42 may be elevated and lowered in unison to position a selected wire at the location of wire 11 in FIG. 2, for endwise advancement. Detector 54 (including a disc 54*a* on screw 46*a* and position sensor 54*b* on frame 53*b*) detects the position of the frame and controls the motor to exactly position a selected wire in the position of wire 11, as referred to.

FIGS. 7 and 10 also show the provision of means to clamp the wires to the carrier, wire passing plungers 56 being provided for this purpose. The plungers are slidably received in transverse openings 57 in the posts, and wires pass endwise through openings 58 in the plungers. Compression springs 59 urge the plungers endwise to cause jamming or clamping of the wires against the side walls of the openings 57, as in FIG. 7; and an actuator 61′ at the level of selected wire 11, is operable to cause extension of a plunger 61*a*′ to urge the plunger sufficiently rightwardly (in FIG. 10) to relieve such jamming, whereby the selected wire is free to advance endwise. Wires are suitably supplied off spools to the wire positioning frame structure.

Turning now to the means to advance the wire 11 endwise, it is shown in FIGS. 1, 2, 3, 7 and 8 to include two endless drive belts 60 and 61 having stretches 60*a* and 61*a* that clamp the wire 11 therebetween and displace it endwise, i.e. leftwardly in FIG. 7. Belts 60 and 61 are typically timing belts with internal cogs 62, as shown, and engaged by sprockets 63–66. Pressure idler sprockets 67 and 68 engage the stretches 60*a* and 61*a* to urge them toward the wire length being gripped and advanced. Drives for the sprockets 63 and 65 are shown at 70 and 71 in FIGS. 2, 3 and 8 to include timing belts 71′ and 72 on sprockets 73 and 74. The latter drive shafts 75 and 76 suitably attached to sprockets 63 and 65.

The shafts 75 and 76 are carried by structure as shown in 77 and 78 in FIG. 8. That structure is mounted so as to be advanced sidewardly toward the wire, to grip it, and to be retracted away from the wire. Linear actuators 80 and 81 are connected via shafts 82 and 83 to bearing blocks 84 and 85 that have bores 84*a* and 85*a* receiving the shafts 75 and 76. When the actuators are extended, the sprockets 63 and 65 are positioned to cause the belts 60 and 61 to grip the wire; but, when the actuators are retracted, the retracted sprockets 63 and 65 retract the belts 60 and 61 to release the wire, and to form an enlarged space therebetween to receive another selected wire. Note frames 63*a* and 65*a* for the sprockets.

The wire advancing means is also shown in FIGS. 3 and 6 to include two drive rollers 88 and 89 having wire gripping annular surfaces 88*a* and 89*a* to tension the wire and precisely position an advancing wire. The rollers are carried by drive shafts 90 and 91 driven by a belt 92 wrapping about spools 93 and 94, as also seen in FIG. 3*a*. An idler spool for the belt is shown at 95. Suitable mounting frame structure appears at 97 and 98. FIGS. 3 and 4 also show a master drive for all belts, as including motor 200 driving a master drive spool 201 as via belt 202. See also belts 203.

The fed wire 11 then passes through a linear guide 100 on a wire deflecting arm 102, pivoted at 103 to the frame structure. See FIGS. 3(*f*) and 13(*b*). Guide 100 is slidably guided on a base plate 104, and the top of the guide carries a rack 105 engaged by teeth 106 on a segment 107. The latter is pivoted at 108, and connected to linear actuator 109. When the segment is rotated by retraction of the actuator, the guide 100 is advanced leftwardly, in the direction of arrow 110. This occurs in The FIG. 3(*b*) position of the arm, when the wire 11 is to be advanced leftwardly; however, in pivoted position of arm 102 as seen in FIG. 3(*f*), the rack 105 is disengaged from the segment teeth 106. Actuator 112 is employed to pivot arm 102 between FIG. 3 and FIG. 13 positions.

Roller 13*b* is pivotally carried by arm 102 at 113, and is driven in rotation in FIG. 3(*g*) arm position by belt 114. The latter is driven by roller 115 which is in turn driven by belt 116 and master drive spool 201. Rotation of roller 13*b* effects wire bend formation at 11*b*, as referred to above.

The wire 11 in FIG. 3 is fed by linear guide 100 (to the cutting zone defined by the jaws cutters 18*a* and 18*b* as previously described, in advanced position).

Referring now to FIG. 18, rotary revolver apparatus 14 is shown to include pulley 120 driven by belt 121, and spindle parts 122–125 rotated by pulley 120. Rotor 126 is clutch coupled at 127 to part 125, and is also driven in rotation. When clutch 127 is engaged, the rotating spindle part 125 is coupled to rotor 126, for rotating same together with a deck 14*a* attached at 130 to a carrier 129. This effects a controlled 180° rotation of the deck 14*a* of the apparatus 14, to carry the first deforming element, i.e. roller 13*a*, out of the path of wire travel by the conveyor means.

Drive is transitted to each of the two clamps 17 from part 123, via gear 134 on part 123, gear 135 meshing with gear 124, gear 136 meshing with gear 135, and shaft 137 connected with gear 136. Support structure for these elements is indicated at 140, 141 and 142.

The sequential steps of wire processing in FIGS. 3(*a*)–3(*k*) will now be described.

In FIG. 3(*a*) (Step 1), a wire is selected, as described above, to be advanced leftwardly. All clamps and rolls carried by the revolver apparatus 14 are in up-position in FIG. 18, and therefore not seen in the plane of FIG. 3(*a*).

In FIG. 3(*b*) (Step 2), a selected wire 11 is advanced leftwardly to the position shown. Wire injector or guide 100 also moves forwardly (leftwardly); and belts 60 and 61 de-reel a selected length of wire. Note the wire end projecting just beyond the plane of the cutters 18*a* and 18*b*.

In FIG. 3(*c*) (step 3) the wire is cut-off near its end, by cutters 18*a* and 18*b*, to establish a precision location of the remaining wire end 11*a*′, relative to the remainder of the wire to be advanced, and cut-off at its opposite end.

FIG. 3(*d*) (step 4) illustrates clamping of the wire by clamp 17 lowered by actuator means 190, in FIG. 18. One of the two rollers 13*a* on the revolver apparatus is also lowered into the plane of FIG. 3(*d*), by actuator 137 (FIG. 18). Further, the conveyors 22 and 23 are moved endwise into the position shown, without moving the revolver 14.

FIG. 3 (*e*) (step 5) shows the cutters 18*a* and 18*b* retracted away from the wire end 11*a*′, and the revolver apparatus ready to be rotated. The wire is clamped at 17.

FIG. 3(*f*) (step 6) illustrates the revolver apparatus in rotating mode, i.e. rotating about a central axis normal to the plane of FIG. 3(*f*), the conveyor retreating in direction 16 during such rotation. The revolver is driven through engaged clutch 127 (see FIG. 18). Curved end surface 14*a* of the revolver pushes against cam surface 102*a* on arm 102, to cause the arm 102 to swing as shown, about a pivot at 103. Clamp 17 rotates with the revolver to pull wire end portion 11*a* forwardly and in a circular path, the roller 13*a* on the revolver sidewardly approaching the wire and engaging it, as shown. In so doing, the wire is pulled forwardly through and relative to injector 100. Belts 60 and 61 advance the necessary length of wire to follow clamp 17 Clamp 17 is also rotated relative to the revolver apparatus to maintain its orientation in space, i.e. the wire end 11*a*′, continues to project leftwardly in the sequence 3(*e*)–3(*k*).

FIG. 3 (*g*) (step 7) illustrates the position of the parts at the completion of revolver 180° rotation, rollers 13(*a*) and 13(*b*) now engaging opposite sides of the wire curved and deflected extent at 11*b*.

In FIG. 3(*h*)(step 8) the clamp continues to engage the wire; and the de-reeling apparatus operates to advance wire leftwardly, rollers 13*a* and 13*b* advancing the wire, to controllably metered extent, to hang loosely as "excess" wire at 11(*e*) (see also FIG. 2).

FIG. 3(*i*) (step 9) illustrates cutting of the wire at 18*a* and 18*b*, to metered length. Thus a precision length wire strand is now in position to be conveyed by conveyors 22 and 23, which are shown advanced into position to grasp the wire opposite end extents 11*a* and 11*d*, which project in endwise opposite directions. Also, the wire extent to the right of the cutters 18*a* and 18*b* is now being clamped at 17 (employing the second clamp on the revolver), for subsequent processing of that next wire extent. Second roller 13*a* is also in down position.

In FIG. 3(*j*) (step 10), the revolver is again ready to rotate about its axis; cutters 18*a* and 18*b* have released the wire, and the first clamp 17 has now released the wire extent 11*a* and has been raised by the revolver apparatus.

In FIG. 3(*k*) (step 11), the first cut wire is now being transported by the conveyors 22 and 23, in direction 16, away from the revolver apparatus, the latter now operating as in FIG. 3(*f*) (step 6).

Accordingly, precision lengths of wire, having desired and controllable lengths, are formed in rapid succession, with their opposite end portions 11*a* and 11*d* presented and maintained in endwise opposite directions, for and terminal application to such ends.

FIGS. 13(*a*) and 13(*b*) correspond to FIGS. 3(*f*) and 3(*g*) except that the clamp 17 is not rotated relative to the revolver during rotation of the latter. As a result, one wire end 11*a* is reversed in direction as the revolver rotates, FIG. 13(*b*) showing that the resultant wire is U-shaped, having its end portions 11*a* and 11*d* extending rightwardly, i.e. in the same direction. Accordingly, the ends of those wire portions, when conveyed, are presented rightwardly for application of terminals.

FIGS. 31(*a*)–31(*i*), and also FIG. 31(*n*), show, schematically operation of multiple conveyors to create batch groupings of multiple wire segments. Primary conveyors 22 and 23 are as described above, and secondary conveyors are indicated at 122 and 123. Conveyor 122 includes linked together belts 122*a* and 122*b*, and conveyor 123 includes linked together belts 123*a* and 123*b*.

In FIG. 31(*a*), conveyors 22 and 23 have delivered wire sections 11*a*′ and 11*d*′ as in FIGS. 24(*c*), to a position for pick-up by conveyor belts 122*a* and 123*a*, the sections 11*a*′ and 11*d*′ extending endwise oppositely. Note axis $F_3$. In FIG. 31(*b*), conveyor belts 22 and 23 have retracted by amount $F_2$ relative to axis $F_3$. In FIG. 31(*c*) conveyors 122 and 123 have moved to the right and carried the wire to the right, by amount $B_3$, relative to axis $F_3$. In FIG. 31(*d*)conveyors 22 and 23 have moved forward by amount $B_2$ to carry a second wire having end portions 111*a* and 111*d*′ into the position of axis $F_3$. Note that the two wires are now closely clustered and separated by shortened distance $B_3$, i.e. the two wires are batched.

FIGS. 31(*e*)–31(*h*)repeat this process to bring a third wire having end portions 211*a*′ and 211*d*′ into clustered relation with the first two wires. FIG. 31(*n*) shows six wires clustered as described. This forms a cluster "harness" of wires suitable for application of terminals to clustered ends 11*a*′, 111*a*′–511*a*′, and for application of terminals to opposite clustered ends 11*d*′, 111*d*′–511*d*′.

FIGS. 32(*a*)–32(*h*) shows a similar sequence of steps, operating the same conveyors however, blank spaces (indicated by broken lines) are now formed at certain otherwise wire occupied spaces. This is accomplished by operating secondary conveyors 122 and 123 to displace the first wire an amount $B_3$ (see FIG. 32*c*) while the primary conveyor is transporting the next wire 111 into position as seen in FIG. 32*d*. Only three (solid line) wires 11, 111 and 211 are positioned in the final cluster, there being three blanks located as shown. Control of wire position in clusters, and the number of wires in clusters is thereby achieved.

FIGS. 33(*a*)–33(*i*) and 33(*n*) show another similar sequence of steps using the same conveyors; however, wire end portions are now controllably displaced or offset by controlled operation of conveyors 122 and 123, to form a desired configuation harness, suitable for end termination. FIGS. 33(*a*) to 33(*f*) are similar to FIGS. 31(*a*)–31(*f*); but in FIG. 33(*g*) the belt of conveyor 122*a* is moved to the right, while the belt of conveyor 123*b* is not so moved, while both conveyors 122*a* and 123*a* are bodily moved to the right, thereby offsetting wire ends 11*a*′ and 111*a*′ relative to wire ends 11*d*′ and 111*d*′. The next added wire ends 211*a*′ and 211*d*′ are not so offset, in FIG. 33(*h*). Note the final configuration of wire ends in FIG. 33(*n*), adjusted for termination or fitting to harness terminals at 500 and 501, at a subsequent terminal station 502, as shown. In FIGS. 33(*g*)–(*i*) and (*n*), the "stepped" portions 11*f*′, 111*f*′ and 311*f*′ of the wires represent slack intermediate (for example dangling) portions of the wires, between the conveyors.

Referring now to FIGS. 1, 3, 21*a*, 21*b* , 22 and 23, the primary conveyor 22 comprises upper and lower endless belts 22*a* and 22*b*, and the primary conveyor 23 also comprises upper and lower endless belts 23*a* and 23*b*. Each belt is covered with spongy material such as foam polyurethane in order to yieldably grip wires of different diameters, even when such different wires are closer together. The belts of each pair include stretches, that close toward one another to grip the wire portions 11*a* and 11*d*, just prior to release of wire portion 11*a* by clamp 17, which includes wire gripping arms 17*a* and 17*b*. FIG. 22*a* shows wire gripped by belt stretches 22*a*' and 22*b*', at the section illustrated. Clamp 17 may also be upwardly withdrawn, as by actuator structure 190.

FIG. 22 shows that each of conveyors 22 and 23 include two side-by-side pairs of upper and lower endless belts, as at 22*a* and 22*b*, and 23*a* and 23*b*, for gripping the wire portions 11*a* and 11*d*. Such conveyors may comprise timing belts, as shown, driven by sprockets 154*a* and 154*b* , and 155*a* and 155*b*. Axles 156*a* and 156*b*, and 157*a* and 157*b* mount the sprockets, as shown, and are driven by interconnected gears 158*a* and 158*b*, and interconnected gears 159*a* and 159*b*. A master timing belt 160 engages sprocket 161 that is connected to axles 162 and 162*a*, the latter driving gears 164 and 165, respectively driving gears 158*a* and 159*a*. Suitable bearings are provided, as shown, and mount the gears, axles and timely belts in a traveling frame 166. The latter is guided for travel in the direction of arrows 167 on guide rods 168–170 passing through guide openings 171–173 in the frame part 166*a*.

The master timing belt 160 is shown as wrapped in S-shaped configuration about sprocket 161 and also a rear sprocket 172, as well as over idler sprockets 175 and 176. FIGS. 21*a* and 21*b* show actuators 180 and 181 having plungers 180*a* and 181*a* engaging the traveling frame 166. When the traveling frame 166 is moved rightwardly in FIG. 21*a*, sprockets 161 and 174 turn due to the fixing of both ends of the belt 160 to the fixed frame structure 175*a*. The two sprockets 161 and 174 turn in opposite directions. These sprockets are mounted on shafts 162 and 162*a* by over-running roller clutches 163 and 163*a*. These two roller clutches are mounted so that when the sprocket 161 rotates the shaft 162 in clockwise direction by means of the roller clutch 162*a*, the sprocket 174 then does to rotate the shaft 162*a* (the roller clutch 163*a* is over-running on shaft 162*a*). So when the frame 16 in FIG. 21*a* is moving rightwardly only the shaft (162*a*) is then rotating. Shaft 162 rotates the gears 164*b* and 165*b* if the disc clutches 164*c* and 165*d* are activated. In that case, rotated gear 164*b* transmits its rotation to gears 158*c* and 158*d*. These then rotate the shafts 156*c* and 156*d*. These shafts then rotate the pulleys 154*c*, 154*n*, 155*c* and 155*d*. Finally, all the belts (22*a*', 22*b*', 22*a*, 22*b*, 23*a*', 23*b*', 23*a* and 23*b*) are rotating during the traveling of the frame 166.

Observing the right side of FIG. 21*a*, the result is shown in FIG. 22*b*', i.e. before traveling of the frame 166. FIG. 22*b*'' illustrates the positions of elements and wires during traveling of the frame 166; and FIG. 22*b*''' shows the positions at the end of rightward traveling of the frame 166. Notice that the wires already handled by the belts 22*a* and 22*b* have not been moved. The wire 11*a* has been taken between the two belts.

Figure 22C:
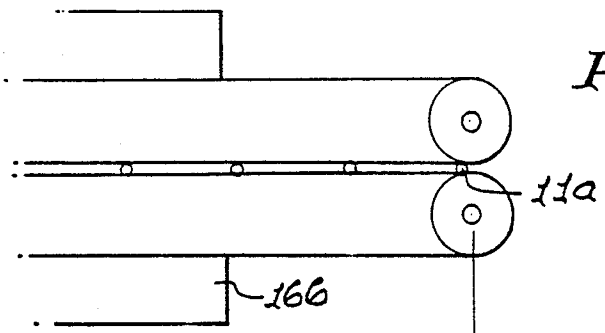
Figure 22C:
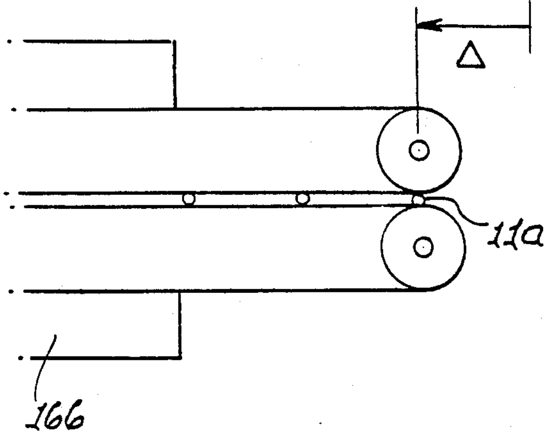
Figure 22D:
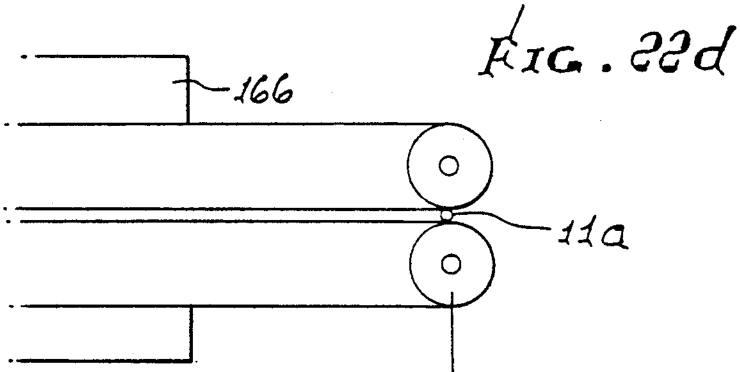
Figure 22D:
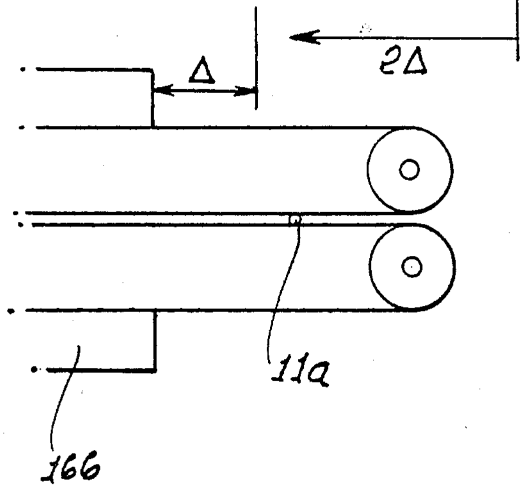

When traveling frame 166 is moved leftwardly in FIG. 21*a* (after being moved rightwardly), sprockets 161 and 174 turn due to the fixing of both ends of the belt 160 to the fixed frame structure 175. But, this time the shaft 162 163. The belts 22*a*, 22*b*, 22*a*', 22*b*' are rotated if the disc clutch 164*a* is activated. The belts 23*a* 23*b*, 23*b*' and 23*a*' are rotated if the disc-clutch 165*a* is activated. So accordingly depending upon what displacement of wire or wires is needed, during leftward travel of the frame 16 one can activate the clutches 164*a* or 165*a*, or both, or neither. The FIGS. 22*c* and 22*d* show what occurs in several cases. FIGS. 22*c*' and 22*c*'' show frame travel leftwardly without also rotating the belts 22*a* and 22*b*. The resulting leftward displacement Δ of the wire 11*a* is equal to the leftward displacement of the frame 166. In FIGS. 22*d*' and 22*d*'' the situation is the same except that that displacement 2Δ is equal to twice the leftward displacement of the frame 166. FIGS. 24*a*, 24*b* , 24*c* and FIG. 31, show various uses of these selected different displacements of wire tips.

Turning now the modified structure of FIGS. 26–30, components which are the same as previously referred to bear the same numbers, new numbers being applied to modified components.

The means for advancing wire 11 includes two drive rollers 288 and 289 having wire gripping annular surfaces 288*a* and 289*a* to tension the wire and align it with cutters 281*a* and 218*b*. The rollers are carried by shafts 290 and 291, on which drive gears 290*a* are also carried. Those gears mesh with gears 250 and 251 driven by gear 252, and the latter is driven by a pulley 253 and belt 254. Belt 254 is in turn driven by a pulley 255 on drive shaft 256 or motor 257. Note also idler pulley 258 for the belt. Frame structure appears at 310 and 311.

The fed wire then passes through linear guide 270 carried by the frame part 271. Guide 270 includes a guide tube 272 into which the wire enters at taper 272*a*, and through which the wire passes. Means to positively advance the wire leftwardly includes a tubular plunger 274 slidable on the tube 272, in response to fluid pressure application on the plunger piston head 274*a* slidable in the bore of a cylinder 276. Plunger jaws 277 grip the wire so that it can be pulled leftwardly by the plunger stroking.

Note that the wire is turned about roller 13*a* in response to rotary and compressive force exertion on the wire bend 11*b* by roller 213*b*. The latter roller is carried by arm 280 and is driven in rotation by belt 282 engaging a pulley on roller shaft 282*a*, the belt also engaging a pulley or roller on idler shaft 283. Idler pulley 284 also on that shaft is driven by belt 285 engaging a pulley integral with pulley 254. Arm 280 is rotatable about the pivot axis 286 about which pulley 254 rotates, so that roller 213*b* is driven whatever the angular position of arm 280. An indexing cam 281 rotates about axis 281*a* and it is held pressed against the revolver by an actuator 287. The arm 280 is attached to cam 281 by a spring 288*a*. The arm 280 carries a roller 213*b*. The spring 288*a* acts to push the roller 213*b* against the revolver roller 13*a*. The wire next to be formed is then advanced leftwardly toward and past the cutters and adjacent roller 13*a*, at which time the arm is returned and the wire is clamped by rotating roller 213*b*, for forming. Thus, rotation of roller 213*b* in the FIG. 26 position shown effects wire bend formation, and temporary retraction of the arm counterclockwise allows initial wire feeding about roller 13*a*. Cutters 218*a* and 218*b* operate in the same manner as cutters 18*a* and 18*b* previously described, to sever the wire when a predetermined length of wire has passed the cutters, so that the severed wire having parallel sections 11*a* and 11*d*, and bends 11*b* and 11*c* may be transported by belts, including those shown at 22 and 23, and as previously described. Rotor 14 operates as previously described.

The operating steps shown in block form in FIG. 34, are further described as follows:

INJECTING

As indicated in FIGS. 3(*a*) and 3(*b*), wire 11*a* is advanced leftwardly via telescopic gudie 100, by the dereeler belts, 60, 61.

CUTTING

As seen in FIG. 3(*c*), the wire end is cut by cutters 18*a* and 18*b* on the rotor 14, to determine the exact position of the free wire end. See also FIGS. 15 and 16. In FIG. 3(*d*) the guide 100 is retracted.

REVOLVER (ROTOR) LOADING

FIG. 3(*d*) shows the clamp 17 on the rotor in down position, clamping the wire 11*a*. See also FIG. 18 showing the down position of the clamp on the revolver. The clamp actuator appears at 190. Selection of wire bend shape to be formed (U or Z) is made by moving transfer gear 135 to up or down positions. (If gear 135 is pushed to down position, as seen in FIG. 18 by actuator 128, seen in FIG. 18, gear 135 engages fixed gear 134, whereby the wire section assumes Z shape, as seen in FIGS. 3(*f*), 3(*g*) and 3(*h*). If the gear 135 is pushed to up position by actuator 143 seen in FIG. 18, gear 135 engages upper gear 134(*a*) which rotates as the revolver rotates, whereby the wire section assumes U-shape as seen in FIG. 13(*b*).

Also, as seen in FIG. 18, the revolver 126 is clutched to the spindle part 124, so as to be rotated by belt 121.

The cutter blades 18 and 18*a* retract from the wire (see FIG. 3(*e*).

TRANSFER

The rotor 14 is rotated by belt 121; as seen in FIG. 3(*f*) belt 121 is moved by its connection at 121*a* to actuator 181 seen in FIG. 21*a*. In this regard, just prior to rotation of the rotor, the cam 281 seen in FIG. 26 releases (un-blocks) the rotor to permit its rotation by deenergizing cylinder 287 in FIG. 26 (corresponding to actuator 102 in FIG. 3(*f*). When the revolver has rotated 180°, the arm 280 returns to position as seen in FIG. 26 (corresponding to arm 102 position in FIG. 3(*g*), and held in that position by its actuator. As the rotor rotates, wire is fed from the de-reeling mechanism, as by the stepping motor 200 in FIG. 3(*f*), and encoding of revolver motion at 300 (see FIG. 18) controls the motor, via suitable logic, indicated at 301 in FIG. 3(*f*).

Roller 213*b* is then pushed toward roller 18*a* by spring 288 in FIG. 26, gripping the wire therebetween. (See also FIG. 3(*g*). The revolver is unclutched from the belt 121, via clutch 127 (see FIG. 18).

DE-REELING

An over-length (selected) of wire is then fed by the de-reeler mechanism. This wire is pulled forward by the rollers 13*a* and 213(*b*) (see FIG. 26), corresponding to rollers 13*a* and 13*b* in FIG. 3(*h*). The over-length between the rollers and the clamp 17 hangs dowwnard at 11*e*, as a selected length loop (see also FIG. 2 which is an elevation). See also the description of 11(*e*) formation at the beginning of the specification.

CONVEYOR LOADING

As shown in FIG. 3(*i*) and FIG. 21, conveyor belts 22 and 23 (upper and lower belts 22*a*, 22*b*), move into positions to receive the wire end portion (between the upper and lower stretches of the belts) on the spongy material of the belts, as described herein. The wire end portions are thus gripped by the conveyor belts.

CUTTING

FIG. 3(*i*) shows cutting of the wire by cutters 18(*a*) and 18(*b*). Accordingly, precision length or sections of wire are formed, for transport on the conveyor belts, as in FIG. 3(*k*).

CONTROL SYSTEM

In FIG. 35, a control system 400 for the various drives and sensors will now be described, and it may be programmed for accurate timing control of all actuators.

(a) Post drives 45 and 46 (see FIGS. 9, 10 and 35) are controlled by belt 48 driven by a motor 401, controlled by system 400 via lead 402.

(b) Sensor 54(*b*) (see FIG. 2) is connected via lead 403 with control system 400, which in turn controls the motor 401, via lead 403, in the manner referred to.

(c) Actuator 61' (see FIGS. 5 and 35) is controlled in its movement by system 400, via lead 404.

(d) In FIG. 8, timing belts 71' and 72 that drive belts 60 and 61 may be driven as by motors 404 and 405 via electrical leads 406 and 407 from system 400. Belts 60 and 61 de-reel a selected length of wire 11 as determined by user selected input (keyboard 400*a*) to control system 400.

(e) In FIGS. 8 and 35, linear actuators 80 and 81 have associated drives 408 and 409 connected via leads 410 and 411 with control 400.

(f) In FIG. 3(*a*) and FIG. 35 belt 92 for driving rollers 88 and 89 is driven as by a motor 413 (or motor belt) controlled by lead 414 from controller 400.

(g) In FIGS. 3(*a*) and 3(*b*) and FIG. 35, the actuator 109 for controlling the movement of guide 100, may comprise a solenoid electrically controlled via lead 416, from control system 400.

(h) In FIGS. 3(*a*)–3(*k*) and FIG. 35, actuator 112 that controls pivoting of arm 102 may comprise a solenoid electrically connected via lead 417.

(i) In FIGS. 3(*c*) and 35, the master spool 201 that controls rotation of roller 13*b* via belts 114 and 106 may be considered as effectively driven by a drive 418 (see FIG. 35) controlled via lead 419 from control system 400.

(j) In FIGS. 18 and 35, the belt 121 to rotate revolver 14 may be driven by a motor 420 connected via lead with master control system 400.

(k) In FIGS. 18 and 35, the clutch 35 may be operated by an actuator indicated at 422 in FIG. 35, and connected via lead 423 with master control 400. The clutch is controlled to rotate 14 in 180° increments. Digital encoder 300 senses the extent of rotation of revolver shaft 125, and transmits this data to master controller 400 via lead 424.

(l) In FIGS. 18 and 35, the actuator 143, which may be a solenoid, is connected via lead 425 with master control 400, which times advancement and retraction of pin in relation to 180° increments of rotation of the revolver 14. Actuator 128 is similarly controlled via lead 422.

(m) In FIGS. 18 and 35, the clamps 17 have three associated motions:

(i) up and down movement of the clamps 17, into and out of positions to clamp the wire 11, is controlled by actuators 137, which may be solenoids, and which are controlled via leads 426 and 427 from the system control 400, (ii) clamp actuators 17' cause the clamps to close upon the wire and to release the wire, and are controlled via actuators 429 and 430 and leads 428 and 431 from the system control 400.

(iii) rotation of the clamps, when closed upon a wire, is effected by the gears 134, 135 and 136, as referred to, and occurs in response to rotation of the revolver 14. If gear 135 is in an "up" position in FIG. 18 (as effected by a solenoid actuator 431*a* connected via lead 432 with the master control) the clamp 17 grasping the wire is rotated by the gears to produce a U-shaped bend in the wire, as referred to (see FIG. 1). There is an up-down actuator 431*a* for each gear 135. If gear 135 is in a "down" position, in FIG. 18, the rotation of the clamps is such as to compensate for revolver rotation, and to produce wires configured as seen at 11*a* in FIG. 3(*k*).

(n) A sensor 433 may be employed on the revolver to sense wire forward-end arrival at the position just beyond the cutters 18*a* and 18*b* as seen in FIG. 3(*b*), and from which position the selected length of the wire segment to be produced is determined by controlled drive of belts 60 and 61, as referred to above. Sensor 433 is connected with the control 400 via lead 434. Cutters 18*a* and 18*b* are driven by an actuator 435 connected via lead 436 with the control 400.

(o) Roller clutches 163 and 163*a* are operated by associated actuators 440 and 441, respectively connected via leads 442 and 443 with the control 400. Similarly, disc clutches 164*a* and 165*d* are operated by actuators 444 and 445, respectively connected with control system 400 via leads 446 and 447, and disc clutches 164*a* and 165*a* are operated by actuators 448 and 449, respectively connected with control system 400, via leads 450 and 451.

Similar actuators for corresponding elements may be employed in the structures of FIGS. 26–30.

I claim:

1. The method of clustering wire sections, for attachment of terminations to ends of the sections, and employing multiple conveyors, that includes:

(a) operating a first conveyor to sequentially travel the wire sections in sequence in a longitudinal direction, with the ends of the sections presented laterally, (b) receiving the sections, sequentially on a second conveyor, for subsequent travel, (c) operating the second conveyor in such relation to the first conveyor that the wire sections are traveled with reduced spacing therebetween in the direction of said subsequent travel relative to spacing between wire sections traveled by the first conveyor.

2. The method of claim 1 wherein the second conveyor includes laterally spaced conveyor sections, and including operating said second conveyor sections to relatively offset selected opposite ends of wire sections received by the second conveyor.

3. In a wire processing system for processing a wire into sections for presentation to conveyor means, the combination comprising:

(a) first means to advance a wire generally endwise toward a primary station, the wire having a forward portion, (b) wire deforming means at the primary station and operatively associated with the first means to form at least one bend in the advancing wire, (c) clamp means at the primary station and operatively associated with deforming means to clamp said forward portion of the wire that has passed said deforming means, (d) cutter means operatively associated with the clamp means to sever the wire after a selected length of wire has advanced past the cutter means, whereby a wire section of predetermined length is formed, (e) and apparatus including a rotor at the primary station, said wire deforming means including at least one wire deforming element carried by the rotor, the rotor also carrying said cutter means and said clamp means for rotating the clamped wire about an axis defined by the rotor prior to severing of the wire by said cutter means.

4. The combination of claim 3 wherein said wire deforming means includes another wire deforming element carried by the rotor, the rotor rotatable in 180° increments to bring said two elements alternately into position to bend the advancing wire.

5. The combination of claim 4 wherein said wire deforming means includes a secondary wire deforming element, and a carrier for said secondary element movable to bring the secondary element into proximity to one of the two wire deforming elements on the rotor to effect bending of the advancing wire, and to carry the secondary element away from the wire during initial conveying of the wire section by the conveyor means.

6. The combination of claim 3 wherein said first means includes a wire drive and guide operatively associated with said primary station operable to advance the wire generally toward said primary station until a selected length of the wire has passed said cutter means for said bend forming beyond the cutter means.

7. The combination of claim 3 including said wire having one of the following shapes, after operation of said deforming means and gripping by said conveyor means:

(i) C-shape (ii) S-shape.

8. The combination of claim 3 including a wire selection frame operatively associated with said first means and having carriers for multiple wires, and means to selectively displace the frame relative to said first means to bring a selected wire into position for feeding of a selected wire by said first means.

9. The combination of claim 3 including said wire having in plan view after operation of said deforming means and rotation of said rotor apparatus, a shape in the form of a succession of U's.

10. The combination of claim 3 wherein said clamp means includes two clamps carried by said rotor apparatus to clamp wire end portions for supporting the wire for loading onto the conveyor means.

11. The combination of claim 5 wherein said carrier comprises an arm mounted to swing and cause the secondary deforming element to move toward one of said two wire deforming elements on the rotor deforming to clamp the wire therebetween, thereby to form said bend or bends.

12. The combination of claim 11 wherein each of said wire deforming elements on the rotor is a roller, and said arm has a retracted position in which the secondary deforming element is retracted away from the one deforming element on the rotor, during operation of said conveyor means to convey the wire section away from the primary station.

13. The combination of claim 3 wherein the wire section in elevation view forms a suspended loop, as gripped by the clamp means and after severing by the cutter means.

14. The combination of claim 8 wherein said carriers comprise two posts associated with said frame with wire guide holes to orient the wires in parallel relation and in the same plane, and said means to displace the carrier posts include two rotary screws threadably coupled to the posts, and screw rotary drive means, and including detector means to detect the position of the carrier posts so that a selected wire may be exactly positioned to be advanced by said first means.

15. The combination of claim 14 including means to clamp wires in positions relative to such posts, and to unclamp the selected wire brought into position for endwise advancement.

16. The combination of claim 3 wherein said first means to advance a wire endwise includes two endless belts having portions that grip a wire along its length, and means driving said belts.

17. The combination of claim 16 including means mounting said belts for endless travel, for retracting the belts away from a wire reception zone to receive a selected wire therein, and for advancing the belts toward said zone to grip the selected wire along its length.

18. The Combination of claim 12 wherein said secondary deforming element comprises a roller, there being drive means carried by the arm to rotate the secondary roller at a speed to bend the wire about the wire deforming roller on the rotor.

19. The combination of claim 18 including an actuator operatively associated with the arm to pivot the arm, and a tensioning means operatively associated with the arm to urge the arm in a direction to cause the secondary roller to compress the wire against the wire deforming roller on the rotor.

20. The combination of claim 18 wherein said first means comprises a plunger intermittently driven in timed relation to pivoting of said arm, to feed a wire strand past the cutter means and to the wire deforming means.

21. The combination of claim 3 wherein said conveyor means includes at least a primary pair of endless conveyors and means to effect endless travel of the conveyors, and also crawl displacement of certain conveyors to grip the wire length and convey it along said longitudinal path of the conveyors undergoing said endless travel.

22. The combination of claim 21 including at least a secondary pair of endless conveyors to receive the wire length from said primary pair of conveyors, for transfer to a tertiary pair of endless conveyors, the conveyors traveling at different rates to controllably space the received wire lengths.

23. The combination of claim 21 wherein said means to effect endless travel of the conveyors and also crawl displacement thereof includes a timing belt having fixed ends, a pair of sprockets spaced apart in the direction of conveyor crawl displacement, the belt wrapping about the sprockets in S-shaped relation, and at least one of the sprockets connected in driving relation with the conveyors.

24. In wire handling apparatus, the combination (a) means to advance wire endwise, (b) a rotor associated with said means to advance wire, clamp means on the rotor to locally clamp wire after a metered length of wire has been advanced toward the clamp means, and a first roller on the rotor, (c) a pivoted arm associated with the rotor and a secondary roller on that arm, the arm swingable toward and away from the rotor, (d) means associated with the rotor to rotate the rotor while the arm swings relative to the rotor axis of rotation to bring said first and secondary rollers into engagement with the wire, and also to cause the clamp means to bend the wire, and also to cause the clamp means to bend the wire around the first roller so that the wire extend proximate the roller and clamp means assumes Z-shaped configuration, (e) and means associated with the rotor to sever the wire to isolate the Z-shaped extent of the wire.

25. In wire processing apparatus, the combination comprising:

(a) first means to advance wire generally endwise, (b) and a wire selection frame associated with said first means and having carriers for multiple wires, and means associated with the frame to selectively displace the frame relative to said first means to bring a selected wire into position for feeding of a selected wire by said first means.

26. The combination of claim 25 wherein said carriers comprise two posts with wire guide holes to orient the wires in parallel relation and in the same plane, and said means to displace the carrier posts include two rotary screws threadably coupled to the posts, and screw rotary drive menas, and including detector means to detect the position of the carrier posts so that a selected wire may be exactly positioned to be advanced by said first means.

27. The combination of claim 26 including means associated with the posts to clamp the wires in positions relative to such posts, and to unclamp the selected wire brought into position for endwise advancement.

* * * * *